(12) United States Patent
Pillai et al.

(10) Patent No.: US 11,138,290 B2
(45) Date of Patent: Oct. 5, 2021

(54) DISCRETE COSINE TRANSFORM/INVERSE DISCRETE COSINE TRANSFORM (DCT/IDCT) SYSTEMS AND METHODS

(71) Applicant: Intel Corporation, Santa Clara, CA (US)

(72) Inventors: Kamlesh R. Pillai, Bangalore (IN); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 270 days.

(21) Appl. No.: 16/370,955

(22) Filed: Mar. 30, 2019

(65) Prior Publication Data

US 2019/0228049 A1    Jul. 25, 2019

(51) Int. Cl.
*G06F 17/14* (2006.01)
*G06F 17/16* (2006.01)
*G06F 15/80* (2006.01)

(52) U.S. Cl.
CPC ........ *G06F 17/147* (2013.01); *G06F 15/8046* (2013.01); *G06F 17/16* (2013.01)

(58) Field of Classification Search
CPC .... G06F 17/147; G06F 17/16; G06F 15/8046; G06F 2207/4824; G06F 7/548
USPC ........................................................ 708/402
See application file for complete search history.

(56) References Cited

U.S. PATENT DOCUMENTS 5,659,780 A * 8/1997 Wu ...................... G06F 15/8015
708/315
2006/0095258 A1* 5/2006 Jeong ................... G10L 21/028
704/233

OTHER PUBLICATIONS

ILim et al., A Systolic Array for 2-D DFT and 2-D DCT, 1994 IEEE, pp. 123-131.*
European Patent Office, European Search Report dated Oct. 5, 2020 in European patent application No. 20154075.4, 9 pages total.
Khoyatiadeh A., et al., "Systolic Cordic DCT: An Effective Method For Computing 2D-DCT," Jul. 1, 2003, 4 pages total.
Chen, et al., "A Complete Pipelined Parallel Cordic Architecture For Motion Estimation," May 1, 1998, 8 pages total.
Hu, Y.H., et al., "An Efficient Cordic Array Structure For The Implementation Of Discrete Cosine Transform," Jan. 1, 1995, 6 pages total.

(Continued)

*Primary Examiner* — Tan V Mai
(74) *Attorney, Agent, or Firm* — Trop, Pruner & Hu, P.C.

(57) ABSTRACT

The present disclosure is directed to systems and methods for performing discrete cosine transforms and inverse discrete cosine transforms (DCT/IDCT) using a CORDIC algorithm implemented in systolic array circuitry that includes a plurality cells or nodes, each containing circuitry to implement the CORDIC algorithm. DCT/IDCT control circuitry multiplies the systolic array output matrix generated by the systolic array circuitry by a scaling factor that may include a defined scaling value or an actual cosine value. The DCT/IDCT control circuitry causes the transfer of the scaled systolic array output matrix to combination circuitry where the DCT/IDCT input matrix is combined with the scaled systolic array output matrix to provide the DCT/IDCT output matrix. The DCT/IDCT control circuitry also transfers bypass information to at least a portion of the cells or nodes in the systolic array circuitry.

25 Claims, 25 Drawing Sheets

(56) References Cited

OTHER PUBLICATIONS

Hsiao J-H et al., "High Throughput Cordic-Based Systolic Array Design For The Discretecosine Transform," Jun. 1, 1995, 8 pages total.
Tze-Yun Sung, et al., "High-Efficiency and Low-Power Architectures for 2-D DCT and IDCT Based on Cordic Rotation," Dec. 1, 2006, 6 pages total.
Prabhakar Mishra, et al., "Architectures for FPGA-Based Implementation of Motion Estimation of Dynamic Obstacles for Autonomous Robot Navigation," Jul. 26, 2011, 6 pages total.
Intel® 64 and IA-32 Architectures Software Developer's Manual, Sep. 2014.
Intel® Architecture Instructions Set Extensions and Future Features Programming Reference, Mar. 2020.

* cited by examiner

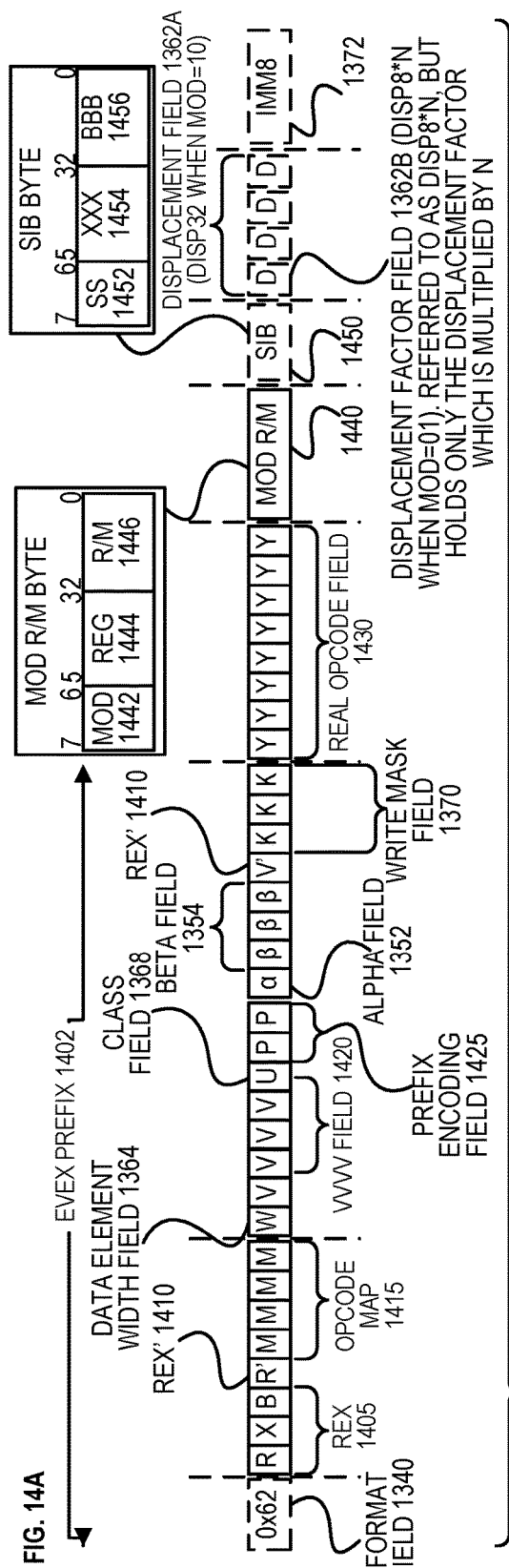
FIG. 14A
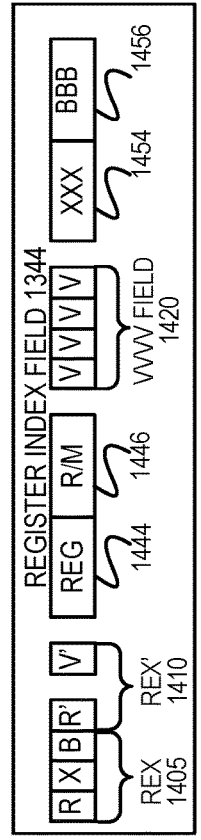
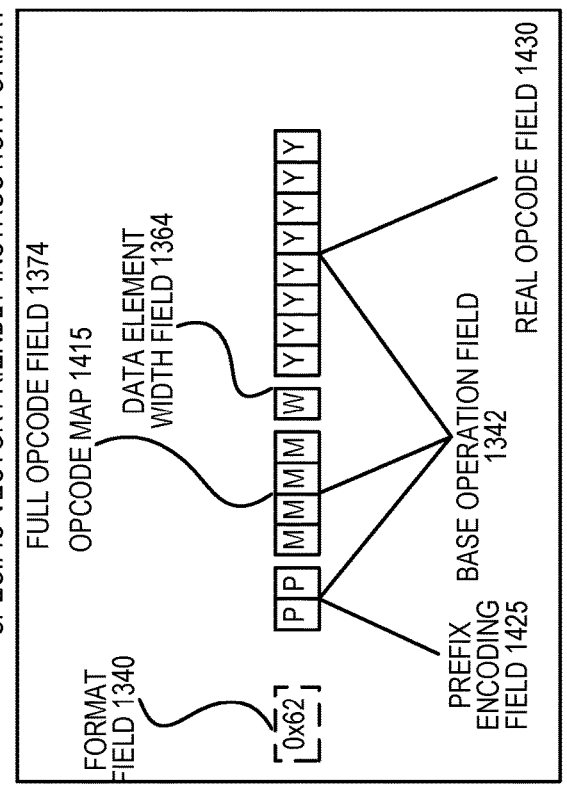
FIG. 14B
FIG. 14C

FIG. 15
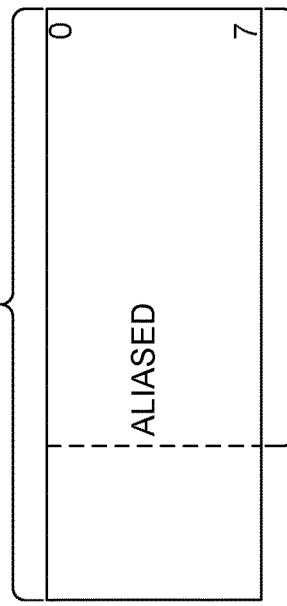
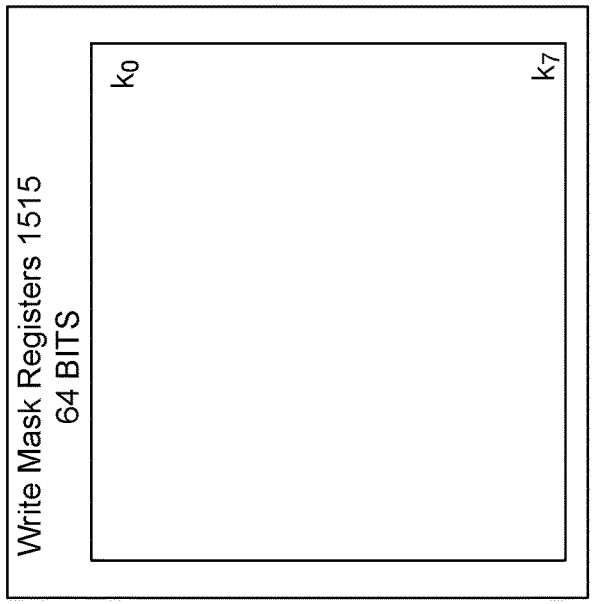
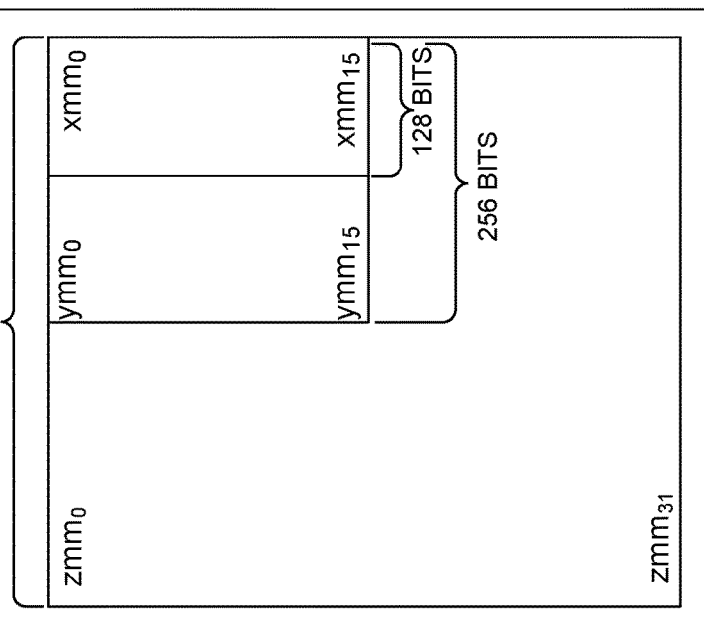

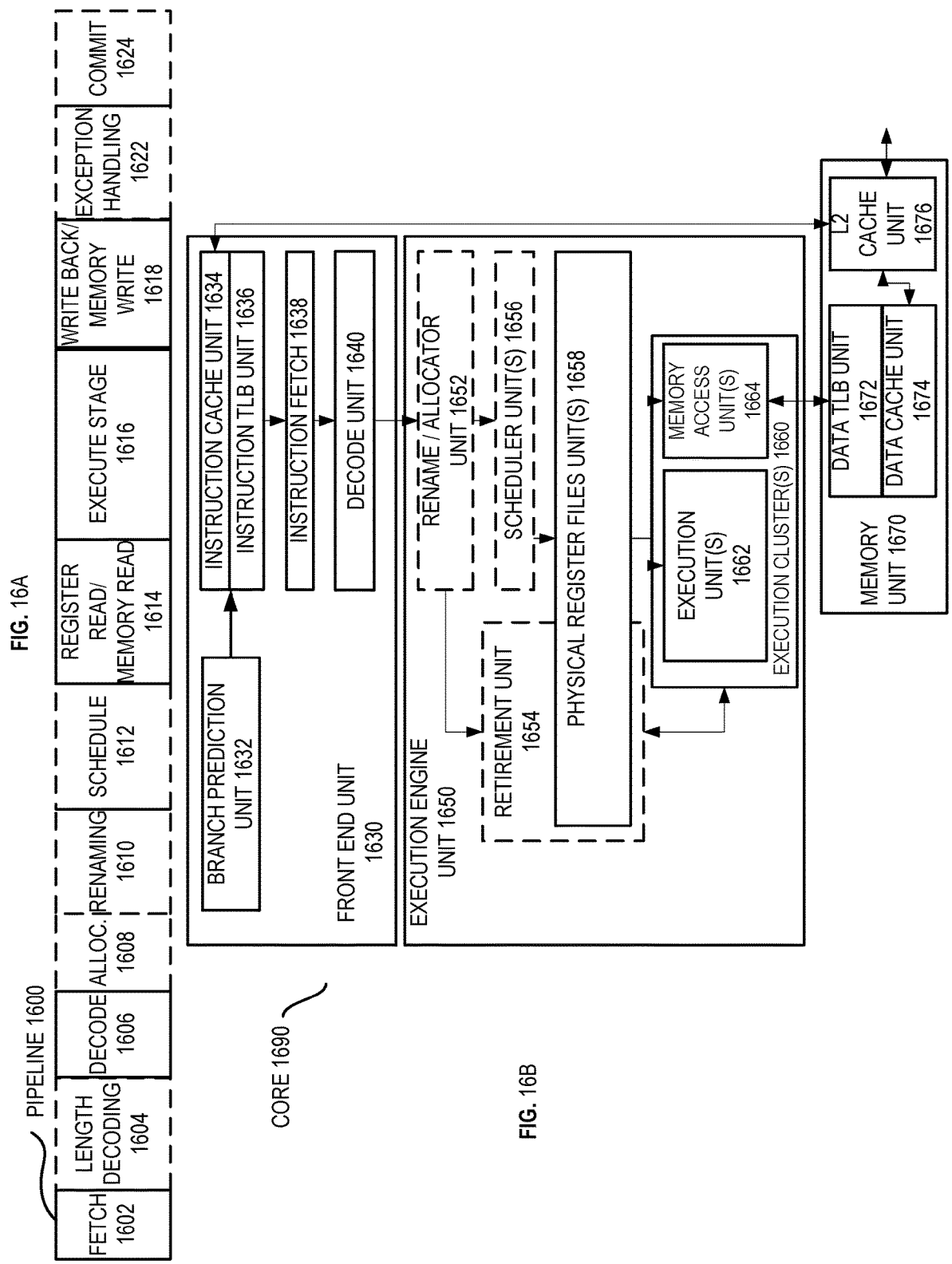

DISCRETE COSINE TRANSFORM/INVERSE DISCRETE COSINE TRANSFORM (DCT/IDCT) SYSTEMS AND METHODS

TECHNICAL FIELD

The present disclosure relates to circuitry capable of performing discrete cosine transforms and inverse discrete cosine transforms, more particularly circuitry capable of performing mathematical operations associated with DCT/IDCT operations.

BACKGROUND

Signal and image processing frequently necessitates conversion of time domain based information into a frequency domain in order to perform meaningful actions such as shape detection and object recognition over a relatively short period of time. Applications requiring such shape detection and object recognition include but are not limited to autonomous driving, virtual reality, augmented reality, drone vehicle operation, and artificial intelligence deep learning applications, such as convolutional neural networks. Often, multidimensional discrete cosine transforms (DCT) and inverse discrete cosine transforms (IDCT) present computationally intensive operations that, while beneficial across a wide variety of applications, place a considerable burden on processor and memory circuitry.

BRIEF DESCRIPTION OF THE DRAWINGS

Features and advantages of various embodiments of the claimed subject matter will become apparent as the following Detailed Description proceeds, and upon reference to the Drawings, wherein like numerals designate like parts, and in which:

FIGS. 14A, 14B, 14C, and 14D are block diagrams illustrating an exemplary specific vector friendly instruction format according to embodiments of the invention;

FIG. 15 is a block diagram of a register architecture according to one embodiment of the invention;

FIG. 16A is a block diagram illustrating both an exemplary in-order pipeline and an exemplary register renaming, out-of-order issue/execution pipeline according to embodiments of the invention.

FIG. 16B is a block diagram illustrating both an exemplary embodiment of an in-order architecture core and an exemplary register renaming, out-of-order issue/execution architecture core to be included in a processor according to embodiments of the invention;

Figure 1:
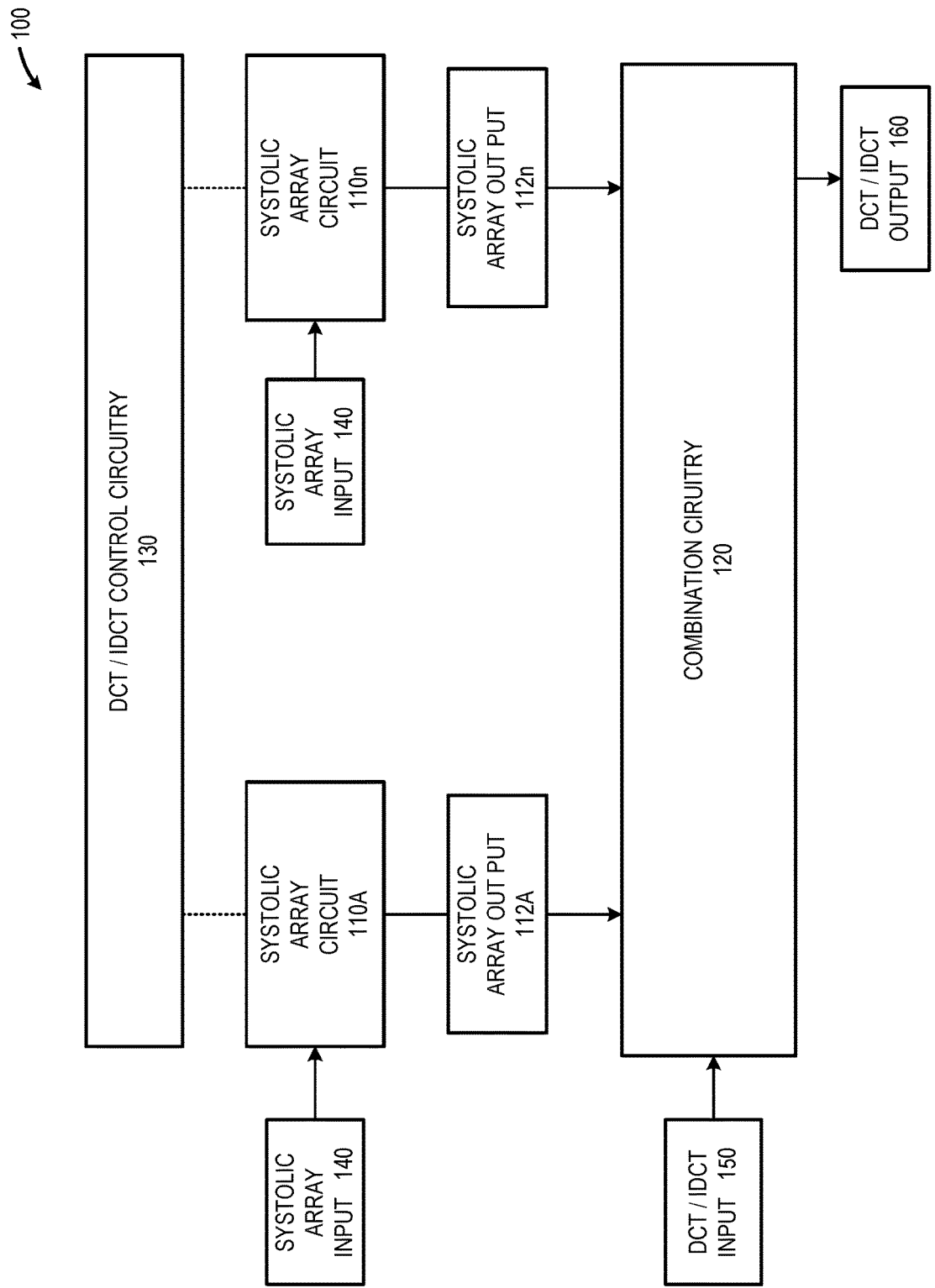
FIG. 1 is a block diagram of an illustrative discrete cosine transform/inverse discrete cosine transform (DCT/IDCT) system that includes a plurality of DCT/IDCT systolic array circuits, combination circuitry to receive a respective systolic array output from each of the systolic array circuits and combine the systolic array output matrices with a DCT/IDCT input array to provide a DCT/IDCT output matrix, in accordance with at least one embodiment described herein.

The figures below detail exemplary architectures and systems to implement embodiments of the above. In some embodiments, one or more hardware components and/or instructions described above are emulated as detailed below, or implemented as software modules.

Although the following Detailed Description will proceed with reference being made to illustrative embodiments, many alternatives, modifications and variations thereof will be apparent to those skilled in the art.

DETAILED DESCRIPTION

The systems and methods disclosed herein beneficially provide a multidimensional floating point DCT/IDCT using a CORDIC (COordinate Rotation Digital Computer) system implemented using systolic array circuitry. Such an implementation provides for a DCT/IDCT system that readily scales from a one-dimensional to an n-dimensional DCT/IDCT by combining n parallel DCT/IDCT systolic array circuits to provide any needed multidimensional DCT/IDCT analysis capabilities. In addition, the use of the systolic array circuitry to perform the DCT/IDCT operation eliminates the need for extensive lookup tables (LUTs), translating into a significant on-chip real estate savings.

The systems and methods described herein make use of a systolic array to perform the mathematical operations associated with performing the DCT/IDCT operation. Advantageously, the systems and methods described herein may be expanded to provide DCT/IDCT operations in any number (i.e., "n" dimensions) by paralleling the a plurality of systolic array circuits equal to the number of dimensions. The output generated by a some or all of the systolic arrays may be iterated through the respective array to achieve a desired degree of precision. The cosine/inverse cosine output from each of the systolic arrays may be combined and the resultant cosine/inverse cosine term combined with the input array to provide the final DCT/IDCT result.

The DCT/IDCT systems and methods disclosed herein provide numerous advantages over systems and methods using LUTs or similar data structures. First, the systems and methods described herein may be implemented using a CORDIC system implemented using either stand-alone (i.e., dedicated) systolic array circuitry or integrated into a system architecture offering systolic array circuitry. Second, the microarchitecture of the systems described herein are readily and easily scaled to provide any needed number of parallel operations. Third, the systems and methods described herein are readily scalable from one-dimension to n-dimensions thereby providing a multi-dimensional DCT/IDCT solution. Fourth, the systems and methods described herein are DirectX and OpenGL compliant solutions that may be used with any applications running Direct3D Version 12.1 and above and OpenGL ES Version 3.1 and above. Fifth, the systems and methods described herein provide for flexible precision. In applications requiring a high degree of precision, the scaling factor used in implementing CORDIC may be replaced with actual cosine values. Generally, the greater the number of CORDIC iterations through the systolic array circuitry, the greater the accuracy of the transform. Conversely, applications tolerant of lesser accuracy require fewer CORDIC iterations, conserving microarchitectural area and reducing system latency. Sixth, the systems and methods disclosed herein are readily portable across a variety of platforms from portable processor-based devices to servers, from drones to artificial intelligence devices without platform dependency and with minimal or even no modification. Seventh, the systems and methods disclosed herein, through the avoidance of memory circuitry beneficially minimize the on-chip real-estate required to implement the CORDIC implementation using systolic arrays, even when actual cosine terms (rather than a scaling factor) are used for CORDIC convergence. Finally, the CORDIC implementation in the systems and methods disclosed herein does not require the use of LUTs and requires only a single multiplication operation, significantly reducing the number of clock cycles needed to complete the operation.

A discrete cosine transform (DCT)/inverse discrete cosine transform (IDCT) system is provided. The system may include: one or more combination circuits; one or more systolic array circuits; DCT/IDCT control circuitry coupled to the one or more combination circuits and to the one or more systolic array circuit, the control circuitry to: receive a systolic array input data set; receive an input array data set; provide the systolic array input data set to each respective one of the one or more systolic array circuits, each of the one or more systolic array circuits to provide a systolic array output matrix using the received systolic array input data such that the one or more systolic array circuits collectively provide one or more systolic array output matrices; and cause the one or more combination circuits to mathematically combine the input array data set with the one or more systolic array output matrices to generate a DCT/IDCT output matrix.

A discrete cosine transform (DCT)/inverse discrete cosine transform (IDCT) method is provided. The method may include: causing, by DCT/IDCT control circuitry, a transfer of a systolic array input data set to each respective one of one or more systolic array circuits, each of the one or more systolic array circuits communicatively coupled to DCT/IDCT control circuitry; generating, by each respective one of the one or more systolic array circuits, a systolic array output matrix using the received systolic array input data, the one or more systolic array circuits to collectively provide one or more systolic array output matrices; causing, by the DCT/IDCT control circuitry, a transfer of an input array data set to combination circuitry, the combination circuitry communicatively coupled to the DCT/IDCT control circuitry; causing, by the DCT/IDCT control circuitry, a transfer of the one or more systolic array output matrices to the combination circuitry; and combining, by the combination circuitry, the input array data set and the one or more systolic array output matrices to generate data representative of a DCT/IDCT output matrix.

A discrete cosine transform (DCT)/inverse discrete cosine transform (IDCT) system is provided. The system may include: means for providing data representative of a systolic array input data set to each respective one of one or more systolic array circuits; means for generating a systolic array output matrix using the received data representative of the systolic array input data to provide data representative of one or more systolic array output matrices; means for combining the data representative of an input array data set and the data representative of one or more systolic array output matrices to generate data representative of a DCT/IDCT output matrix.

A non-transitory storage device is provided. The non-transitory storage device may include instructions that, when executed by discrete cosine transform (DCT)/inverse discrete cosine transform (IDCT) control circuitry (DCT/IDCT control circuitry) causes the DCT/IDCT control circuitry to: cause a transfer data representative of a systolic array input data set to each respective one of one or more systolic array circuits, each of the one or more systolic array circuits communicatively coupled to the control circuitry; cause each respective one of the one or more systolic array circuits to generate a systolic array output matrix using the received data representative of the systolic array input data to provide data representative of one or more systolic array output matrices; cause a transfer of data representative of an input array data set to combination circuitry; cause a transfer of the data representative of one or more systolic array output matrices to the combination circuitry; and cause a combination circuit to combine the data representative of an input array data set and the data representative of one or more systolic array output matrices to generate data representative of a DCT/IDCT output matrix.

A processor-based device is provided. The device may include: processor circuitry; processor cache circuitry communicatively coupled to the processor circuitry; system memory circuitry communicably coupled to the processor circuitry; discrete cosine transform (DCT)/inverse discrete cosine transform (IDCT) circuitry, including: one or more combination circuits; one or more systolic array circuits; DCT/IDCT control circuitry coupled to the one or more combination circuits and to the one or more systolic array circuit, the control circuitry to: receive a systolic array input data set; receive an input array data set; provide the systolic array input data set to each respective one of the one or more systolic array circuits, each of the one or more systolic array circuits to provide a systolic array output matrix using the received systolic array input data such that the one or more systolic array circuits collectively provide one or more systolic array output matrices; and cause the one or more combination circuits to mathematically combine the input array data set with the one or more systolic array output matrices to generate a DCT/IDCT output matrix.

FIG. 1 is a block diagram of an illustrative discrete cosine transform/inverse discrete cosine transform (DCT/IDCT) system 100 that includes a plurality of DCT/IDCT systolic array circuits 110A-110$n$ (collectively, "systolic array circuits 110"), combination circuitry 120 to receive a respective systolic array output 112A-112$n$ (collectively, "systolic array output matrices 112") from each of the systolic array circuits 110 and combine the systolic array output matrices 112 with a DCT/IDCT input array 150 to provide a DCT/IDCT output matrix 160, in accordance with at least one embodiment described herein. As depicted in FIG. 1, a systolic array input 140 is provided to each of the systolic array circuits 110. The systolic array circuits 110 implement a COordinate Rotation DIgital Computer (CORDIC) algorithm to determine cosine or arccosine values based on the values provided in an n-dimensional systolic array input array 140. The combination circuitry 120 combines the systolic array output matrices 112 with the DCT/IDCT input array 150 to provide the DCT/IDCT output matrix 160. Beneficially, the SCT/IDCT system 100 determines the DCT/IDCT output matrix without the use of look-up tables (LUTs) and simple mathematical operations such as addition, subtraction and bit shifting via the implementation of the CORDIC algorithm by each of the systolic array circuits 110.

The DCT/IDCT system 100 may include a number of parallel systolic array circuits 110 based upon the dimensionality of the systolic array input array 140 and/or the DCT/IDCT input array 150. Thus, for an n-dimensional systolic input array 140, the DCT/IDCT control circuitry 130 may implement "n" parallel systolic array circuits 110, each producing a one-dimensional systolic array output matrix 112. Thus, the DCT/IDCT control circuitry 130 is able to dynamically adapt the DCT/IDCT system 100 to provide a DCT/IDCT analysis in one or more dimensions. The CORDIC algorithm implemented by each of the systolic array circuits 110 uses an iterative approach to determine raw value that is then multiplied by a constant factor to determine the cosine or arccosine value associated with each value included in the systolic array input matrix 140. Generally, the greater the number of iterations, the greater the accuracy of the cosine or arccosine value returned by the systolic array circuitry 110. Additionally, the greater the accuracy of the constant multiplier factor supplied to the systolic array circuitry 110, the greater the accuracy of the cosine/arccosine value returned by the systolic array circuitry 110. Thus, the DCT/IDCT control circuitry 130 may provide control data that includes data representative of one or more of: a defined iteration count, a maximum iteration count, a defined accuracy, and/or a defined constant multiplier factor to each of some or all of the systolic array circuits 110. In embodiments, the DCT/IDCT control circuitry 130 may dynamically adjust the control data provided to the systolic array circuits 110 based on one or more input data characteristics and/or the accuracy or purpose of the DCT/IDCT output matrix 160.

In operation, the DCT/IDCT control circuitry 130 configures a number of systolic array circuits 110 based on the dimensionality of the DCT/IDCT to be performed. Beneficially, the DCT/IDCT control circuitry 130 configures only the needed number of systolic array circuits 110, leaving the remaining systolic array circuits 110 available for use by system processor circuitry and/or other applications. The DCT/IDCT control circuitry 130 causes the transfer of the systolic array input matrix 140 to each of the systolic array circuits 110. Each of the systolic array circuits 110 generates a respective systolic array output matrix 112. The precision of the cosine/arccosine values included in the systolic array output matrices 112 may be determined by the data representative of the number of iterations and/or the accuracy of the constant multiplier factor provided by the DCT/IDCT control circuitry 130 to the systolic array circuitry 110. The systolic array output matrices 112 are communicated to the combination circuitry 120 where the systolic array output matrices 112 are mathematically combined with the DCT/IDCT input matrix 150.

Each of the systolic array circuits 110 includes any number and/or combination of currently available and/or future developed electronic components, semiconductor devices, and/or logic elements capable of receiving a systolic array input matrix 140 and, via circuitry implementing the CORDIC algorithm, generating a systolic array output matrix 112 that includes one or more values indicative of at least one of: a cosine or an arccosine of a value provided in the systolic array input matrix 140. In embodiments, the systolic array circuit 110 performs an iterative calculation to improve the accuracy of the cosine or arccosine values returned in the systolic array output matrix 112. In embodiments, the DCT/IDCT control circuitry 130 may provide, to each of some or all of the systolic array circuits 110, an input signal 132 that includes information and/or data representative of a desired precision or a desired number of CORDIC iterations performed by the systolic array circuitry 110. Each of the plurality of systolic array circuits 110A-110$n$ may include a plurality of interconnected cells or nodes capable of performing a similar function, such as a mathematical operation. Example mathematical operations include but are not limited to: addition, subtraction, and bit-shifting. In one or more embodiments, the systolic array circuitry 110 may, for example, include an 8×8 array of cells or nodes, each capable of performing one or more mathematical operations. Each of the systolic array circuits 110A-110$n$ generates a respective systolic array output matrix 112A-112$n$. In embodiments, each of the systolic array outputs 112 includes a one-dimensional (1-D) matrix. The systolic array output matrices 112 are communicated to the combination circuitry 120.

The combination circuitry 120 includes any number and/or combination of electrical components, semiconductor devices, and/or logic elements capable of receiving and mathematically combining the DCT/IDCT input matrix 150 with one or more systolic array output matrices 112 to generate the DCT/IDCT output matrix 160. In embodiments, the combination circuitry 120 may mathematically combine a plurality of received systolic array output matrices 112 to generate a single systolic array output matrix that is subsequently mathematically combined with the DCT/IDCT input matrix 150. In at least some implementations, the combination circuitry 120 may multiply the systolic array output matrices with the DCT/IDCT input matrix 150. In embodiments, the DCT/IDCT input matrix 150 may include but is not limited to: data associated with one or more neural networks; image data; video data, audio data, or any combination thereof.

The DCT/IDCT control circuitry 130 includes any number and/or combination of electrical components, semiconductor devices, and/or logic elements capable of causing a transfer of the systolic array input matrix 140 to each of the systolic array circuit 110A-110n; causing a transfer of the DCT/IDCT input matrix to the combination circuitry 120; causing a transfer to each of the systolic array circuits 110 of one or more control signals 132 that include one or more of: a value representative of an iteration count/precision threshold and/or a value representative of the constant used in the CORDIC algorithm. In embodiments, processor circuitry may provide all or a portion of the DCT/IDCT control circuitry 130. In other embodiments, a memory management unit (MMU) may provide all or a portion of the DCT/IDCT control circuitry 130. In yet other embodiments, the DCT/IDCT control circuitry 130 may include: an application specific integrated circuit (ASIC); a digital signal processor (DSP); a field programmable gate array (FPGA); or a reduced instruction set computer (RISC); or similar.

In embodiments, the systolic array input matrix 140 includes any number and/or combination of values for input to one or more systolic array circuits 110 performing a CORDIC DCT. In such embodiments, the systolic array circuits 110 determine cosine values (e.g., frequency-domain values) corresponding to some or all of the values included in the systolic array input matrix 140. In other embodiments, the systolic array input matrix 140 includes any number and/or combination of values, such as frequencies, for input to one or more systolic array circuits 110 performing a CORDIC inverse DCT. In such embodiments, the systolic array circuits 110 determine arccosine values (e.g., time-domain values) corresponding to some or all of the cosine values included in the systolic array input matrix 140.

Figure 2:
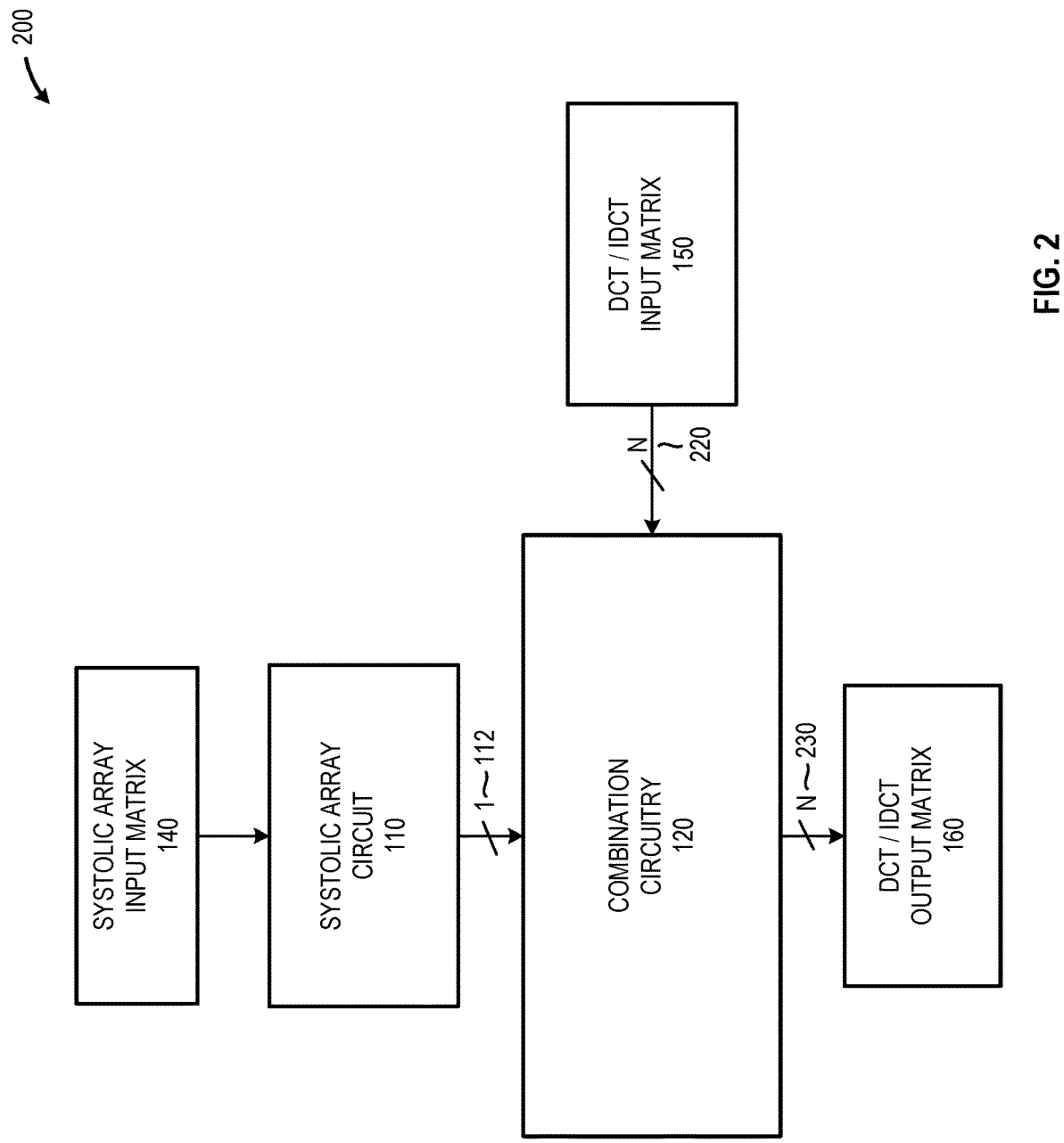
FIG. 2 is a block diagram of an illustrative system that determines a DCT/IDCT for an example one-dimensional (1D) DCT/IDCT input matrix, in accordance with at least one embodiment described herein.

FIG. 2 is a block diagram of an illustrative system 200 that determines a DCT/IDCT for an example one-dimensional (1D) DCT/IDCT input matrix 150, in accordance with at least one embodiment described herein. As depicted in FIG. 2, in embodiments, the systolic array output matrix 112 may include one or more cosine values 210 and the DCT/IDCT input matrix 150 may include an "N×1" DCT/IDCT input matrix 220. The combination circuitry 120 may mathematically combine, for example using matrix multiplication, the one or more cosine values 210 and the "N×1" DCT/IDCT input matrix 220 to provide an "N×1" DCT/IDCT output matrix.

Figure 3:
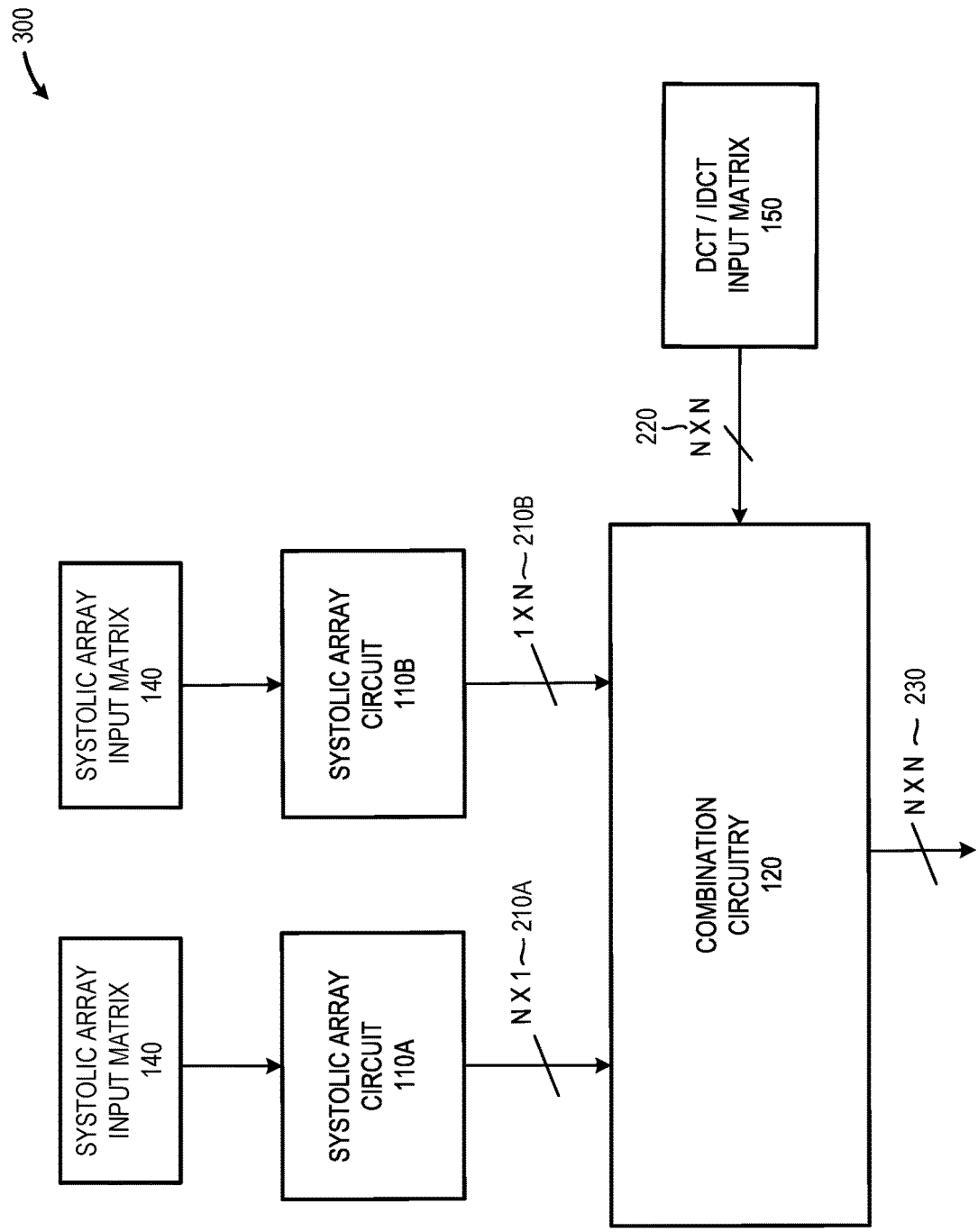
FIG. 3 is a block diagram of an illustrative system that determines a DCT/IDCT for an example n-dimensional (nD) DCT/IDCT input matrix, in accordance with at least one embodiment described herein.

FIG. 3 is a block diagram of an illustrative system 300 that determines a DCT/IDCT for an example n-dimensional (nD) DCT/IDCT input matrix 150, in accordance with at least one embodiment described herein. As depicted in FIG. 3, in embodiments, systolic array circuit 110A may generate a 1D systolic array output matrix 112A that includes an "N×1" matrix 210A and systolic array circuit 110B may generate a 1D systolic array output matrix 112B that includes a "1×N" matrix 210B. The DCT/IDCT input matrix 150 may include a 2D "N×N" DCT/IDCT input matrix 220. The combination circuitry 120 may first mathematically combine the "N×1" systolic array output matrix 210A with the "1×N" systolic array output matrix 210B to provide a 2D "N×N" systolic array output matrix. The combination circuitry 120 may then mathematically combine the "N×N" systolic array output matrix with the "N×N" DCT/IDCT input matrix 150 to provide an "N×N" DCT/IDCT output matrix 230.

Although depicted as a 2D system in FIG. 3, beneficially, the DCT/IDCT system 300 may be expanded to implement any n-dimensional by parallel processing "n" 1D systolic array circuits 110A-110n. Thus, the systems and methods disclosed herein advantageously use only the system resources (e.g., systolic array circuits) necessary to perform the CORDIC analysis to complete the DCT/IDCT transform based on the number of cosine/arccosine terms involved in the multi-dimensional DCT/IDCT.

Figure 4:
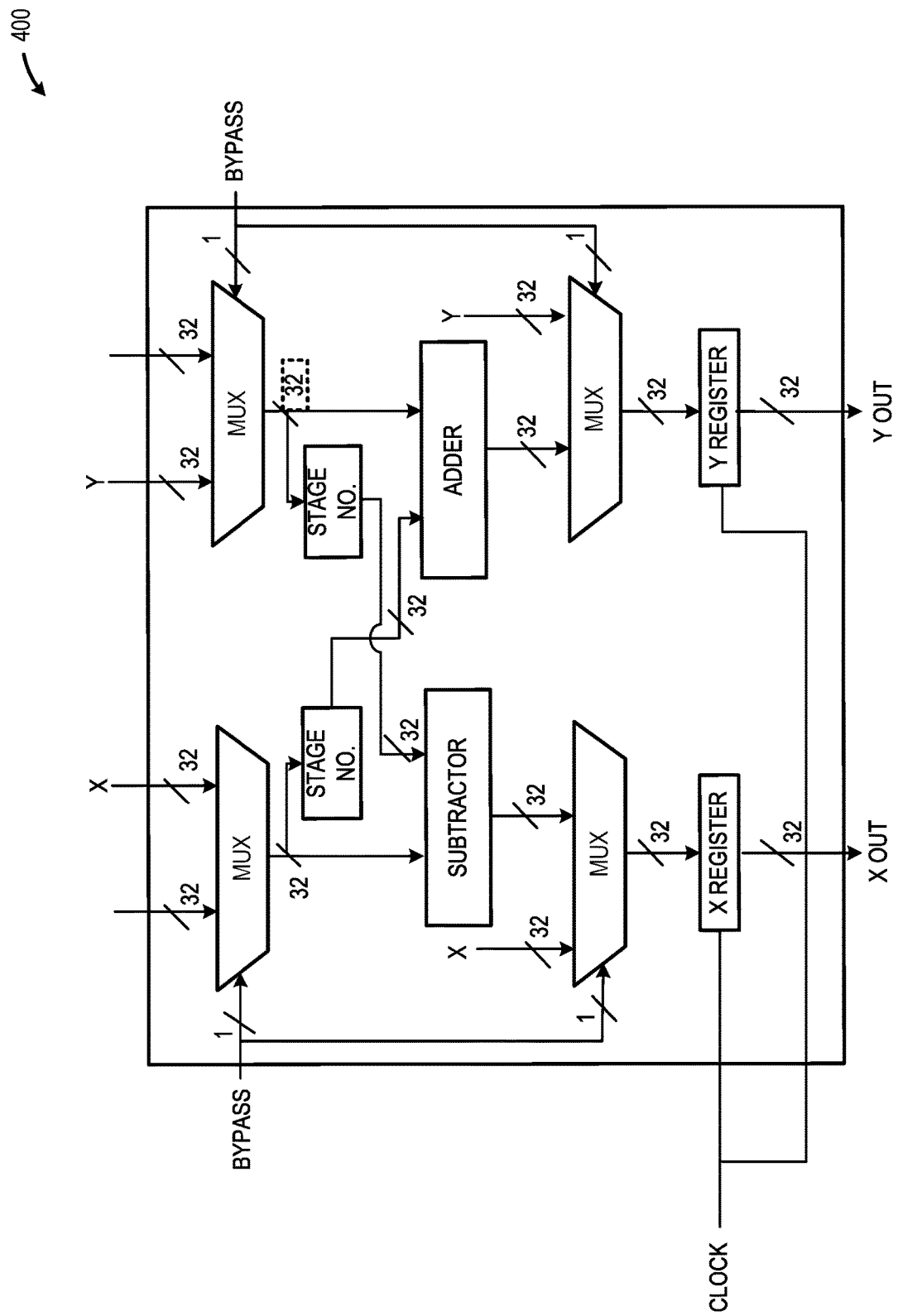
FIG. 4 is a schematic diagram of an illustrative CORDIC circuit that provides a cell or node useful in implementing the cosine function operation implemented by the systolic array circuit, in accordance with at least one embodiment described herein

FIG. 4 is a schematic diagram of an illustrative CORDIC circuit 400 that provides a cell or node useful in implementing the cosine operation implemented by the systolic array circuit 110, in accordance with at least one embodiment described herein. As depicted in FIGS. 1-3, each systolic array circuit 110 may be used to perform either a discrete cosine transform or an inverse discrete cosine transform. In embodiments, for a given 2-D spatial data sequence $x(i, j)$, $0 \le i, j \le N-1$, the corresponding two-dimensional discrete cosine transform data sequence $X(u, v)$, $0 \le u, v \le N-1$, may be determined as follows:

$$X(u, v) = \frac{2}{N} C(u) C(v) \sum_{i=0}^{N-1} \sum_{j=0}^{N-1} x(i, j) \cos \frac{(2i+1)u\pi}{2N} \cdot \cos \frac{(2j+1)v\pi}{2N} \quad (1)$$

where, $$C(u), C(v) = 1/\sqrt{2} \text{ for } u, \quad (2)$$
$$v = 0; C(u), C(v) = 1/\sqrt{2} \text{ for } u, v > 0$$

In embodiments, the corresponding inverse discrete cosine transform may be determined as follows:

$$x(i, j) = \frac{2}{N} C(u) C(v) \sum_{i=0}^{N-1} \sum_{j=0}^{N-1} X(u, v) \cos \frac{(2i+1)u\pi}{2N} \cdot \cos \frac{(2j+1)v\pi}{2N} \quad (3)$$

where, $$C(u), C(v) = 1/\sqrt{2} \text{ for } u, \quad (4)$$
$$v = 0; C(u), C(v) = 1/\sqrt{2} \text{ for } u, v > 0$$

Since both equations are very similar, the same CORDIC hardware implementation may beneficially be used for perform both DCT and IDCT. Using equations (1) and (2) above, the cosine term may be determined using the CORDIC algorithm. The CORDIC algorithm is an iterative algorithm where the value converges after multiple iterations. To achieve a balance between latency and accuracy using such an iterative algorithm, the algorithm may be implements in a systolic array form, such as depicted in FIGS. 1-3. In embodiments, the CORDIC algorithm may be given as:

$$\begin{bmatrix} x_i \\ y_i \end{bmatrix} = \text{scaling factor } K * \left( \begin{bmatrix} 1 & -2^{-i} \\ 2^{-i} & 1 \end{bmatrix} * \begin{bmatrix} x_{i-1} \\ y_{i-1} \end{bmatrix} \right) \quad (5)$$

where:

$$\text{Scaling factor } K = \frac{1}{\sqrt{1+2^{-2i}}} \quad (6)$$

and, i=iteration number.

The scaling factor K gets multiplied with the last CORDIC stage in systolic array only, beneficially limiting the number of multipliers required in implementation. FIG. 4 depicts an illustrative cell or node 400 that may be used to implement the cosine functions required for DCT/IDCT as the systolic array circuit 110.

Figure 5:
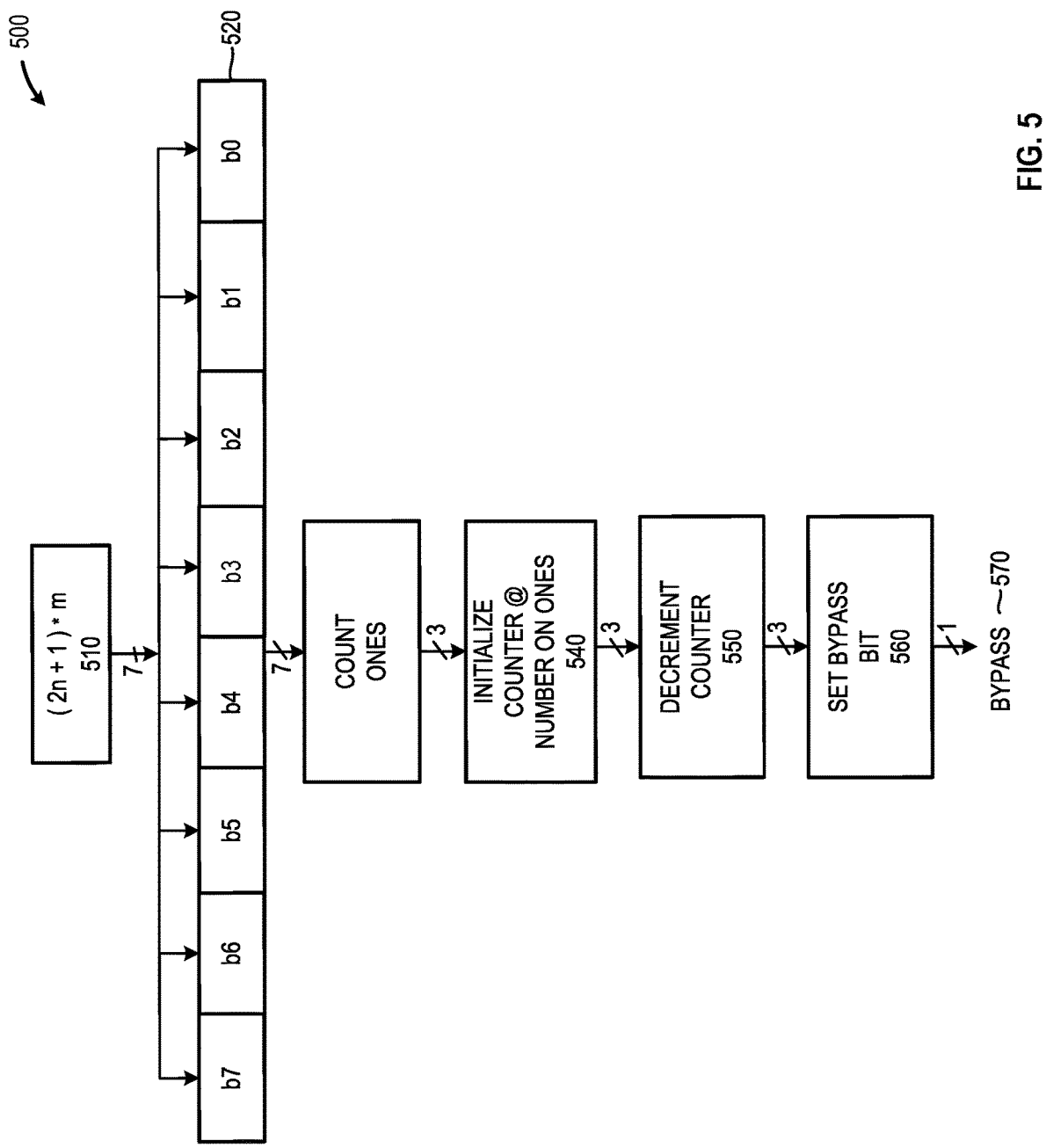
FIG. 5 is a schematic diagram of an illustrative determination method for determining the bypass bit used in the CORDIC algorithm depicted in FIG. 4, in accordance with at least one embodiment described herein.

FIG. 5 is a schematic diagram of an illustrative determination method 500 for determining the bypass bit used in the CORDIC algorithm depicted in FIG. 4, in accordance with at least one embodiment described herein. As depicted in FIG. 5, at 510, using values for n and m, the systolic array circuitry determines a value according to:

$$\text{value} = (2n+1) \times m \quad (7)$$

If m=0, the cosine term is eliminated since cos(0)=1. Using the following equation:

$$\text{Value} = \cos\left[(\text{max value}) * \frac{\pi}{2N}\right] \quad (8)$$

For example, at n=7 and m=7, the maximum value is 105. This value can be converted to a 7-bit vector 520. At 530, the number of non-zero values in the 7-bit vector 520 determines the minimum number of CORDIC stages needed for convergence. In embodiments, at 540 a counter circuit may be initialized at the value equal to the number of stages or iterations based on the number of non-zero elements in the vector 520. At 550, the counter circuit decrements for each clock cycle/step through the systolic array circuitry 110 used to implement the CORDIC algorithm. If the counter circuit counts out, the counter circuit stalls until reinitialized. At 560, after the counter circuit counts out, the counter circuit sets the bypass bit 570 to a defined first logical state (e.g., a logical value of "1"), the bypass bit 570 resets to a defined second logical state (e.g., a logical value of "0") when the counter circuit reinitializes.

Figure 6:
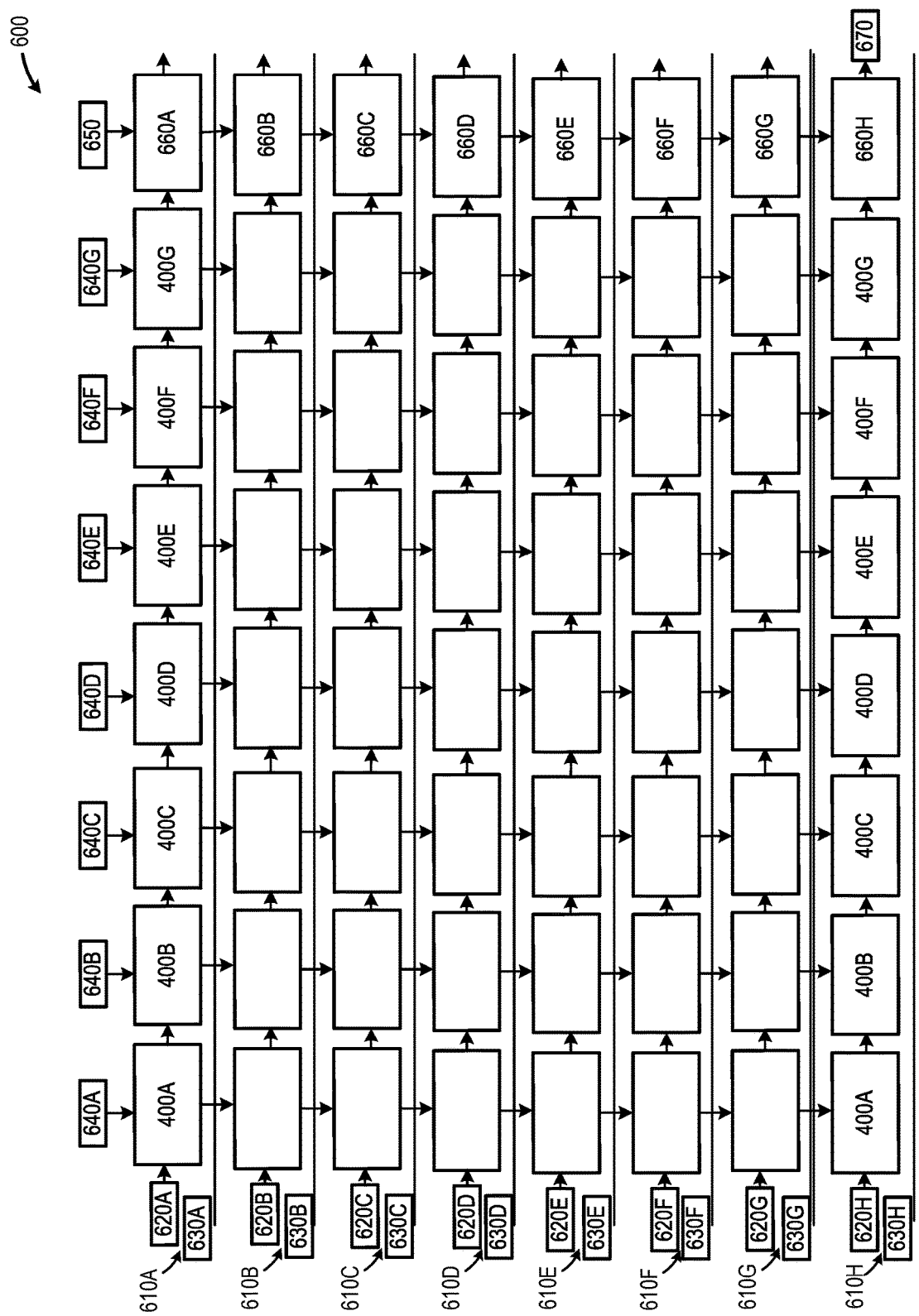
FIG. 6 is a block diagram of a systolic array including a plurality of CORDIC arrays, each of the CORDIC arrays incorporating a plurality of CORDIC circuit stages, such as depicted in FIG. 4, in accordance with at least one embodiment described herein.

FIG. 6 is a block diagram of a systolic array including a plurality of CORDIC arrays 610A-610H, each of the CORDIC arrays incorporating a plurality of CORDIC circuit stages 400A-400H, such as depicted in FIG. 4, in accordance with at least one embodiment described herein. Each of the CORDIC arrays 610A-610H receives a respective input signal 620A-620H and a respective clock signal 630A-630H. Each of the CORDIC circuit stages 400A-400H forming each of the CORDIC arrays 610A-610H receives a respective bypass signal 640A-640H. Each of the CORDIC arrays 610A-610H includes a respective multiplier circuit 660A-660H that multiplies the resultant value generated by the CORDIC array 610 by a multiplier value 650. The DCT/IDCT system 600 generates a systolic array output matrix 160.

In embodiments, each of the inputs 620 passes through a number of CORDIC circuit stages 400A-400H. The number of CORDIC circuits 400 through which each input 620 passes may, in some embodiments, be based upon the desired precision of the values included in the systolic array output matrix 160. Upon achieving a desired or sufficient level of precision and/or accuracy in the values for inclusion in the systolic array output matrix 160, the bypass signal 640 causes the termination of the CORDIC algorithm on the respective input value 620. The multiplier circuit 660 then multiplies the resultant value provided by the CORDIC array 610 by the constant value 650. The resultant scaled cosine/arccosine value is then forwarded for inclusion in the systolic array output matrix 160.

Each systolic array circuitry 110 that implements CORDIC produces, as a systolic array output matrix 112, an array having multiple cosine/arccosine terms. The cosine/arccosine terms are stored as a matrix. For example, if N=8, the systolic array output 112A from the first systolic array circuit 110A will be an 8×1 matrix (hereinafter, "T") that contains cosine values and the systolic array output 112B from the second systolic array circuit 110B will be a second 8×1 matrix (hereinafter, "$T_1$") that contains cosine values. Taking the transpose of systolic array output 112B matrix $T_1$ and performing a multiplication with systolic array output 112A matrix T and x(i, j) provides the following:

$$J_{8\times8} = T_{8\times1} * T_{1,1\times8}^T \quad (9)$$

To perform a discrete cosine transform (DCT), the above yields:

$$X(u, v)_{8 \times 8} = \frac{2}{N}(J_{8\times8} * x(i, j)_{8\times8}) \quad (10)$$

To perform an inverse discrete cosine transform (IDCT), the above yields:

$$x(i, j)_{8 \times 8} = \frac{2}{N}(J_{8\times8} * X(u, v)_{8\times8}) \quad (11)$$

Figure 7:
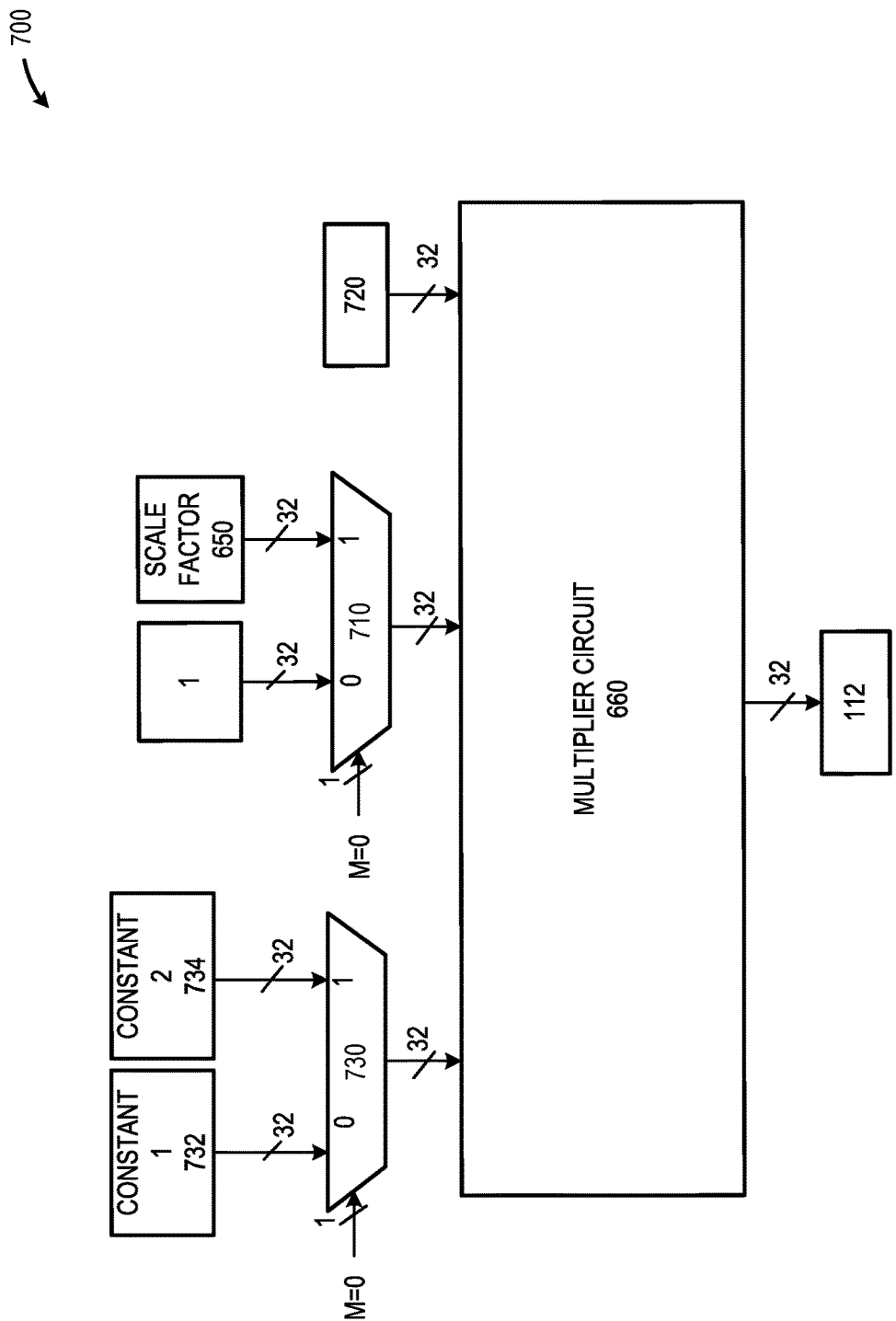
FIG. 7 is a schematic diagram of an illustrative multiplier circuit to combine a value representative of a constant scaling factor with the output generated by a CORDIC array such as depicted in FIG. 6, in accordance with at least one embodiment described herein.

FIG. 7 is a schematic diagram of an illustrative multiplier circuit 660 to combine a value representative of a constant scaling factor 650 with the output generated by a CORDIC array 610 such as depicted in FIG. 6, in accordance with at least one embodiment described herein. As depicted in FIG. 7, the multiplier circuit 660 receives three input values: the output value from a first multiplexer 710, the resultant value 720 of the CORDIC array 610; and the output value from a second multiplexer 730. The multiplier circuit 660 mathematically combines the input values to provide the systolic array output value 112. In embodiments, the first multiplexer circuit 710 transfers to the multiplier circuit 660 either a value of "1" where the input value is equal to "cosine(0)" and a value corresponding to a defined value representative of the constant scaling factor 650 for all other input values. In embodiments, the second multiplier circuit 730 transfers to the multiplier circuit 660 either a defined first constant value 732 where the input value is equal to "cosine(0)" and a defined second constant value 734 for all other input values.

Figure 8:
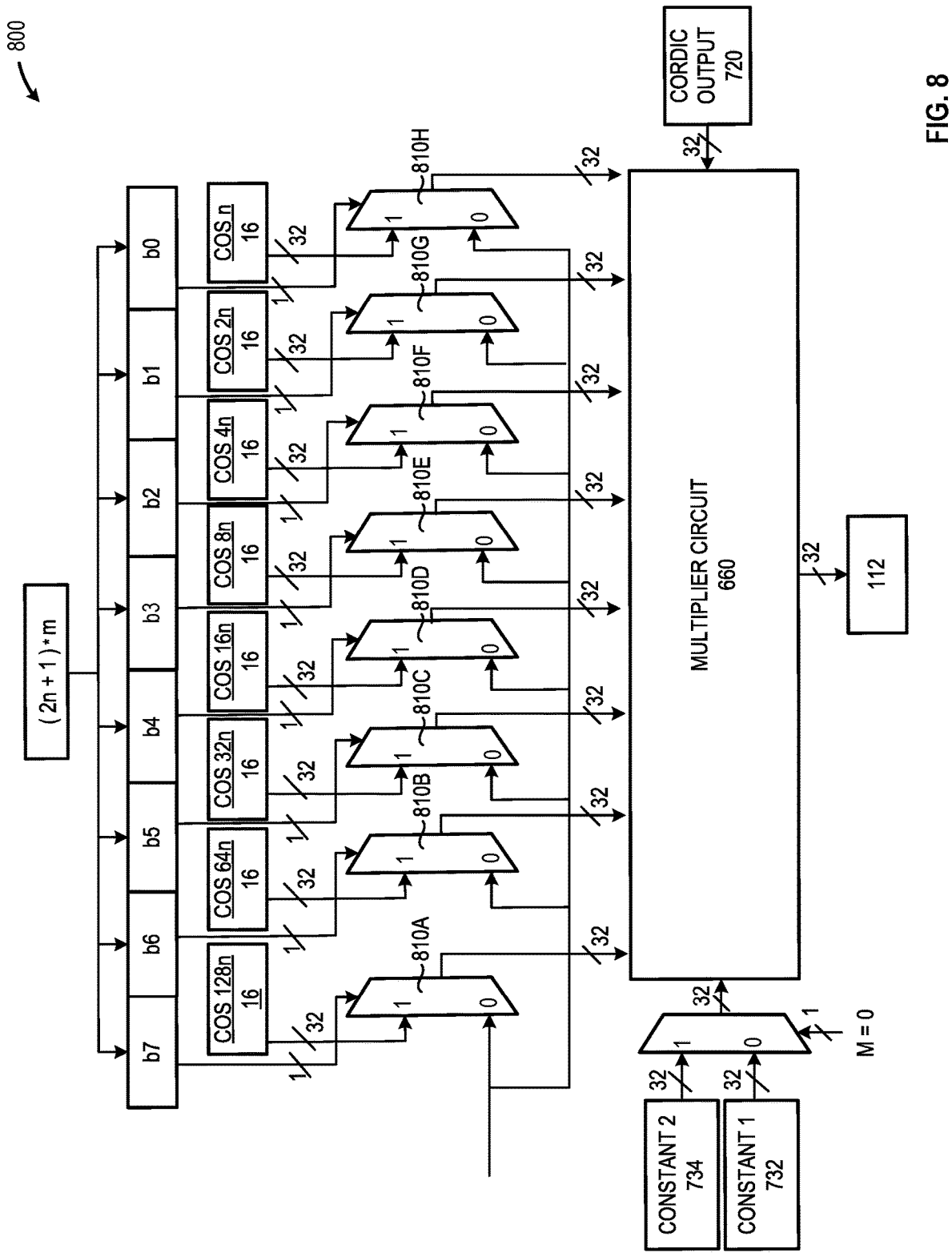
FIG. 8 is a schematic diagram of an illustrative multiplier circuit that combines a value representative of a cosine scaling factor with the output value generated by a CORDIC array such as depicted in FIG. 6 in accordance with at least one embodiment described herein.

FIG. 8 is a schematic diagram of an illustrative multiplier circuit 660 that combines a value representative of a cosine scaling factor 650 with the output value generated by a CORDIC array 610 such as depicted in FIG. 6 in accordance with at least one embodiment described herein. In some embodiments, the accuracy of the scaling factor such as used in the example depicted in FIG. 7 is insufficient. In such embodiments, the actual cosine/arccosine value may be used to provide the scaling factor. The embodiment depicted in FIG. 8 provides one example implementation of using the cosine value as a scaling factor. In the embodiment depicted in FIG. 8, the actual cosine values are pre-determined and stored in memory circuitry coupled to the DCT/IDCT control circuitry 130. The multiplexer circuits 810A-810H select the appropriate cosine value based on a 7-bit input (i.e., an example where n=8). The multiplier circuit 660 thus receives the following: The cosine value selected by the multiplexer circuitry 810A-810H; the resultant value 720 of the CORDIC array 610; and the output value from a second multiplexer 730.

Figure 9:
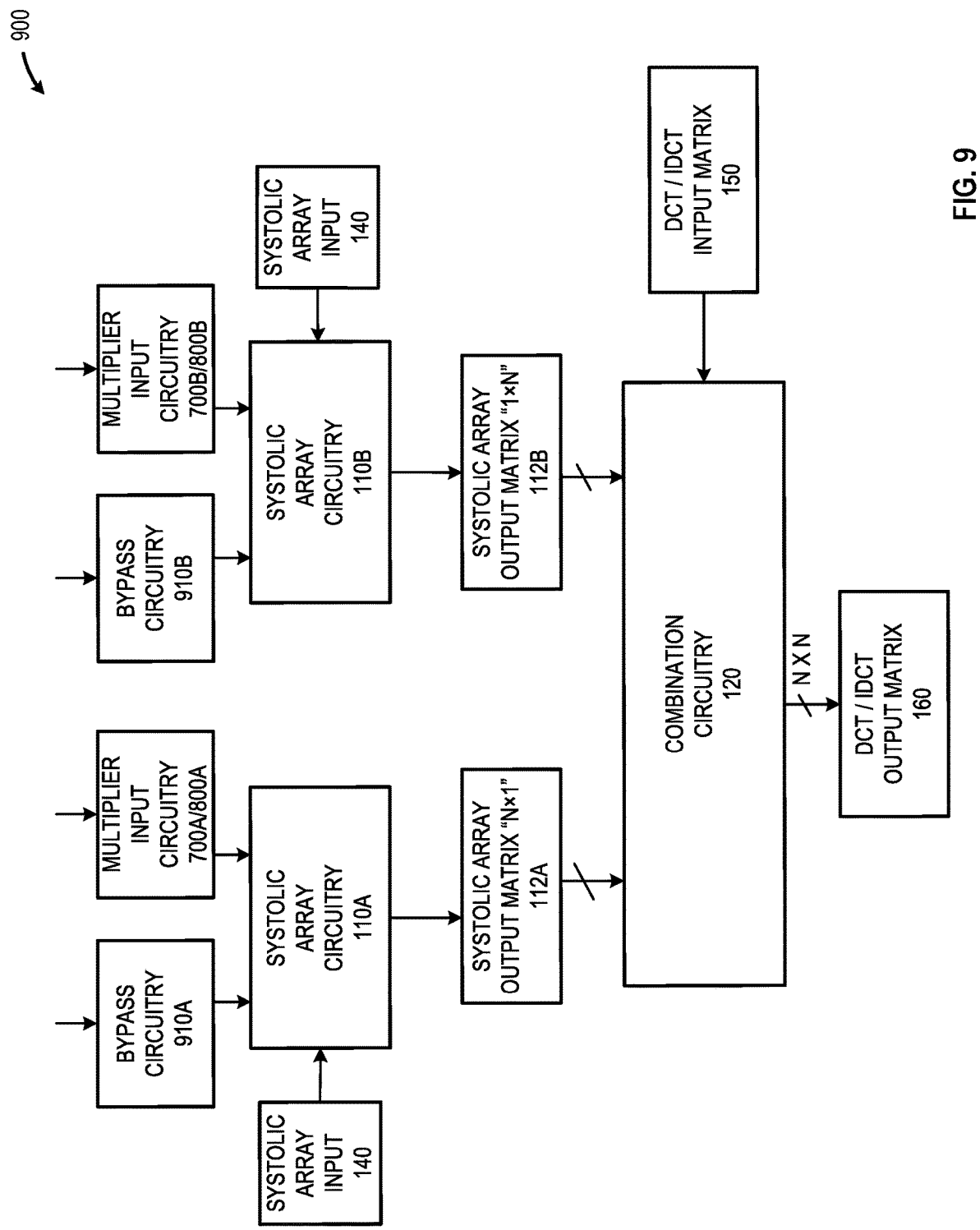
FIG. 9 is a block diagram of an illustrative two-dimensional (2D) system for determining a DCT/IDCT using two parallel systolic array circuits, in accordance with at least one embodiment described herein.

FIG. 9 is a block diagram of an illustrative two-dimensional (2D) system 900 for determining a DCT/IDCT using two parallel systolic array circuits 110A, 110B, in accordance with at least one embodiment described herein. As depicted in FIG. 9, bypass circuitry 910A, 910B communicates a bypass signal to respective ones of the systolic array circuits 110A, 110B. Similarly, in some embodiments, multiplier circuitry 700A, 700B provides a signal containing data representative of a scaling factor to respective ones of the systolic array circuits 110A, 110B. In other embodiments, multiplier circuitry 800A, 800B provides a signal containing data representative of actual cosine value scaling factors to respective ones of the systolic array circuits 110A, 110B.

Figure 10:
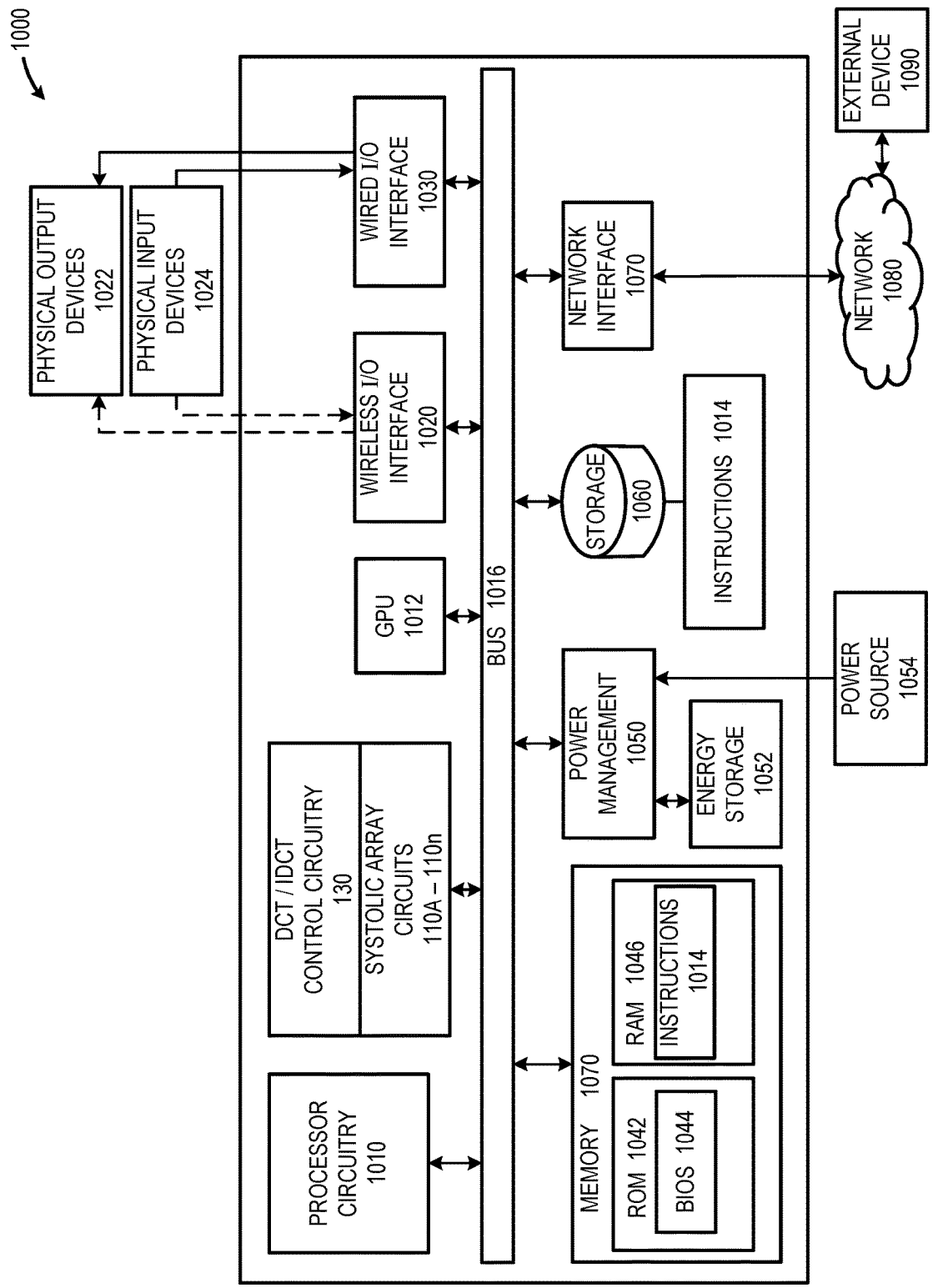
FIG. 10 is a schematic diagram of an illustrative electronic, processor-based, device that includes a central processing unit (CPU) or processor circuitry and DCT/DCT control circuitry 130, and one or more systolic array circuits, in accordance with at least one embodiment described herein.

FIG. 10 is a schematic diagram of an illustrative electronic, processor-based, device 1000 that includes a central processing unit (CPU) or processor circuitry 1010 and DCT/DCT control circuitry 130, and one or more systolic array circuits 110A-110n, in accordance with at least one embodiment described herein. The processor-based device 1000 may additionally include graphical processing unit (GPU) circuitry 1012. The processor-based device 1000 may additionally include one or more of the following: a wireless input/output (I/O) interface 1020, a wired I/O interface 1030, system memory circuitry 1040, power management circuitry 1050, a non-transitory storage device 1060, and a network interface 1070 used to communicatively couple the processor-based device 1000 to one or more external devices (e.g., a cloud-based server) 1090 via one or more networks 1080. The following discussion provides a brief, general description of the components forming the illustrative processor-based device 1000. Example, non-limiting processor-based devices 1000 may include, but are not limited to: autonomous motor vehicles, semi-autonomous motor vehicles, manually controlled motor vehicles, smartphones, wearable computers, portable computing devices, handheld computing devices, desktop computing devices, blade server devices, workstations, and similar.

Those skilled in the relevant art will appreciate that the illustrated embodiments as well as other embodiments may be practiced with other processor-based device configurations, including portable electronic or handheld electronic devices, for instance smartphones, portable computers, wearable computers, consumer electronics, personal computers ("PCs"), network PCs, minicomputers, server blades, mainframe computers, and the like. The processor circuitry 1010 may include any number of hardwired or configurable circuits, some or all of which may include programmable and/or configurable combinations of electronic components, semiconductor devices, and/or logic elements that are disposed partially or wholly in a PC, server, or other computing system capable of executing machine-readable instructions.

The processor-based device 1000 includes a bus or similar communications link 1016 that communicably couples and facilitates the exchange of information and/or data between various system components including the processor circuitry 1010, the graphics processor circuitry 1012, one or more wireless I/O interfaces 1020, one or more wired I/O interfaces 1030, the system memory 1040, one or more storage devices 1060, and/or the network interface circuitry 1070. The processor-based device 1000 may be referred to in the singular herein, but this is not intended to limit the embodiments to a single processor-based device 1000, since in certain embodiments, there may be more than one processor-based device 1000 that incorporates, includes, or contains any number of communicably coupled, collocated, or remote networked circuits or devices.

The processor circuitry 1010 may include any number, type, or combination of currently available or future developed devices capable of executing machine-readable instruction sets. The processor circuitry 1010 may include but is not limited to any current or future developed single- or multi-core processor or microprocessor, such as: on or more systems on a chip (SOCs); central processing units (CPUs); digital signal processors (DSPs); graphics processing units (GPUs); application-specific integrated circuits (ASICs), programmable logic units, field programmable gate arrays (FPGAs), and the like. Unless described otherwise, the construction and operation of the various blocks shown in FIG. 10 are of conventional design. Consequently, such blocks need not be described in further detail herein, as they will be understood by those skilled in the relevant art. The bus 1016 that interconnects at least some of the components of the processor-based device 1000 may employ any currently available or future developed serial or parallel bus structures or architectures.

The system memory 1040 may include read-only memory ("RM") 1042 and random access memory ("RAM") 1046. A portion of the ROM 1042 may be used to store or otherwise retain a basic input/output system ("BIOS") 1044. The BIOS 1044 provides basic functionality to the processor-based device 1000, for example by causing the processor circuitry 1010 to load and/or execute one or more machine-readable instruction sets 1014. In embodiments, at least some of the one or more machine-readable instruction sets 1014 cause at least a portion of the processor circuitry 1010 to provide, create, produce, transition, and/or function as a dedicated, specific, and particular machine.

The processor-based device 1000 may include at least one wireless input/output (I/O) interface 1020. The at least one wireless I/O interface 1020 may be communicably coupled to one or more physical output devices 1022 (tactile devices, video displays, audio output devices, hardcopy output devices, etc.). The at least one wireless I/O interface 1020 may communicably couple to one or more physical input devices 1024 (pointing devices, touchscreens, keyboards, tactile devices, etc.). The at least one wireless I/O interface 1020 may include any currently available or future developed wireless I/O interface. Example wireless I/O interfaces include, but are not limited to: BLUETOOTH®, near field communication (NFC), and similar.

The processor-based device 1000 may include one or more wired input/output (I/O) interfaces 1030. The at least one wired I/O interface 1030 may be communicably coupled to one or more physical output devices 1022 (tactile devices, video displays, audio output devices, hardcopy output devices, etc.). The at least one wired I/O interface 1030 may be communicably coupled to one or more physical input devices 1024 (pointing devices, touchscreens, keyboards, tactile devices, etc.). The wired I/O interface 1030 may include any currently available or future developed I/O interface. Example wired I/O interfaces include but are not limited to: universal serial bus (USB), IEEE 1394 ("Fire-Wire"), and similar.

The processor-based device 1000 may include one or more communicably coupled, non-transitory, data storage devices 1060. The data storage devices 1060 may include one or more hard disk drives (HDDs) and/or one or more solid-state storage devices (SSDs). The one or more data storage devices 1060 may include any current or future developed storage appliances, network storage devices, and/or systems. Non-limiting examples of such data storage devices 1060 may include, but are not limited to, any current or future developed non-transitory storage appliances or devices, such as one or more magnetic storage devices, one or more optical storage devices, one or more electro-resistive storage devices, one or more molecular storage devices, one or more quantum storage devices, or various combinations thereof. In some embodiments, the one or more data storage devices 1060 may include one or more removable storage devices, such as one or more flash drives, flash memories, flash storage units, or similar appliances or devices capable of communicable coupling to and decoupling from the processor-based device 1000.

The one or more data storage devices 1060 may include interfaces or controllers (not shown) communicatively coupling the respective storage device or system to the bus 1016. The one or more data storage devices 1060 may store, retain, or otherwise contain machine-readable instruction sets, data structures, program modules, data stores, databases, logical structures, and/or other data useful to the processor circuitry 1010 and/or graphics processor circuitry 1012 and/or one or more applications executed on or by the processor circuitry 1010 and/or graphics processor circuitry 1012. In some instances, one or more data storage devices 1060 may be communicably coupled to the processor circuitry 1010, for example via the bus 1016 or via one or more wired communications interfaces 1030 (e.g., Universal Serial Bus or USB); one or more wireless communications interfaces 1020 (e.g., Bluetooth®, Near Field Communication or NFC); and/or one or more network interfaces 1070 (IEEE 802.3 or Ethernet, IEEE 802.11, or WiFi®, etc.).

Machine-readable instruction sets 1014 and other programs, applications, logic sets, and/or modules may be stored in whole or in part in the system memory 1040. Such instruction sets 1014 may be transferred, in whole or in part, from the one or more data storage devices 1060. The instruction sets 1014 may be loaded, stored, or otherwise retained in system memory 1040, in whole or in part, during execution by the processor circuitry 1010 and/or graphics processor circuitry 1012.

The processor-based device 1000 may include power management circuitry 1050 that controls one or more operational aspects of the energy storage device 1052. In embodiments, the energy storage device 1052 may include one or more primary (i.e., non-rechargeable) or secondary (i.e., rechargeable) batteries or similar energy storage devices. In embodiments, the energy storage device 1052 may include one or more supercapacitors or ultracapacitors. In embodiments, the power management circuitry 1050 may alter, adjust, or control the flow of energy from an external power source 1054 to the energy storage device 1052 and/or to the processor-based device 1000. The power source 1054 may include, but is not limited to, a solar power system, a commercial electric grid, a portable generator, an external energy storage device, or any combination thereof.

For convenience, the processor circuitry 1010, the GPU circuitry 1012, the wireless I/O interface 1020, the wired I/O interface 1030, the system memory circuitry 1040, the power management circuitry 1050, the storage device 1060, and the network interface 1070 are illustrated as communicatively coupled to each other via the bus 1016, thereby providing connectivity between the above-described components. In alternative embodiments, the above-described components may be communicatively coupled in a different manner than illustrated in FIG. 10. For example, one or more of the above-described components may be directly coupled to other components, or may be coupled to each other, via one or more intermediary components (not shown). In another example, one or more of the above-described components may be integrated into the processor circuitry 1010 and/or the graphics processor circuitry 1012. In some embodiments, all or a portion of the bus 1016 may be omitted and the components are coupled directly to each other using suitable wired or wireless connections.

Figure 11:
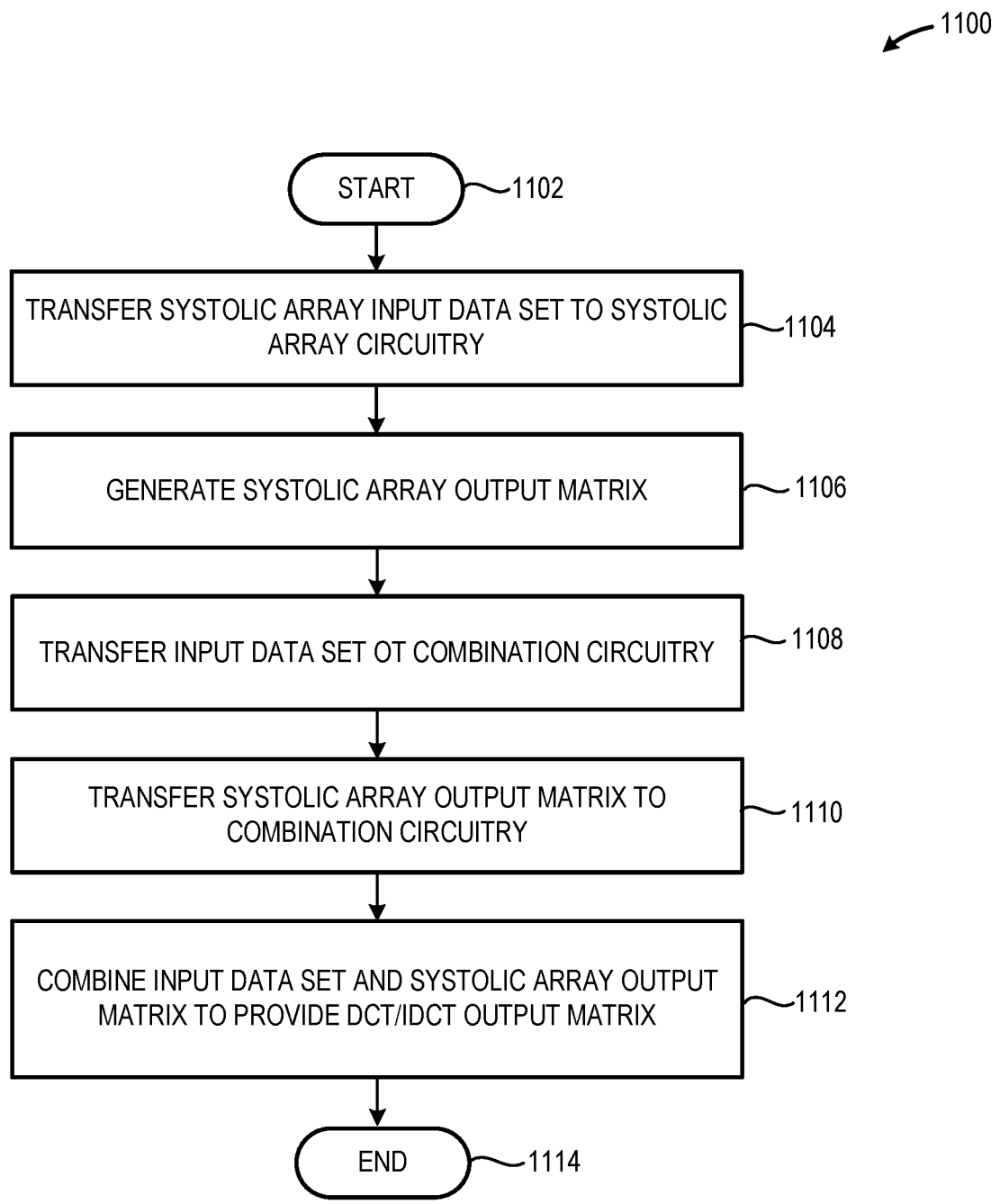
FIG. 11 is a high-level flow diagram of an illustrative method of performing a DCT/IDCT using one or more systolic array circuits, each implementing a CORDIC algorithm, to determine cosine/arccosine values and a combination circuit to combine the cosine/arccosine values with a DCT/IDCT input matrix, in accordance with at least one embodiment described herein.

FIG. 11 is a high-level flow diagram of an illustrative method 1100 of performing a DCT/IDCT using one or more systolic array circuits 110A-110$n$, each implementing a CORDIC algorithm, to determine cosine/arccosine values and a combination circuit 120 to combine the cosine/arccosine values with a DCT/IDCT input matrix 150, in accordance with at least one embodiment described herein. The method 1100 beneficially performs the DCT/IDCT operation without using a look-up table, thereby avoiding the need for memory circuitry to store cosine values and also conserving semiconductor package real estate. The method commences at 1102.

At 1104, the DCT/IDCT control circuitry 130 causes the transfer of a systolic array input data set 140 to each respective one of one or more systolic array circuits 110A-110$n$.

At 1106, each of the one or more systolic array circuits 110A-110$n$ generates a respective systolic array output matrix 112A-112$n$. Each of the systolic array output matrices 112 includes cosine/arccosine values determined using a CORDIC algorithm based on the systolic array input data set 140 provided to each respective one of the one or more systolic array circuits 110.

At 1108, the DCT/IDCT control circuitry 130 causes the transfer of a DCT/IDCT input data set 150 to the combination circuitry 120.

At 1110, the DCT/IDCT control circuitry 130 causes the transfer of the systolic array output matrices 112 to the combination circuitry 120.

At 1112, the combination circuitry 120 combines the DCT/IDCT input data set 150 with the systolic array output matrices 112 to provide the DCT/IDCT output matrix 160. The method 1100 concludes at 1114.

Figure 12:
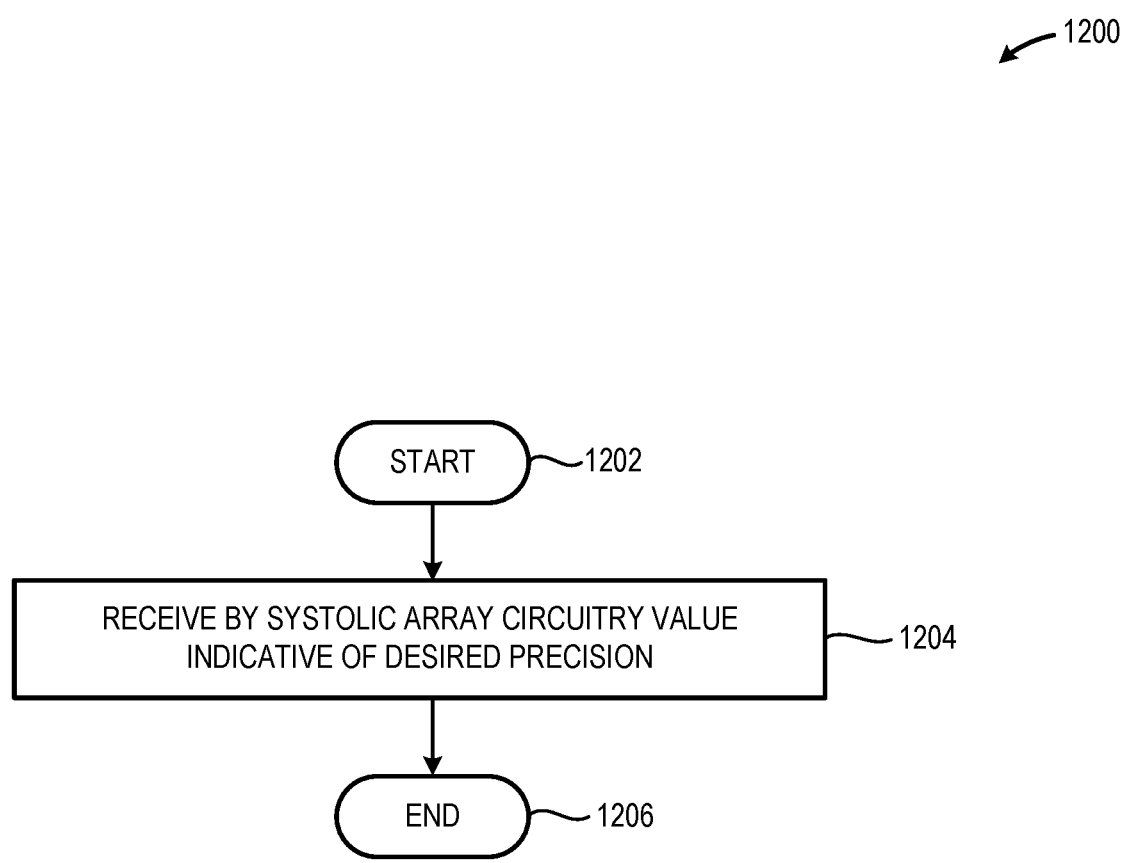
FIG. 12 is a high-level logic flow diagram of an illustrative method of providing data representative of a desired tolerance or accuracy in the values provided by each of the CORDIC arrays implemented by the systolic array circuits, in accordance with at least one embodiment described herein.

FIG. 12 is a high-level logic flow diagram of an illustrative method 1200 of providing data representative of a desired tolerance or accuracy in the values provided by each of the CORDIC arrays 610 implemented by the systolic array circuits 110A-110$n$, in accordance with at least one embodiment described herein. The method 1200 commences at 1202.

At 1204, the DCT/IDCT control circuitry 130 receives one or more signals that include information and/or data associated with a desired level of accuracy in the cosine/ arccosine values returned by the CORDIC algorithm implemented by the systolic array circuitry. In some implementations, the DCT/IDCT control circuitry 130 may communicate a "bypass bit" or similar signal that causes one or more of the CORDIC circuits 400A-400n included in the systolic array circuits 110A-110n. The method 1200 concludes at 1206.

Embodiments of the instruction(s) detailed above are embodied may be embodied in a "generic vector friendly instruction format" which is detailed below. In other embodiments, such a format is not utilized and another instruction format is used, however, the description below of the writemask registers, various data transformations (swizzle, broadcast, etc.), addressing, etc. is generally applicable to the description of the embodiments of the instruction(s) above. Additionally, exemplary systems, architectures, and pipelines are detailed below. Embodiments of the instruction(s) above may be executed on such systems, architectures, and pipelines, but are not limited to those detailed.

An instruction set may include one or more instruction formats. A given instruction format may define various fields (e.g., number of bits, location of bits) to specify, among other things, the operation to be performed (e.g., opcode) and the operand(s) on which that operation is to be performed and/or other data field(s) (e.g., mask). Some instruction formats are further broken down though the definition of instruction templates (or subformats). For example, the instruction templates of a given instruction format may be defined to have different subsets of the instruction format's fields (the included fields are typically in the same order, but at least some have different bit positions because there are less fields included) and/or defined to have a given field interpreted differently. Thus, each instruction of an ISA is expressed using a given instruction format (and, if defined, in a given one of the instruction templates of that instruction format) and includes fields for specifying the operation and the operands. For example, an exemplary ADD instruction has a specific opcode and an instruction format that includes an opcode field to specify that opcode and operand fields to select operands (source1/destination and source2); and an occurrence of this ADD instruction in an instruction stream will have specific contents in the operand fields that select specific operands. A set of SIMD extensions referred to as the Advanced Vector Extensions (AVX) (AVX1 and AVX2) and using the Vector Extensions (VEX) coding scheme has been released and/or published (e.g., see Intel® 64 and IA-32 Architectures Software Developer's Manual, September 2014; and see Intel® Advanced Vector Extensions Programming Reference, October 2014).

Exemplary Instruction Formats

Embodiments of the instruction(s) described herein may be embodied in different formats. Additionally, exemplary systems, architectures, and pipelines are detailed below. Embodiments of the instruction(s) may be executed on such systems, architectures, and pipelines, but are not limited to those detailed.

Generic Vector Friendly Instruction Format

A vector friendly instruction format is an instruction format that is suited for vector instructions (e.g., there are certain fields specific to vector operations). While embodiments are described in which both vector and scalar operations are supported through the vector friendly instruction format, alternative embodiments use only vector operations the vector friendly instruction format.

Figure 13A:
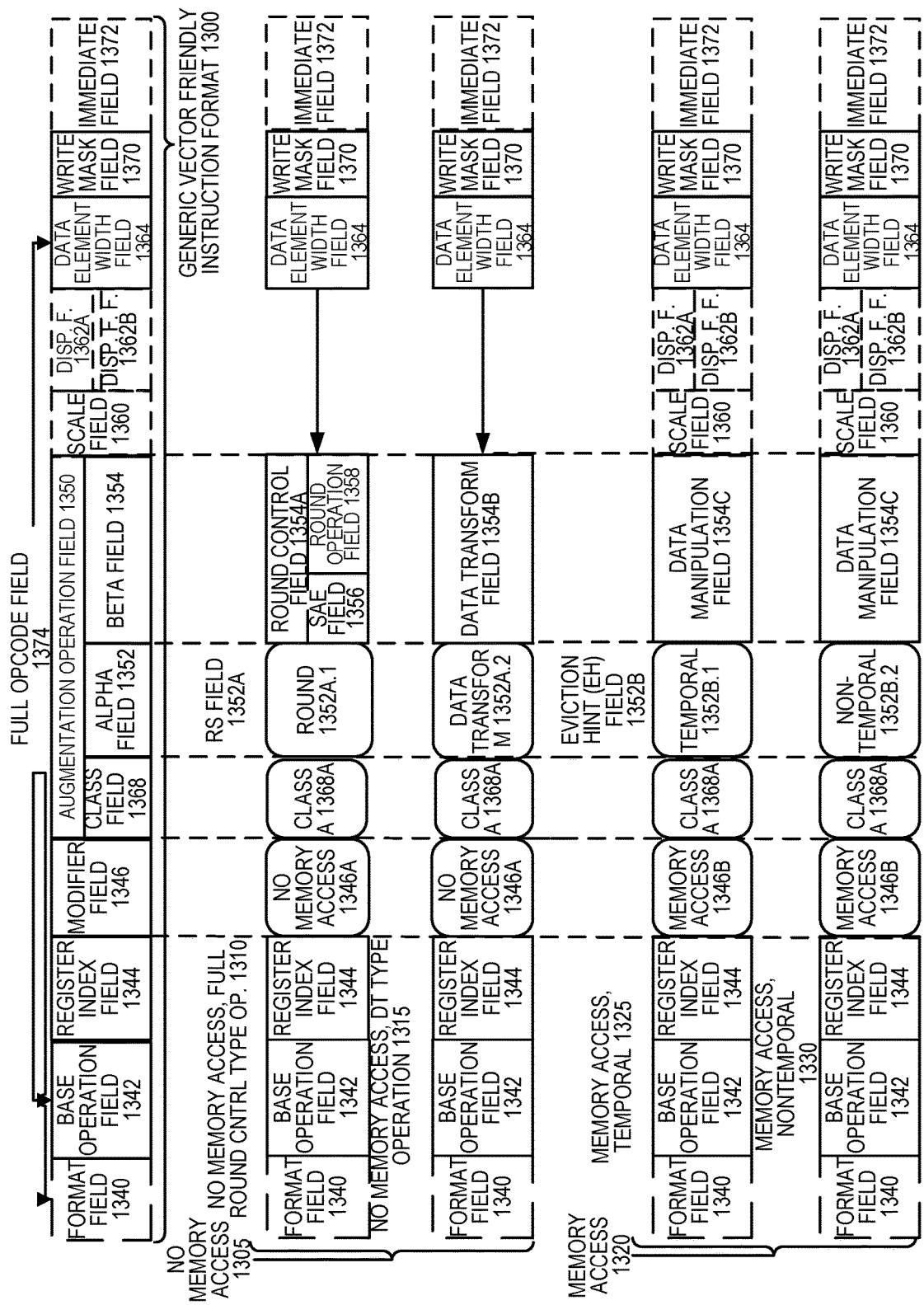
FIGS. 13A and 13B are block diagrams illustrating a generic vector friendly instruction format and instruction templates thereof according to embodiments of the invention.
Figure 13B:
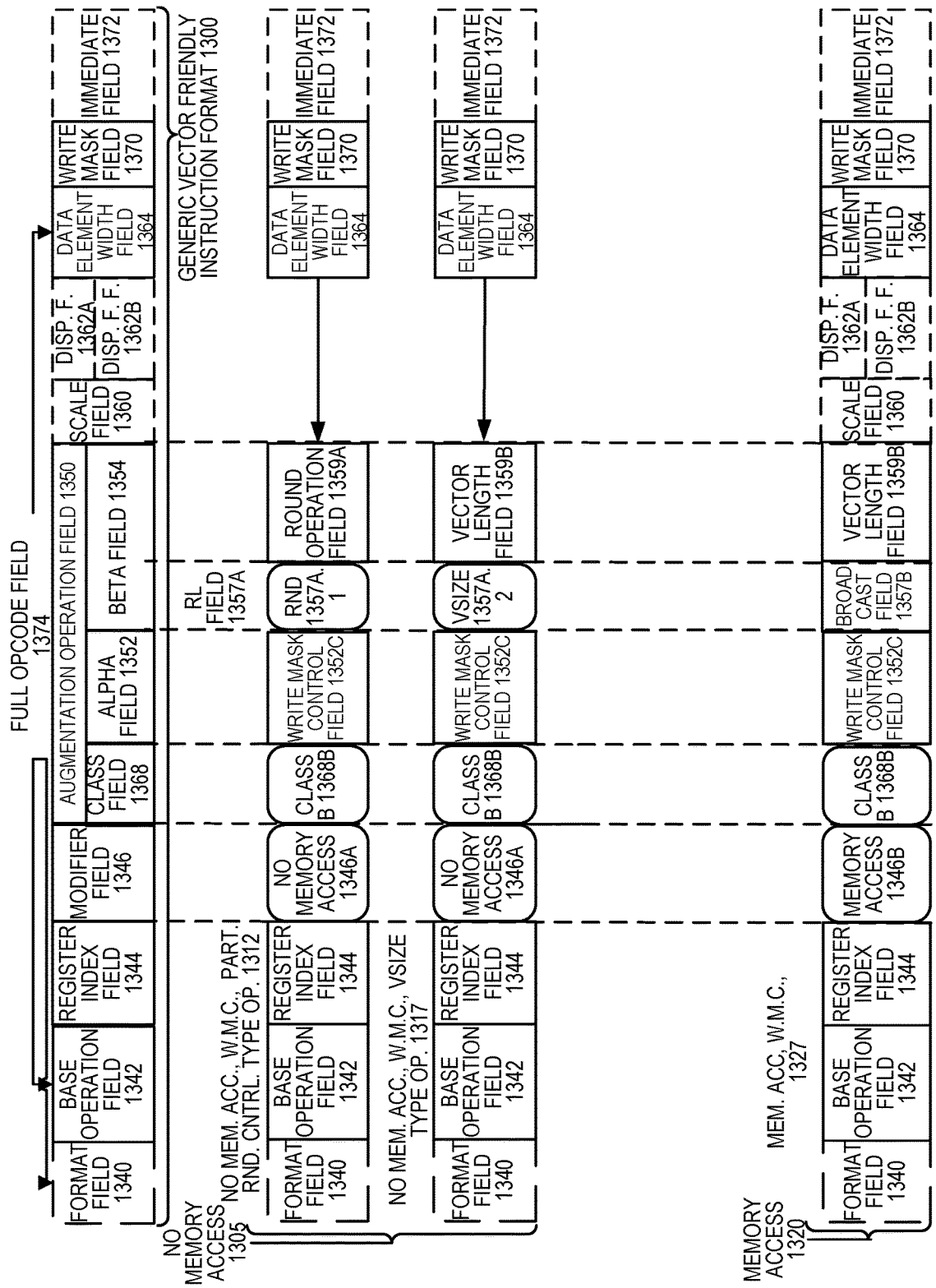

FIGS. 13A and 13B are block diagrams illustrating a generic vector friendly instruction format and instruction templates thereof according to embodiments of the invention. FIG. 13A is a block diagram illustrating a generic vector friendly instruction format and class A instruction templates thereof according to embodiments of the invention; while FIG. 13B is a block diagram illustrating the generic vector friendly instruction format and class B instruction templates thereof according to embodiments of the invention. Specifically, a generic vector friendly instruction format 1300 for which are defined class A and class B instruction templates, both of which include no memory access 1305 instruction templates and memory access 1320 instruction templates. The term generic in the context of the vector friendly instruction format refers to the instruction format not being tied to any specific instruction set.

While embodiments of the invention will be described in which the vector friendly instruction format supports the following: a 64 byte vector operand length (or size) with 32 bit (4 byte) or 64 bit (8 byte) data element widths (or sizes) (and thus, a 64 byte vector consists of either 16 doubleword-size elements or alternatively, 8 quadword-size elements); a 64 byte vector operand length (or size) with 16 bit (2 byte) or 8 bit (1 byte) data element widths (or sizes); a 32 byte vector operand length (or size) with 32 bit (4 byte), 64 bit (8 byte), 16 bit (2 byte), or 8 bit (1 byte) data element widths (or sizes); and a 16 byte vector operand length (or size) with 32 bit (4 byte), 64 bit (8 byte), 16 bit (2 byte), or 8 bit (1 byte) data element widths (or sizes); alternative embodiments may support more, less and/or different vector oper- and sizes (e.g., 256 byte vector operands) with more, less, or different data element widths (e.g., 128 bit (16 byte) data element widths).

The class A instruction templates in FIG. 13A include: 1) within the no memory access 1305 instruction templates there is shown a no memory access, full round control type operation 1310 instruction template and a no memory access, data transform type operation 1315 instruction template; and 2) within the memory access 1320 instruction templates there is shown a memory access, temporal 1325 instruction template and a memory access, non-temporal 1330 instruction template. The class B instruction templates in FIG. 13B include: 1) within the no memory access 1305 instruction templates there is shown a no memory access, write mask control, partial round control type operation 1312 instruction template and a no memory access, write mask control, vsize type operation 1317 instruction template; and 2) within the memory access 1320 instruction templates there is shown a memory access, write mask control 1327 instruction template.

The generic vector friendly instruction format 1300 includes the following fields listed below in the order illustrated in FIGS. 13A-13B.

Format field 1340—a specific value (an instruction format identifier value) in this field uniquely identifies the vector friendly instruction format, and thus occurrences of instructions in the vector friendly instruction format in instruction streams. As such, this field is optional in the sense that it is not needed for an instruction set that has only the generic vector friendly instruction format.

Base operation field 1342—its content distinguishes different base operations.

Register index field 1344—its content, directly or through address generation, specifies the locations of the source and destination operands, be they in registers or in memory.

These include a sufficient number of bits to select N registers from a P×Q (e.g. 32×512, 16×128, 32×1024, 64×1024) register file. While in one embodiment N may be up to three sources and one destination register, alternative embodiments may support more or less sources and destination registers (e.g., may support up to two sources where one of these sources also acts as the destination, may support up to three sources where one of these sources also acts as the destination, may support up to two sources and one destination).

Modifier field 1346—its content distinguishes occurrences of instructions in the generic vector instruction format that specify memory access from those that do not; that is, between no memory access 1305 instruction templates and memory access 1320 instruction templates. Memory access operations read and/or write to the memory hierarchy (in some cases specifying the source and/or destination addresses using values in registers), while non-memory access operations do not (e.g., the source and destinations are registers). While in one embodiment this field also selects between three different ways to perform memory address calculations, alternative embodiments may support more, less, or different ways to perform memory address calculations.

Augmentation operation field 1350—its content distinguishes which one of a variety of different operations to be performed in addition to the base operation. This field is context specific. In one embodiment of the invention, this field is divided into a class field 1368, an alpha field 1352, and a beta field 1354. The augmentation operation field 1350 allows common groups of operations to be performed in a single instruction rather than 2, 3, or 4 instructions.

Scale field 1360—its content allows for the scaling of the index field's content for memory address generation (e.g., for address generation that uses $2^{scale}*$index+base).

Displacement Field 1362A—its content is used as part of memory address generation (e.g., for address generation that uses $2^{scale}*$index+base+displacement).

Displacement Factor Field 1362B (note that the juxtaposition of displacement field 1362A directly over displacement factor field 1362B indicates one or the other is used)—its content is used as part of address generation; it specifies a displacement factor that is to be scaled by the size of a memory access (N)—where N is the number of bytes in the memory access (e.g., for address generation that uses $2^{scale}*$index+base+scaled displacement). Redundant low-order bits are ignored and hence, the displacement factor field's content is multiplied by the memory operands total size (N) in order to generate the final displacement to be used in calculating an effective address. The value of N is determined by the processor hardware at runtime based on the full opcode field 1374 (described later herein) and the data manipulation field 1354C. The displacement field 1362A and the displacement factor field 1362B are optional in the sense that they are not used for the no memory access 1305 instruction templates and/or different embodiments may implement only one or none of the two.

Data element width field 1364—its content distinguishes which one of a number of data element widths is to be used (in some embodiments for all instructions; in other embodiments for only some of the instructions). This field is optional in the sense that it is not needed if only one data element width is supported and/or data element widths are supported using some aspect of the opcodes.

Write mask field 1370—its content controls, on a per data element position basis, whether that data element position in the destination vector operand reflects the result of the base operation and augmentation operation. Class A instruction templates support merging-writemasking, while class B instruction templates support both merging- and zeroing-writemasking. When merging, vector masks allow any set of elements in the destination to be protected from updates during the execution of any operation (specified by the base operation and the augmentation operation); in other one embodiment, preserving the old value of each element of the destination where the corresponding mask bit has a 0. In contrast, when zeroing vector masks allow any set of elements in the destination to be zeroed during the execution of any operation (specified by the base operation and the augmentation operation); in one embodiment, an element of the destination is set to 0 when the corresponding mask bit has a 0 value. A subset of this functionality is the ability to control the vector length of the operation being performed (that is, the span of elements being modified, from the first to the last one); however, it is not necessary that the elements that are modified be consecutive. Thus, the write mask field 1370 allows for partial vector operations, including loads, stores, arithmetic, logical, etc. While embodiments of the invention are described in which the write mask field's 1370 content selects one of a number of write mask registers that contains the write mask to be used (and thus the write mask field's 1370 content indirectly identifies that masking to be performed), alternative embodiments instead or additional allow the mask write field's 1370 content to directly specify the masking to be performed.

Immediate field 1372—its content allows for the specification of an immediate. This field is optional in the sense that is it not present in an implementation of the generic vector friendly format that does not support immediate and it is not present in instructions that do not use an immediate.

Class field 1368—its content distinguishes between different classes of instructions. With reference to FIGS. 13A and 13B, the contents of this field select between class A and class B instructions. In FIGS. 13A and 13B, rounded corner squares are used to indicate a specific value is present in a field (e.g., class A 1368A and class B 1368B for the class field 1368 respectively in FIGS. 13A and 13B).

Instruction Templates of Class A

In the case of the non-memory access 1305 instruction templates of class A, the alpha field 1352 is interpreted as an RS field 1352A, whose content distinguishes which one of the different augmentation operation types are to be performed (e.g., round 1352A.1 and data transform 1352A.2 are respectively specified for the no memory access, round type operation 1310 and the no memory access, data transform type operation 1315 instruction templates), while the beta field 1354 distinguishes which of the operations of the specified type is to be performed. In the no memory access 1305 instruction templates, the scale field 1360, the displacement field 1362A, and the displacement scale filed 1362B are not present.

No-Memory Access Instruction Templates—Full Round Control Type Operation

In the no memory access full round control type operation 1310 instruction template, the beta field 1354 is interpreted as a round control field 1354A, whose content(s) provide static rounding. While in the described embodiments of the invention the round control field 1354A includes a suppress all floating point exceptions (SAE) field 1356 and a round operation control field 1358, alternative embodiments may support may encode both these concepts into the same field or only have one or the other of these concepts/fields (e.g., may have only the round operation control field 1358).

SAE field 1356—its content distinguishes whether or not to disable the exception event reporting; when the SAE field's 1356 content indicates suppression is enabled, a given instruction does not report any kind of floating-point exception flag and does not raise any floating point exception handler.

Round operation control field 1358—its content distinguishes which one of a group of rounding operations to perform (e.g., Round-up, Round-down, Round-towards-zero and Round-to-nearest). Thus, the round operation control field 1358 allows for the changing of the rounding mode on a per instruction basis. In one embodiment of the invention where a processor includes a control register for specifying rounding modes, the round operation control field's 1350 content overrides that register value.

No Memory Access Instruction Templates—Data Transform Type Operation

In the no memory access data transform type operation 1315 instruction template, the beta field 1354 is interpreted as a data transform field 1354B, whose content distinguishes which one of a number of data transforms is to be performed (e.g., no data transform, swizzle, broadcast).

In the case of a memory access 1320 instruction template of class A, the alpha field 1352 is interpreted as an eviction hint field 1352B, whose content distinguishes which one of the eviction hints is to be used (in FIG. 13A, temporal 1352B.1 and non-temporal 1352B.2 are respectively specified for the memory access, temporal 1325 instruction template and the memory access, non-temporal 1330 instruction template), while the beta field 1354 is interpreted as a data manipulation field 1354C, whose content distinguishes which one of a number of data manipulation operations (also known as primitives) is to be performed (e.g., no manipulation; broadcast; up conversion of a source; and down conversion of a destination). The memory access 1320 instruction templates include the scale field 1360, and optionally the displacement field 1362A or the displacement scale field 1362B.

Vector memory instructions perform vector loads from and vector stores to memory, with conversion support. As with regular vector instructions, vector memory instructions transfer data from/to memory in a data element-wise fashion, with the elements that are actually transferred is dictated by the contents of the vector mask that is selected as the write mask.

Memory Access Instruction Templates—Temporal

Temporal data is data likely to be reused soon enough to benefit from caching. This is, however, a hint, and different processors may implement it in different ways, including ignoring the hint entirely.

Memory Access Instruction Templates—Non-Temporal

Non-temporal data is data unlikely to be reused soon enough to benefit from caching in the 1st-level cache and should be given priority for eviction. This is, however, a hint, and different processors may implement it in different ways, including ignoring the hint entirely.

Instruction Templates of Class B

In the case of the instruction templates of class B, the alpha field 1352 is interpreted as a write mask control (Z) field 1352C, whose content distinguishes whether the write masking controlled by the write mask field 1370 should be a merging or a zeroing.

In the case of the non-memory access 1305 instruction templates of class B, part of the beta field 1354 is interpreted as an RL field 1357A, whose content distinguishes which one of the different augmentation operation types are to be performed (e.g., round 1357A.1 and vector length (VSIZE) 1357A.2 are respectively specified for the no memory access, write mask control, partial round control type operation 1312 instruction template and the no memory access, write mask control, VSIZE type operation 1317 instruction template), while the rest of the beta field 1354 distinguishes which of the operations of the specified type is to be performed.

In the no memory access 1305 instruction templates, the scale field 1360, the displacement field 1362A, and the displacement scale filed 1362B are not present.

In the no memory access, write mask control, partial round control type operation 1310 instruction template, the rest of the beta field 1354 is interpreted as a round operation field 1359A and exception event reporting is disabled (a given instruction does not report any kind of floating-point exception flag and does not raise any floating point exception handler).

Round operation control field 1359A—just as round operation control field 1358, its content distinguishes which one of a group of rounding operations to perform (e.g., Round-up, Round-down, Round-towards-zero and Round-to-nearest). Thus, the round operation control field 1359A allows for the changing of the rounding mode on a per instruction basis. In one embodiment of the invention where a processor includes a control register for specifying rounding modes, the round operation control field's 1350 content overrides that register value.

In the no memory access, write mask control, VSIZE type operation 1317 instruction template, the rest of the beta field 1354 is interpreted as a vector length field 1359B, whose content distinguishes which one of a number of data vector lengths is to be performed on (e.g., 128, 256, or 512 byte).

In the case of a memory access 1320 instruction template of class B, part of the beta field 1354 is interpreted as a broadcast field 1357B, whose content distinguishes whether or not the broadcast type data manipulation operation is to be performed, while the rest of the beta field 1354 is interpreted the vector length field 1359B. The memory access 1320 instruction templates include the scale field 1360, and optionally the displacement field 1362A or the displacement scale field 1362B.

With regard to the generic vector friendly instruction format 1300, a full opcode field 1374 is shown including the format field 1340, the base operation field 1342, and the data element width field 1364. While one embodiment is shown where the full opcode field 1374 includes all of these fields, the full opcode field 1374 includes less than all of these fields in embodiments that do not support all of them. The full opcode field 1374 provides the operation code (opcode).

The augmentation operation field 1350, the data element width field 1364, and the write mask field 1370 allow these features to be specified on a per instruction basis in the generic vector friendly instruction format.

The combination of write mask field and data element width field create typed instructions in that they allow the mask to be applied based on different data element widths.

The various instruction templates found within class A and class B are beneficial in different situations. In some embodiments of the invention, different processors or different cores within a processor may support only class A, only class B, or both classes. For instance, a high performance general purpose out-of-order core intended for general-purpose computing may support only class B, a core intended primarily for graphics and/or scientific (throughput) computing may support only class A, and a core intended for both may support both (of course, a core that has some mix of templates and instructions from both classes but not all templates and instructions from both classes is within the purview of the invention). Also, a single processor may include multiple cores, all of which support the same class or in which different cores support different class. For instance, in a processor with separate graphics and general purpose cores, one of the graphics cores intended primarily for graphics and/or scientific computing may support only class A, while one or more of the general purpose cores may be high performance general purpose cores with out of order execution and register renaming intended for general-purpose computing that support only class B. Another processor that does not have a separate graphics core, may include one more general purpose in-order or out-of-order cores that support both class A and class B. Of course, features from one class may also be implement in the other class in different embodiments of the invention. Programs written in a high level language would be put (e.g., just in time compiled or statically compiled) into an variety of different executable forms, including: 1) a form having only instructions of the class(es) supported by the target processor for execution; or 2) a form having alternative routines written using different combinations of the instructions of all classes and having control flow code that selects the routines to execute based on the instructions supported by the processor which is currently executing the code.

Exemplary Specific Vector Friendly Instruction Format

FIG. 14 is a block diagram illustrating an exemplary specific vector friendly instruction format according to embodiments of the invention. FIG. 14 shows a specific vector friendly instruction format 1400 that is specific in the sense that it specifies the location, size, interpretation, and order of the fields, as well as values for some of those fields. The specific vector friendly instruction format 1400 may be used to extend the x86 instruction set, and thus some of the fields are similar or the same as those used in the existing x86 instruction set and extension thereof (e.g., AVX). This format remains consistent with the prefix encoding field, real opcode byte field, MOD R/M field, SIB field, displacement field, and immediate fields of the existing x86 instruction set with extensions. The fields from FIG. 13 into which the fields from FIG. 14 map are illustrated.

It should be understood that, although embodiments of the invention are described with reference to the specific vector friendly instruction format 1400 in the context of the generic vector friendly instruction format 1300 for illustrative purposes, the invention is not limited to the specific vector friendly instruction format 1400 except where claimed. For example, the generic vector friendly instruction format 1300 contemplates a variety of possible sizes for the various fields, while the specific vector friendly instruction format 1400 is shown as having fields of specific sizes. By way of specific example, while the data element width field 1364 is illustrated as a one bit field in the specific vector friendly instruction format 1400, the invention is not so limited (that is, the generic vector friendly instruction format 1300 contemplates other sizes of the data element width field 1364).

The generic vector friendly instruction format 1300 includes the following fields listed below in the order illustrated in FIG. 14A.

EVEX Prefix (Bytes 0-3) 1402—is encoded in a four-byte form.

Format Field 1340 (EVEX Byte 0, bits [7:0])—the first byte (EVEX Byte 0) is the format field 1340 and it contains 0×62 (the unique value used for distinguishing the vector friendly instruction format in one embodiment of the invention).

The second-fourth bytes (EVEX Bytes 1-3) include a number of bit fields providing specific capability.

REX field 1405 (EVEX Byte 1, bits [7-5])—consists of a EVEX.R bit field (EVEX Byte 1, bit [7]-R), EVEX.X bit field (EVEX byte 1, bit [6]-X), and 1357BEX byte 1, bit[5]-B). The EVEX.R, EVEX.X, and EVEX.B bit fields provide the same functionality as the corresponding VEX bit fields, and are encoded using is complement form, i.e. ZMM0 is encoded as 1111B, ZMM15 is encoded as 0000B. Other fields of the instructions encode the lower three bits of the register indexes as is known in the art (rrr, xxx, and bbb), so that Rrrr, Xxxx, and Bbbb may be formed by adding EVEX.R, EVEX.X, and EVEX.B.

REX' field 1310—this is the first part of the REX' field 1310 and is the EVEX.R' bit field (EVEX Byte 1, bit [4]-R') that is used to encode either the upper 16 or lower 16 of the extended 32 register set. In one embodiment of the invention, this bit, along with others as indicated below, is stored in bit inverted format to distinguish (in the well-known x86 32-bit mode) from the BOUND instruction, whose real opcode byte is 62, but does not accept in the MOD R/M field (described below) the value of 11 in the MOD field; alternative embodiments of the invention do not store this and the other indicated bits below in the inverted format. A value of 1 is used to encode the lower 16 registers. In other words, R'Rrrr is formed by combining EVEX.R', EVEX.R, and the other RRR from other fields.

Opcode map field 1415 (EVEX byte 1, bits [3:0]-mmmm)—its content encodes an implied leading opcode byte (0F, 0F 38, or 0F 3).

Data element width field 1364 (EVEX byte 2, bit [7]-W)—is represented by the notation EVEX.W. EVEX.W is used to define the granularity (size) of the datatype (either 32-bit data elements or 64-bit data elements).

EVEX.vvvv 1420 (EVEX Byte 2, bits [6:3]-vvvv)—the role of EVEX.vvvv may include the following: 1) EVEX.vvvv encodes the first source register operand, specified in inverted (1s complement) form and is valid for instructions with 2 or more source operands; 2) EVEX.vvvv encodes the destination register operand, specified in 1s complement form for certain vector shifts; or 3) EVEX.vvvv does not encode any operand, the field is reserved and should contain 1111b. Thus, EVEX.vvvv field 1420 encodes the 4 low-order bits of the first source register specifier stored in inverted (1s complement) form. Depending on the instruction, an extra different EVEX bit field is used to extend the specifier size to 32 registers.

EVEX.U 1368 Class field (EVEX byte 2, bit [2]-U)—If EVEX.0=0, it indicates class A or EVEX.U0; if EVEX.0=1, it indicates class B or EVEX.U1.

Prefix encoding field 1425 (EVEX byte 2, bits [1:0]-pp)—provides additional bits for the base operation field. In addition to providing support for the legacy SSE instructions in the EVEX prefix format, this also has the benefit of compacting the SIMD prefix (rather than requiring a byte to express the SIMD prefix, the EVEX prefix requires only 2 bits). In one embodiment, to support legacy SSE instructions that use a SIMD prefix (66H, F2H, F3H) in both the legacy format and in the EVEX prefix format, these legacy SIMD prefixes are encoded into the SIMD prefix encoding field; and at runtime are expanded into the legacy SIMD prefix prior to being provided to the decoder's PLA (so the PLA can execute both the legacy and EVEX format of these legacy instructions without modification). Although newer instructions could use the EVEX prefix encoding field's content directly as an opcode extension, certain embodiments expand in a similar fashion for consistency but allow for different meanings to be specified by these legacy SIMD prefixes. An alternative embodiment may redesign the PLA to support the 2 bit SIMD prefix encodings, and thus not require the expansion.

Alpha field 1352 (EVEX byte 3, bit [7]—EH; also known as EVEX.EH, EVEX.rs, EVEX.RL, EVEX.write mask control, and EVEX.N; also illustrated with α)—as previously described, this field is context specific.

Beta field 1354 (EVEX byte 3, bits [6:4]-SSS, also known as EVEX.$s_{2-0}$, EVEX.$r_{2-0}$, EVEX.rr1, EVEX.LL0, EVEX.LLB; also illustrated with βββ)—as previously described, this field is context specific.

REX' field 1310—this is the remainder of the REX' field and is the EVEX.V' bit field (EVEX Byte 3, bit [3]-V') that may be used to encode either the upper 16 or lower 16 of the extended 32 register set. This bit is stored in bit inverted format. A value of 1 is used to encode the lower 16 registers. In other words, V'VVVV is formed by combining EVEX.V', EVEX.vvvv.

Write mask field 1370 (EVEX byte 3, bits [2:0]-kkk)—its content specifies the index of a register in the write mask registers as previously described. In one embodiment of the invention, the specific value EVEX.kkk=000 has a special behavior implying no write mask is used for the particular instruction (this may be implemented in a variety of ways including the use of a write mask hardwired to all ones or hardware that bypasses the masking hardware).

Real Opcode Field 1430 (Byte 4) is also known as the opcode byte. Part of the opcode is specified in this field.

MOD R/M Field 1440 (Byte 5) includes MOD field 1442, Reg field 1444, and R/M field 1446. As previously described, the MOD field's 1442 content distinguishes between memory access and non-memory access operations. The role of Reg field 1444 can be summarized to two situations: encoding either the destination register operand or a source register operand, or be treated as an opcode extension and not used to encode any instruction operand. The role of R/M field 1446 may include the following: encoding the instruction operand that references a memory address, or encoding either the destination register operand or a source register operand.

Scale, Index, Base (SIB) Byte (Byte 6)—As previously described, the scale field's 1350 content is used for memory address generation. SIB.xxx 1454 and SIB.bbb 1456—the contents of these fields have been previously referred to with regard to the register indexes Xxxx and Bbbb.

Displacement field 1362A (Bytes 7-10)—when MOD field 1442 contains 10, bytes 7-10 are the displacement field 1362A, and it works the same as the legacy 32-bit displacement (disp32) and works at byte granularity.

Displacement factor field 1362B (Byte 7)—when MOD field 1442 contains 01, byte 7 is the displacement factor field 1362B. The location of this field is that same as that of the legacy x86 instruction set 8-bit displacement (disp8), which works at byte granularity. Since disp8 is sign extended, it can only address between −128 and 127 bytes offsets; in terms of 64 byte cache lines, disp8 uses 8 bits that can be set to only four really useful values −128, −64, 0, and 64; since a greater range is often needed, disp32 is used; however, disp32 requires 4 bytes. In contrast to disp8 and disp32, the displacement factor field 1362B is a reinterpretation of disp8; when using displacement factor field 1362B, the actual displacement is determined by the content of the displacement factor field multiplied by the size of the memory operand access (N). This type of displacement is referred to as disp8*N. This reduces the average instruction length (a single byte of used for the displacement but with a much greater range). Such compressed displacement is based on the assumption that the effective displacement is multiple of the granularity of the memory access, and hence, the redundant low-order bits of the address offset do not need to be encoded. In other words, the displacement factor field 1362B substitutes the legacy x86 instruction set 8-bit displacement. Thus, the displacement factor field 1362B is encoded the same way as an x86 instruction set 8-bit displacement (so no changes in the ModRM/SIB encoding rules) with the only exception that disp8 is overloaded to disp8*N. In other words, there are no changes in the encoding rules or encoding lengths but only in the interpretation of the displacement value by hardware (which needs to scale the displacement by the size of the memory operand to obtain a byte-wise address offset). Immediate field 1372 operates as previously described.

Full Opcode Field

FIG. 14B is a block diagram illustrating the fields of the specific vector friendly instruction format 1400 that make up the full opcode field 1374 according to one embodiment of the invention. Specifically, the full opcode field 1374 includes the format field 1340, the base operation field 1342, and the data element width (W) field 1364. The base operation field 1342 includes the prefix encoding field 1425, the opcode map field 1415, and the real opcode field 1430.

Register Index Field

FIG. 14C is a block diagram illustrating the fields of the specific vector friendly instruction format 1400 that make up the register index field 1344 according to one embodiment of the invention. Specifically, the register index field 1344 includes the REX field 1405, the REX' field 1410, the MODR/M.reg field 1444, the MODR/M.r/m field 1446, the VVVV field 1420, xxx field 1454, and the bbb field 1456.

Augmentation Operation Field

Figure 14D:
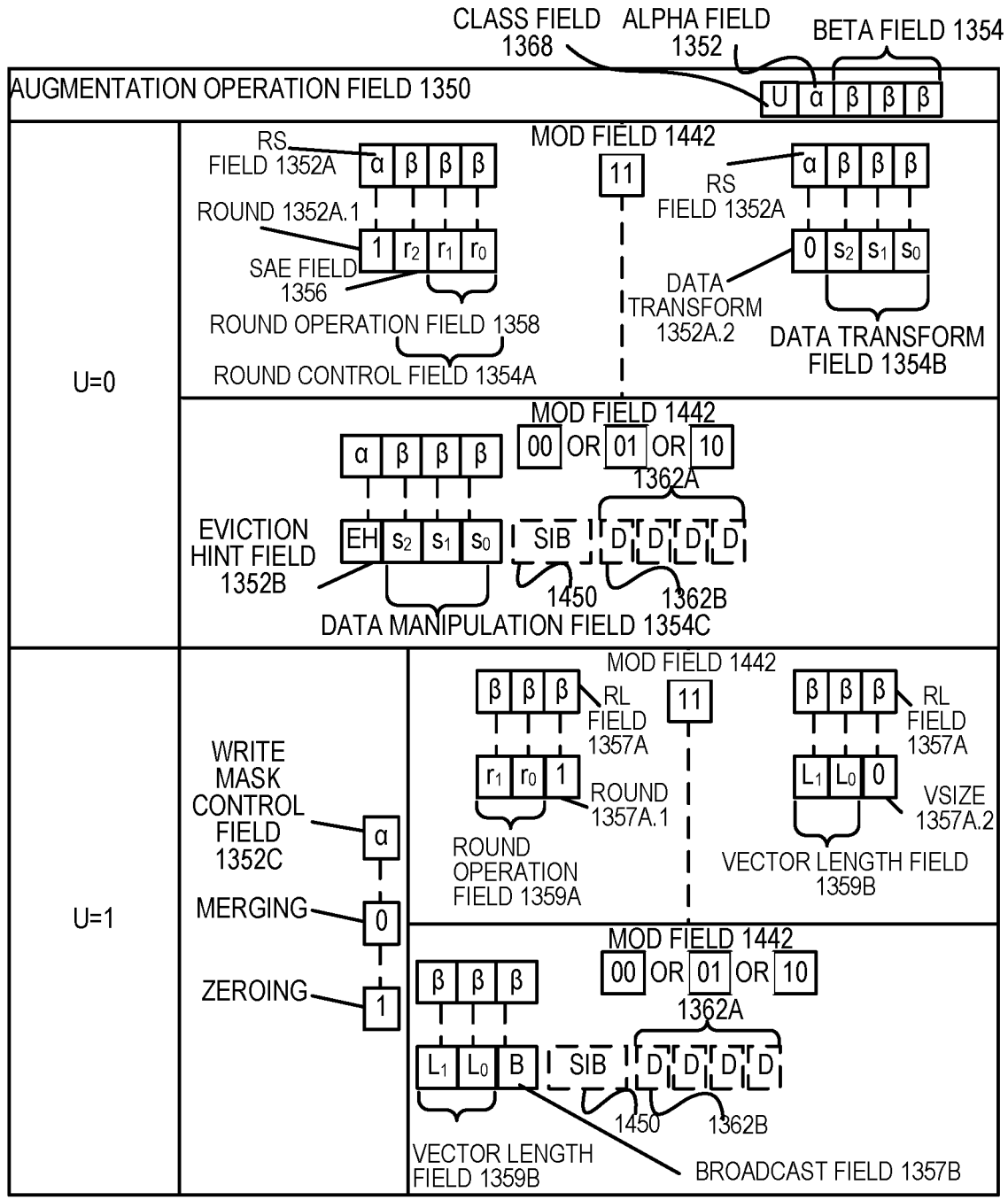

FIG. 14D is a block diagram illustrating the fields of the specific vector friendly instruction format 1400 that make up the augmentation operation field 1350 according to one embodiment of the invention. When the class (U) field 1368 contains 0, it signifies EVEX.U0 (class A 1368A); when it contains 1, it signifies EVEX.U1 (class B 1368B). When U=0 and the MOD field 1442 contains 11 (signifying a no memory access operation), the alpha field 1352 (EVEX byte 3, bit [7]-EH) is interpreted as the rs field 1352A. When the rs field 1352A contains a 1 (round 1352A.1), the beta field 1354 (EVEX byte 3, bits [6:4]-SSS) is interpreted as the round control field 1354A. The round control field 1354A includes a one bit SAE field 1356 and a two bit round operation field 1358. When the rs field 1352A contains a 0 (data transform 1352A.2), the beta field 1354 (EVEX byte 3, bits [6:4]-SSS) is interpreted as a three bit data transform field 1354B. When U=0 and the MOD field 1442 contains 00, 01, or 10 (signifying a memory access operation), the alpha field 1352 (EVEX byte 3, bit [7]-EH) is interpreted as the eviction hint (EH) field 1352B and the beta field 1354 (EVEX byte 3, bits [6:4]-SSS) is interpreted as a three bit data manipulation field 1354C.

When U=1, the alpha field 1352 (EVEX byte 3, bit [7]-EH) is interpreted as the write mask control (Z) field 1352C. When U=1 and the MOD field 1442 contains 11 (signifying a no memory access operation), part of the beta field 1354 (EVEX byte 3, bit [4]-$S_0$) is interpreted as the RL field 1357A; when it contains a 1 (round 1357A.1) the rest of the beta field 1354 (EVEX byte 3, bit [6-5]-$S_{2-1}$) is interpreted as the round operation field 1359A, while when the RL field 1357A contains a 0 (VSIZE 1357.A2) the rest of the beta field 1354 (EVEX byte 3, bit [6-5]-$S_{2-1}$) is interpreted as the vector length field 1359B (EVEX byte 3, bit [6-5]-$L_{1-0}$). When U=1 and the MOD field 1442 contains 00, 01, or 10 (signifying a memory access operation), the beta field 1354 (EVEX byte 3, bits [6:4]-SSS) is interpreted as the vector length field 1359B (EVEX byte 3, bit [6-5]-$L_{1-0}$) and the broadcast field 1357B (EVEX byte 3, bit [4]-B).

Exemplary Register Architecture

FIG. 15 is a block diagram of a register architecture 1500 according to one embodiment of the invention. In the embodiment illustrated, there are 32 vector registers 1510 that are 512 bits wide; these registers are referenced as zmm0 through zmm31. The lower order 256 bits of the lower 16 zmm registers are overlaid on registers ymm0-16. The lower order 128 bits of the lower 16 zmm registers (the lower order 128 bits of the ymm registers) are overlaid on registers xmm0-15. The specific vector friendly instruction format 1400 operates on these overlaid register file as illustrated in the below tables.

were prior to the instruction or zeroed depending on the embodiment.

Write mask registers 1515—in the embodiment illustrated, there are 8 write mask registers (k0 through k7), each 64 bits in size. In an alternate embodiment, the write mask registers 1515 are 16 bits in size. As previously described, in one embodiment of the invention, the vector mask register k0 cannot be used as a write mask; when the encoding that would normally indicate k0 is used for a write mask, it selects a hardwired write mask of 0×FFFF, effectively disabling write masking for that instruction.

General-purpose registers 1525—in the embodiment illustrated, there are sixteen 64-bit general-purpose registers that are used along with the existing x86 addressing modes to address memory operands. These registers are referenced by the names RAX, RBX, RCX, RDX, RBP, RSI, RDI, RSP, and R8 through R15.

Scalar floating point stack register file (x87 stack) 1545, on which is aliased the MMX packed integer flat register file 1550—in the embodiment illustrated, the x87 stack is an eight-element stack used to perform scalar floating-point operations on 32/64/80-bit floating point data using the x87 instruction set extension; while the MMX registers are used to perform operations on 64-bit packed integer data, as well as to hold operands for some operations performed between the MMX and XMM registers.

Alternative embodiments of the invention may use wider or narrower registers. Additionally, alternative embodiments of the invention may use more, less, or different register files and registers.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of dif-

| Adjustable Vector Length | Class | Operations | Registers |
| --- | --- | --- | --- |
| Instruction Templates that do not include the vector length field 1359B | A (FIG. 13A; U = 0) | 1310, 1315, 1325, 1330 | zmm registers (the vector length is 64 byte) |
| | B (FIG. 13B; U = 1) | 1312 | zmm registers (the vector length is 64 byte) |
| Instruction templates that do include the vector length field 1359B | B (FIG. 13B; U = 1) | 1317, 1327 | zmm, ymm, or xmm registers (the vector length is 64 byte, 32 byte, or 16 byte) depending on the vector length field 1359B |

In other words, the vector length field 1359B selects between a maximum length and one or more other shorter lengths, where each such shorter length is half the length of the preceding length; and instructions templates without the vector length field 1359B operate on the maximum vector length. Further, in one embodiment, the class B instruction templates of the specific vector friendly instruction format 1400 operate on packed or scalar single/double-precision floating point data and packed or scalar integer data. Scalar operations are operations performed on the lowest order data element position in an zmm/ymm/xmm register; the higher order data element positions are either left the same as they ferent processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-Of-Order Core Block Diagram

FIG. 16A is a block diagram illustrating both an exemplary in-order pipeline and an exemplary register renaming, out-of-order issue/execution pipeline according to embodiments of the invention. FIG. 16B is a block diagram illustrating both an exemplary embodiment of an in-order architecture core and an exemplary register renaming, out-of-order issue/execution architecture core to be included in a processor according to embodiments of the invention. The solid lined boxes in FIGS. 16A and 16B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 16A, a processor pipeline 1600 includes a fetch stage 1602, a length decode stage 1604, a decode stage 1606, an allocation stage 1608, a renaming stage 1610, a scheduling (also known as a dispatch or issue) stage 1612, a register read/memory read stage 1614, an execute stage 1616, a write back/memory write stage 1618, an exception handling stage 1622, and a commit stage 1624.

FIG. 16B shows processor core 1690 including a front end unit 1630 coupled to an execution engine unit 1650, and both are coupled to a memory unit 1670. The core 1690 may be a reduced instruction set computing (RISC) core, a complex instruction set computing (CISC) core, a very long instruction word (VLIW) core, or a hybrid or alternative core type. As yet another option, the core 1690 may be a special-purpose core, such as, for example, a network or communication core, compression engine, coprocessor core, general purpose computing graphics processing unit (GPGPU) core, graphics core, or the like.

The front end unit 1630 includes a branch prediction unit 1632 coupled to an instruction cache unit 1634, which is coupled to an instruction translation lookaside buffer (TLB) 1636, which is coupled to an instruction fetch unit 1638, which is coupled to a decode unit 1640. The decode unit 1640 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1640 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1690 includes a microcode ROM or other medium that stores microcode for certain macroinstructions (e.g., in decode unit 1640 or otherwise within the front end unit 1630). The decode unit 1640 is coupled to a rename/allocator unit 1652 in the execution engine unit 1650.

The execution engine unit 1650 includes the rename/allocator unit 1652 coupled to a retirement unit 1654 and a set of one or more scheduler unit(s) 1656. The scheduler unit(s) 1656 represents any number of different schedulers, including reservations stations, central instruction window, etc. The scheduler unit(s) 1656 is coupled to the physical register file(s) unit(s) 1658. Each of the physical register file(s) units 1658 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 1658 comprises a vector registers unit, a write mask registers unit, and a scalar registers unit. These register units may provide architectural vector registers, vector mask registers, and general purpose registers. The physical register file(s) unit(s) 1658 is overlapped by the retirement unit 1654 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1654 and the physical register file(s) unit(s) 1658 are coupled to the execution cluster(s) 1660. The execution cluster(s) 1660 includes a set of one or more execution units 1662 and a set of one or more memory access units 1664. The execution units 1662 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1656, physical register file(s) unit(s) 1658, and execution cluster(s) 1660 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1664). It should also be understood that where separate pipelines are used, one or more of these pipelines may be out-of-order issue/execution and the rest in-order.

The set of memory access units 1664 is coupled to the memory unit 1670, which includes a data TLB unit 1672 coupled to a data cache unit 1674 coupled to a level 2 (L2) cache unit 1676. In one exemplary embodiment, the memory access units 1664 may include a load unit, a store address unit, and a store data unit, each of which is coupled to the data TLB unit 1672 in the memory unit 1670. The instruction cache unit 1634 is further coupled to a level 2 (L2) cache unit 1676 in the memory unit 1670. The L2 cache unit 1676 is coupled to one or more other levels of cache and eventually to a main memory.

By way of example, the exemplary register renaming, out-of-order issue/execution core architecture may implement the pipeline 1600 as follows: 1) the instruction fetch 1638 performs the fetch and length decoding stages 1602 and 1604; 2) the decode unit 1640 performs the decode stage 1606; 3) the rename/allocator unit 1652 performs the allocation stage 1608 and renaming stage 1610; 4) the scheduler unit(s) 1656 performs the schedule stage 1612; 5) the physical register file(s) unit(s) 1658 and the memory unit 1670 perform the register read/memory read stage 1614; the execution cluster 1660 perform the execute stage 1616; 6) the memory unit 1670 and the physical register file(s) unit(s) 1658 perform the write back/memory write stage 1618; 7) various units may be involved in the exception handling stage 1622; and 8) the retirement unit 1654 and the physical register file(s) unit(s) 1658 perform the commit stage 1624.

The core 1690 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1690 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1634/1674 and a shared L2 cache unit 1676, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

Figure 17B:
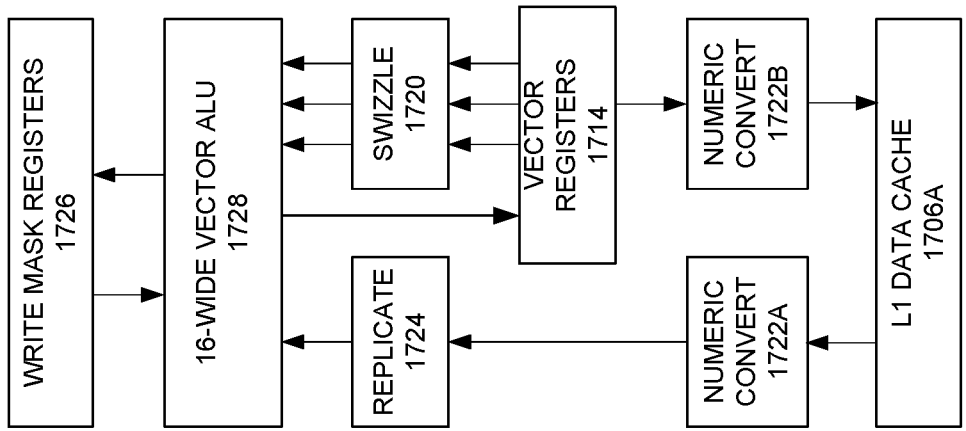
FIG. 17A-B illustrate a block diagram of a more specific exemplary in-order core architecture, which core would be one of several logic blocks (including other cores of the same type and/or different types) in a chip.
Figure 17A:
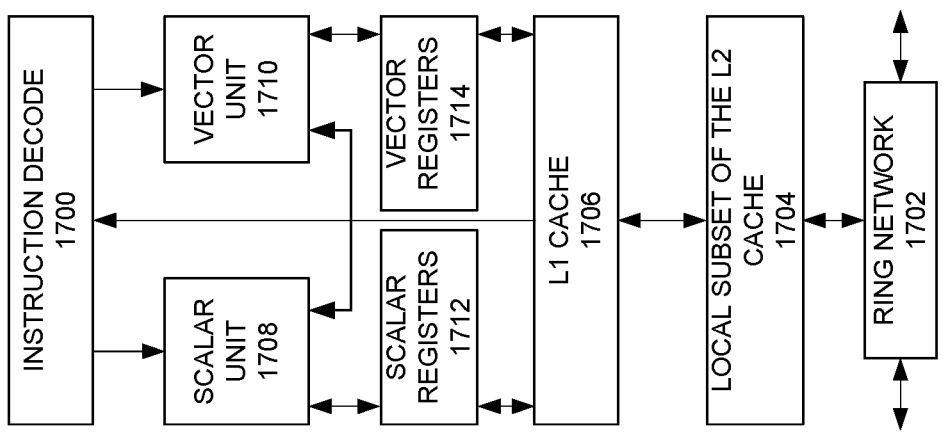

FIGS. 17A and 17B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 17A is a block diagram of a single processor core, along with its connection to the on-die interconnect network 1702 and with its local subset of the Level 2 (L2) cache 1704, according to embodiments of the invention. In one embodiment, an instruction decoder 1700 supports the x86 instruction set with a packed data instruction set extension. An L1 cache 1706 allows low-latency accesses to cache memory into the scalar and vector units. While in one embodiment (to simplify the design), a scalar unit 1708 and a vector unit 1710 use separate register sets (respectively, scalar registers 1712 and vector registers 1714) and data transferred between them is written to memory and then read back in from a level 1 (L1) cache 1706, alternative embodiments of the invention may use a different approach (e.g., use a single register set or include a communication path that allow data to be transferred between the two register files without being written and read back).

The local subset of the L2 cache 1704 is part of a global L2 cache that is divided into separate local subsets, one per processor core. Each processor core has a direct access path to its own local subset of the L2 cache 1704. Data read by a processor core is stored in its L2 cache subset 1704 and can be accessed quickly, in parallel with other processor cores accessing their own local L2 cache subsets. Data written by a processor core is stored in its own L2 cache subset 1704 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 17B is an expanded view of part of the processor core in FIG. 17A according to embodiments of the invention. FIG. 17B includes an L1 data cache 1706A part of the L1 cache 1704, as well as more detail regarding the vector unit 1710 and the vector registers 1714. Specifically, the vector unit 1710 is a 16-wide vector processing unit (VPU) (see the 16-wide ALU 1728), which executes one or more of integer, single-precision float, and double-precision float instructions. The VPU supports swizzling the register inputs with swizzle unit 1720, numeric conversion with numeric convert units 1722A-B, and replication with replication unit 1724 on the memory input. Write mask registers 1726 allow predicating resulting vector writes.

Figure 18:
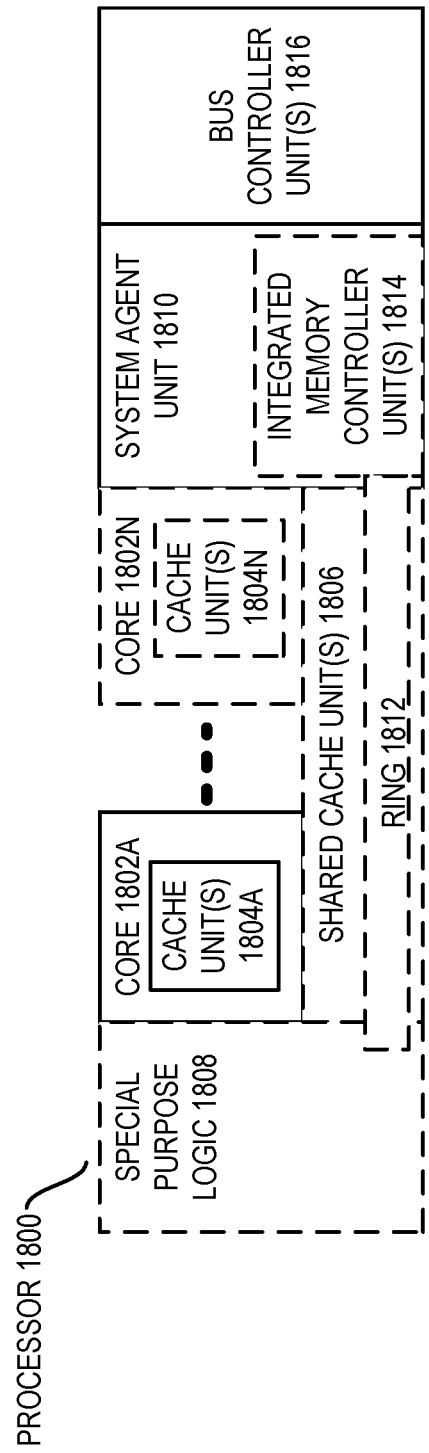
FIG. 18 is a block diagram of a processor that may have more than one core, may have an integrated memory controller, and may have integrated graphics according to embodiments of the invention.

FIG. 18 is a block diagram of a processor 1800 that may have more than one core, may have an integrated memory controller, and may have integrated graphics according to embodiments of the invention. The solid lined boxes in FIG. 18 illustrate a processor 1800 with a single core 1802A, a system agent 1810, a set of one or more bus controller units 1816, while the optional addition of the dashed lined boxes illustrates an alternative processor 1800 with multiple cores 1802A-N, a set of one or more integrated memory controller unit(s) 1814 in the system agent unit 1810, and special purpose logic 1808.

Thus, different implementations of the processor 1800 may include: 1) a CPU with the special purpose logic 1808 being integrated graphics and/or scientific (throughput) logic (which may include one or more cores), and the cores 1802A-N being one or more general purpose cores (e.g., general purpose in-order cores, general purpose out-of-order cores, a combination of the two); 2) a coprocessor with the cores 1802A-N being a large number of special purpose cores intended primarily for graphics and/or scientific (throughput); and 3) a coprocessor with the cores 1802A-N being a large number of general purpose in-order cores. Thus, the processor 1800 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1800 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1806, and external memory (not shown) coupled to the set of integrated memory controller units 1814. The set of shared cache units 1806 may include one or more mid-level caches, such as level 2 (L2), level 3 (L3), level 4 (L4), or other levels of cache, a last level cache (LLC), and/or combinations thereof. While in one embodiment a ring based interconnect unit 1812 interconnects the integrated graphics logic 1808, the set of shared cache units 1806, and the system agent unit 1810/integrated memory controller unit(s) 1814, alternative embodiments may use any number of well-known techniques for interconnecting such units. In one embodiment, coherency is maintained between one or more cache units 1806 and cores 1802A-N.

In some embodiments, one or more of the cores 1802A-N are capable of multi-threading. The system agent 1810 includes those components coordinating and operating cores 1802A-N. The system agent unit 1810 may include for example a power control unit (PCU) and a display unit. The PCU may be or include logic and components needed for regulating the power state of the cores 1802A-N and the integrated graphics logic 1808. The display unit is for driving one or more externally connected displays.

The cores 1802A-N may be homogenous or heterogeneous in terms of architecture instruction set; that is, two or more of the cores 1802A-N may be capable of execution the same instruction set, while others may be capable of executing only a subset of that instruction set or a different instruction set.

Exemplary Computer Architectures

FIGS. 19, 20, 21, 22 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 19:
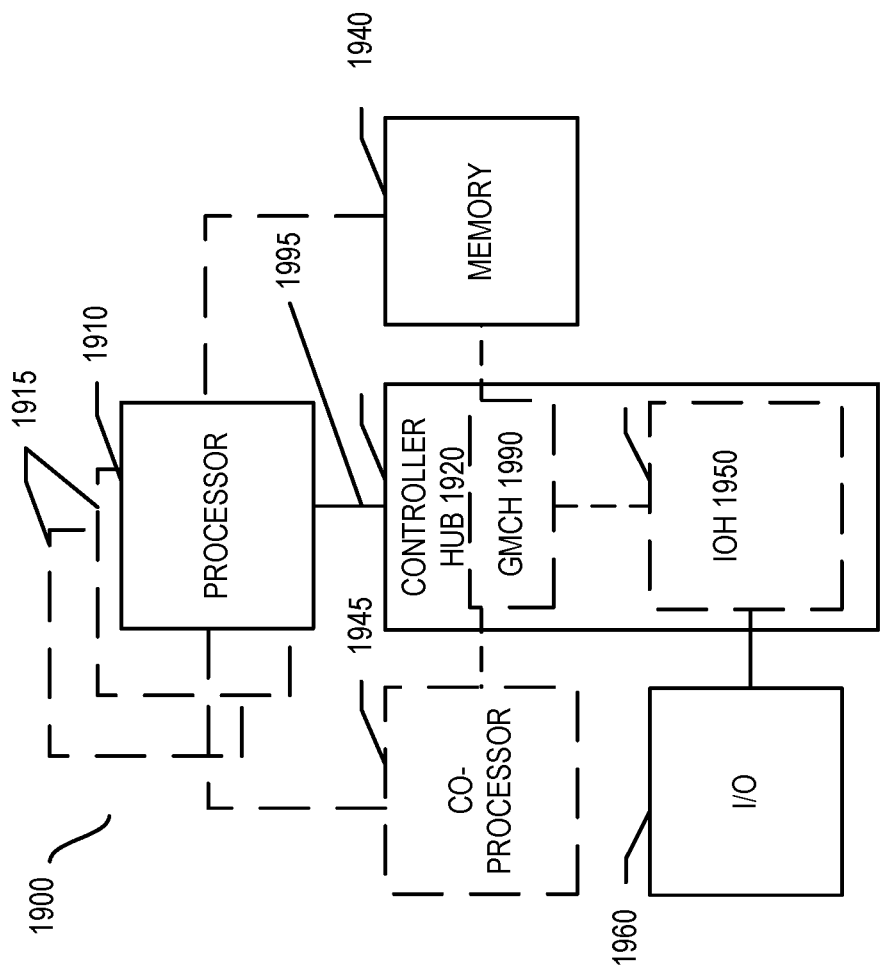
FIGS. 19, 20, 21, and 22 are block diagrams of exemplary computer architectures.

Referring now to FIG. 19, shown is a block diagram of a system 1900 in accordance with one embodiment of the present invention. The system 1900 may include one or more processors 1910, 1915, which are coupled to a controller hub 1920. In one embodiment the controller hub 1920 includes a graphics memory controller hub (GMCH) 1990 and an Input/Output Hub (IOH) 1950 (which may be on separate chips); the GMCH 1990 includes memory and graphics controllers to which are coupled memory 1940 and a coprocessor 1945; the IOH 1950 is couples input/output (I/O) devices 1960 to the GMCH 1990. Alternatively, one or both of the memory and graphics controllers are integrated within the processor (as described herein), the memory 1940 and the coprocessor 1945 are coupled directly to the processor 1910, and the controller hub 1920 in a single chip with the IOH 1950.

The optional nature of additional processors 1915 is denoted in FIG. 19 with broken lines. Each processor 1910, 1915 may include one or more of the processing cores described herein and may be some version of the processor 1800.

The memory 1940 may be, for example, dynamic random access memory (DRAM), phase change memory (PCM), or a combination of the two. For at least one embodiment, the controller hub 1920 communicates with the processor(s) 1910, 1915 via a multi-drop bus, such as a frontside bus (FSB), point-to-point interface such as QuickPath Interconnect (QPI), or similar connection 1995.

In one embodiment, the coprocessor 1945 is a special-purpose processor, such as, for example, a high-throughput MIC processor, a network or communication processor, compression engine, graphics processor, GPGPU, embedded processor, or the like. In one embodiment, controller hub 1920 may include an integrated graphics accelerator.

There can be a variety of differences between the physical resources 1910, 1915 in terms of a spectrum of metrics of merit including architectural, microarchitectural, thermal, power consumption characteristics, and the like.

In one embodiment, the processor 1910 executes instructions that control data processing operations of a general type. Embedded within the instructions may be coprocessor instructions. The processor 1910 recognizes these coprocessor instructions as being of a type that should be executed by the attached coprocessor 1945. Accordingly, the processor 1910 issues these coprocessor instructions (or control signals representing coprocessor instructions) on a coprocessor bus or other interconnect, to coprocessor 1945. Coprocessor(s) 1945 accept and execute the received coprocessor instructions.

Figure 20:
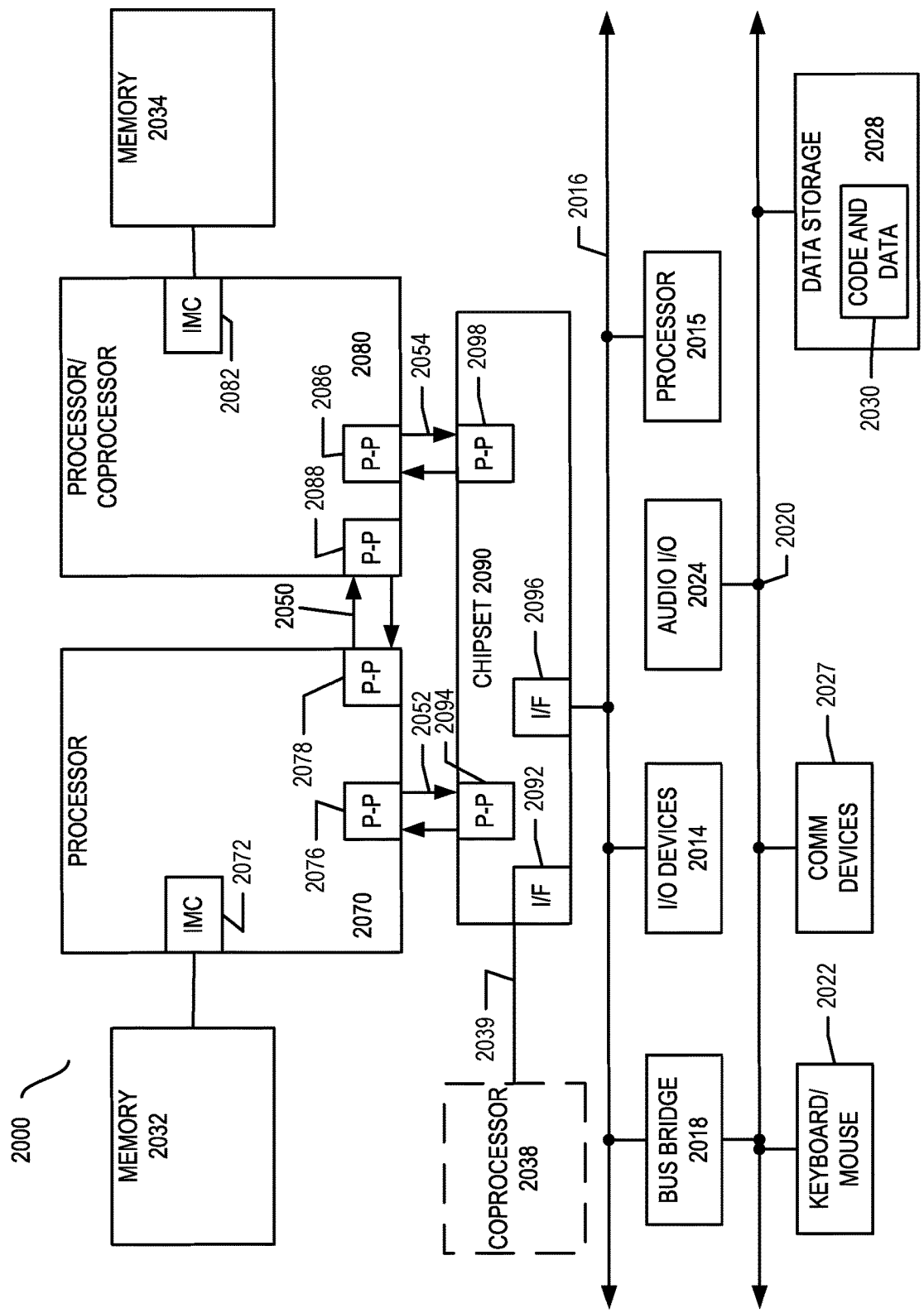

Referring now to FIG. 20, shown is a block diagram of a first more specific exemplary system 2000 in accordance with an embodiment of the present invention. As shown in FIG. 20, multiprocessor system 2000 is a point-to-point interconnect system, and includes a first processor 2070 and a second processor 2080 coupled via a point-to-point interconnect 2050. Each of processors 2070 and 2080 may be some version of the processor 1800. In one embodiment of the invention, processors 2070 and 2080 are respectively processors 1910 and 1915, while coprocessor 2038 is coprocessor 1945. In another embodiment, processors 2070 and 2080 are respectively processor 1910 coprocessor 1945.

Processors 2070 and 2080 are shown including integrated memory controller (IMC) units 2072 and 2082, respectively. Processor 2070 also includes as part of its bus controller units point-to-point (P-P) interfaces 2076 and 2078; similarly, second processor 2080 includes P-P interfaces 2086 and 2088. Processors 2070, 2080 may exchange information via a point-to-point (P-P) interface 2050 using P-P interface circuits 2078, 2088. As shown in FIG. 20, IMCs 2072 and 2082 couple the processors to respective memories, namely a memory 2032 and a memory 2034, which may be portions of main memory locally attached to the respective processors.

Processors 2070, 2080 may each exchange information with a chipset 2090 via individual P-P interfaces 2052, 2054 using point to point interface circuits 2076, 2094, 2086, 2098. Chipset 2090 may optionally exchange information with the coprocessor 2038 via a high-performance interface 2039. In one embodiment, the coprocessor 2038 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 2090 may be coupled to a first bus 2016 via an interface 2096. In one embodiment, first bus 2016 may be a Peripheral Component Interconnect (PCI) bus, or a bus such as a PCI Express bus or another third generation I/O interconnect bus, although the scope of the present invention is not so limited.

As shown in FIG. 20, various I/O devices 2014 may be coupled to first bus 2016, along with a bus bridge 2018 which couples first bus 2016 to a second bus 2020. In one embodiment, one or more additional processor(s) 2015, such as coprocessors, high-throughput MIC processors, GPGPU's, accelerators (such as, e.g., graphics accelerators or digital signal processing (DSP) units), field programmable gate arrays, or any other processor, are coupled to first bus 2016. In one embodiment, second bus 2020 may be a low pin count (LPC) bus. Various devices may be coupled to a second bus 2020 including, for example, a keyboard and/or mouse 2022, communication devices 2027 and a storage unit 2028 such as a disk drive or other mass storage device which may include instructions/code and data 2030, in one embodiment. Further, an audio I/O 2024 may be coupled to the second bus 2020. Note that other architectures are possible. For example, instead of the point-to-point architecture of FIG. 20, a system may implement a multi-drop bus or other such architecture.

Figure 21:
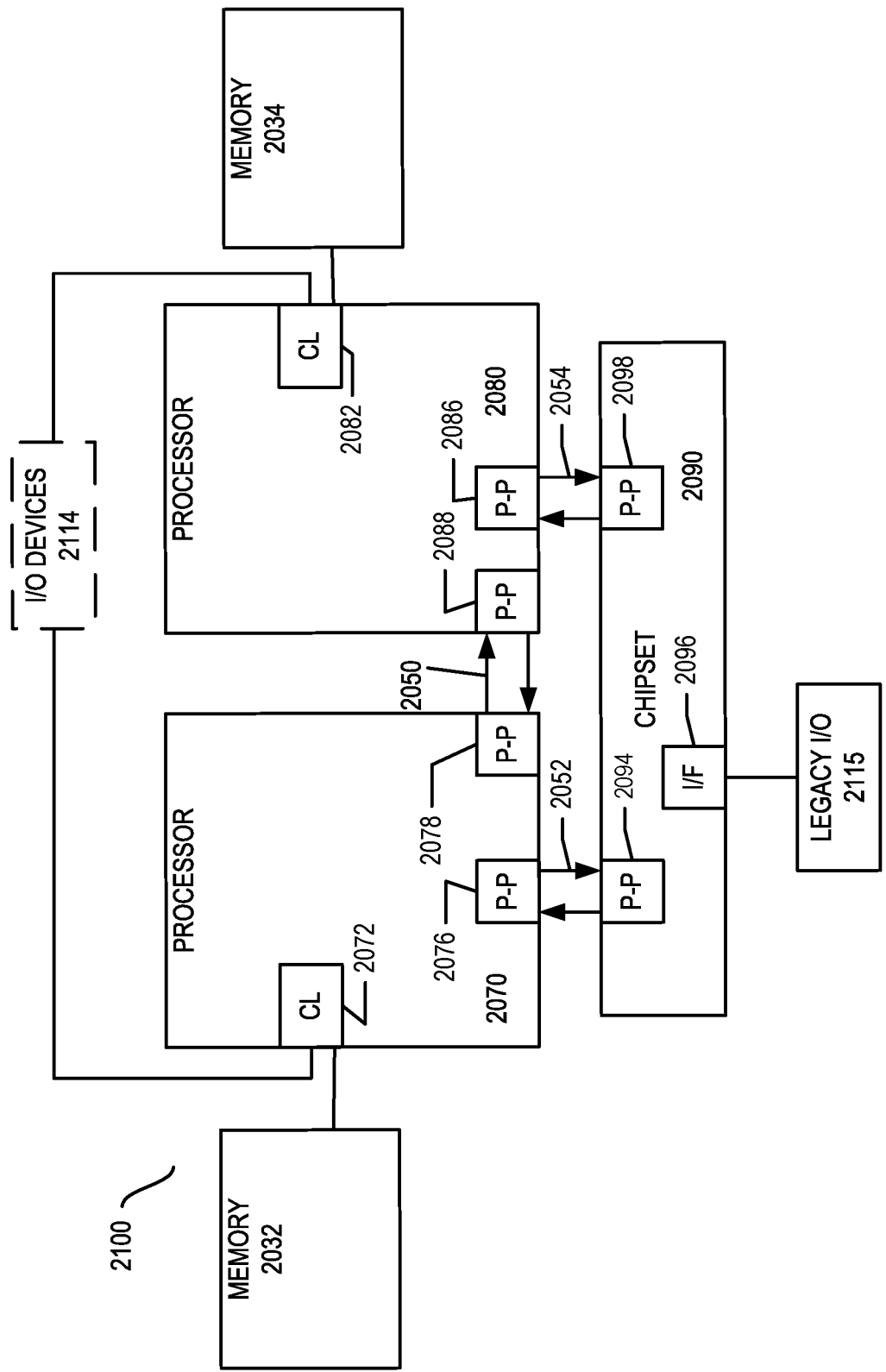

Referring now to FIG. 21, shown is a block diagram of a second more specific exemplary system 2100 in accordance with an embodiment of the present invention. Like elements in FIGS. 20 and 21 bear like reference numerals, and certain aspects of FIG. 20 have been omitted from FIG. 21 in order to avoid obscuring other aspects of FIG. 21.

FIG. 21 illustrates that the processors 2070, 2080 may include integrated memory and I/O control logic ("CL") 2072 and 2082, respectively. Thus, the CL 2072, 2082 include integrated memory controller units and include I/O control logic. FIG. 21 illustrates that not only are the memories 2032, 2034 coupled to the CL 2072, 2082, but also that I/O devices 2114 are also coupled to the control logic 2072, 2082. Legacy I/O devices 2115 are coupled to the chipset 2090.

Figure 22:
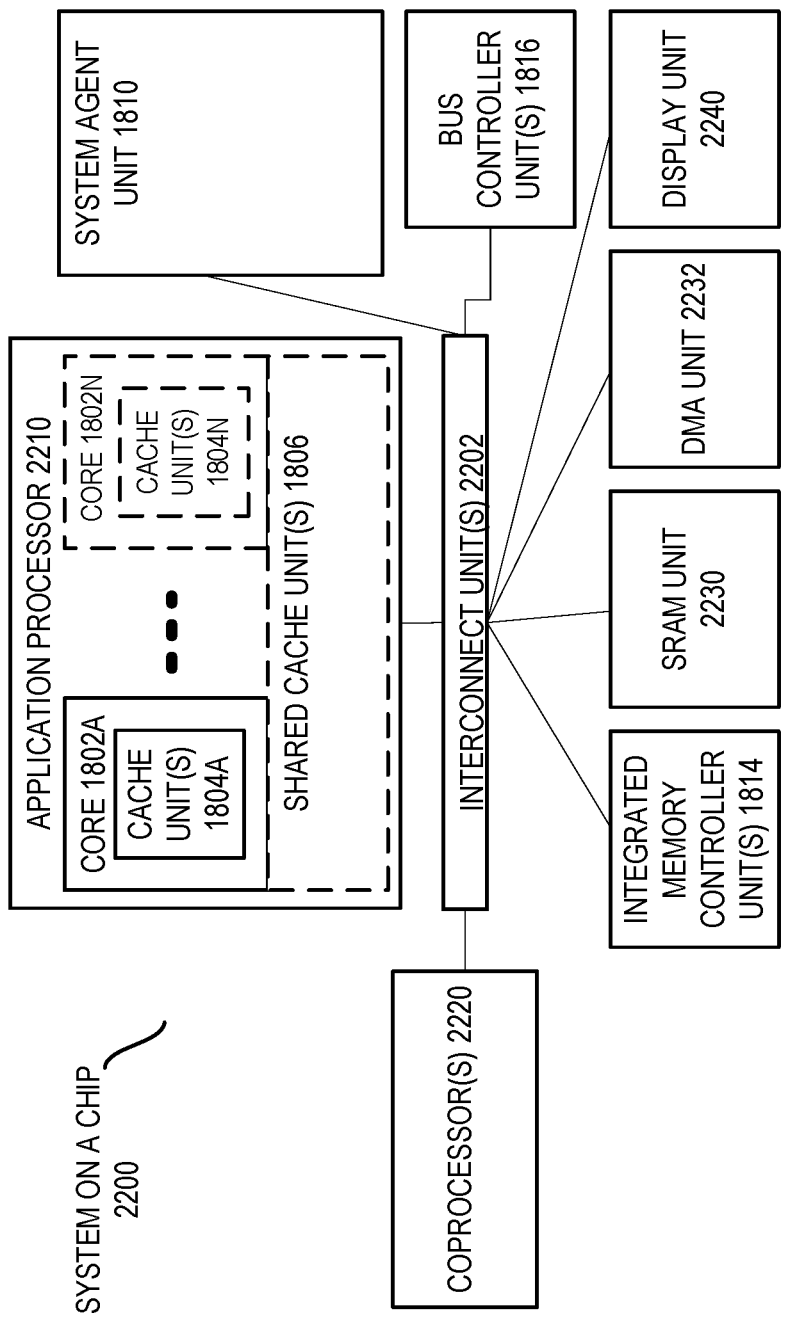

Referring now to FIG. 22, shown is a block diagram of a SoC 2200 in accordance with an embodiment of the present invention. Similar elements in FIG. 18 bear like reference numerals. Also, dashed lined boxes are optional features on more advanced SoCs. In FIG. 22, an interconnect unit(s) 2202 is coupled to: an application processor 2210 which includes a set of one or more cores 202A-N and shared cache unit(s) 1806; a system agent unit 1810; a bus controller unit(s) 1816; an integrated memory controller unit(s) 1814; a set or one or more coprocessors 2220 which may include integrated graphics logic, an image processor, an audio processor, and a video processor; an static random access memory (SRAM) unit 2230; a direct memory access (DMA) unit 2232; and a display unit 2240 for coupling to one or more external displays. In one embodiment, the coprocessor(s) 2220 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 2030 illustrated in FIG. 20, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 23:
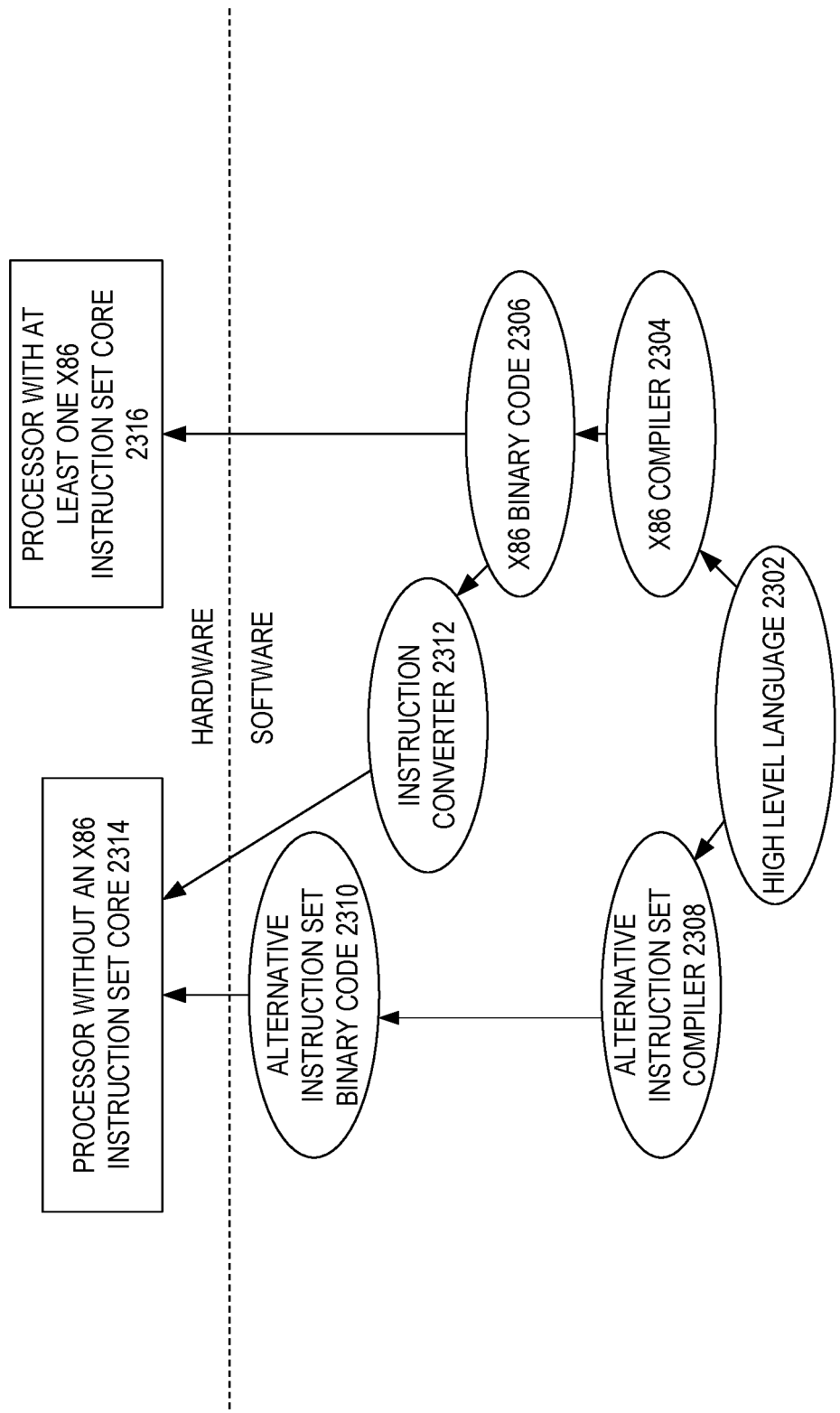
FIG. 23 is a block diagram contrasting the use of a software instruction converter to convert binary instructions in a source instruction set to binary instructions in a target instruction set according to embodiments of the invention.

FIG. 23 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 23 shows a program in a high level language 2302 may be compiled using an x86 compiler 2304 to generate x86 binary code 2306 that may be natively executed by a processor with at least one x86 instruction set core 2316. The processor with at least one x86 instruction set core 2316 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 2304 represents a compiler that is operable to generate x86 binary code 2306 (e.g., object code) that can, with or without additional linkage processing, be executed on the processor with at least one x86 instruction set core 2316. Similarly, FIG. 23 shows the program in the high level language 2302 may be compiled using an alternative instruction set compiler 2308 to generate alternative instruction set binary code 2310 that may be natively executed by a processor without at least one x86 instruction set core 2314 (e.g., a processor with cores that execute the MIPS instruction set of MIPS Technologies of Sunnyvale, Calif. and/or that execute the ARM instruction set of ARM Holdings of Sunnyvale, Calif.). The instruction converter 2312 is used to convert the x86 binary code 2306 into code that may be natively executed by the processor without an x86 instruction set core 2314. This converted code is not likely to be the same as the alternative instruction set binary code 2310 because an instruction converter capable of this is difficult to make; however, the converted code will accomplish the general operation and be made up of instructions from the alternative instruction set. Thus, the instruction converter 2312 represents software, firmware, hardware, or a combination thereof that, through emulation, simulation or any other process, allows a processor or other electronic device that does not have an x86 instruction set processor or core to execute the x86 binary code 2306.

While FIGS. 11 and 12 illustrate various operations according to one or more embodiments, it is to be understood that not all of the operations depicted in FIGS. 11 and 12 are necessary for other embodiments. Indeed, it is fully contemplated herein that in other embodiments of the present disclosure, the operations depicted in FIGS. 11 and 12, and/or other operations described herein, may be combined in a manner not specifically shown in any of the drawings, but still fully consistent with the present disclosure. Thus, claims directed to features and/or operations that are not exactly shown in one drawing are deemed within the scope and content of the present disclosure.

As used in this application and in the claims, a list of items joined by the term "and/or" can mean any combination of the listed items. For example, the phrase "A, B and/or C" can mean A; B; C; A and B; A and C; B and C; or A, B and C. As used in this application and in the claims, a list of items joined by the term "at least one of" can mean any combination of the listed terms. For example, the phrases "at least one of A, B or C" can mean A; B; C; A and B; A and C; B and C; or A, B and C.

As used in any embodiment herein, the terms "system" or "module" may refer to, for example, software, firmware and/or circuitry configured to perform any of the aforementioned operations. Software may be embodied as a software package, code, instructions, instruction sets and/or data recorded on non-transitory computer readable storage mediums and/or devices. Firmware may be embodied as code, instructions or instruction sets and/or data that are hard-coded (e.g., nonvolatile) in memory devices.

As used in any embodiment herein, the term "circuitry" may comprise, for example, singly or in any combination, hardwired circuitry, programmable circuitry such as computer processors comprising one or more individual instruction processing cores, state machine circuitry, and/or firmware that stores instructions executed by programmable circuitry or future computing paradigms including, for example, massive parallelism, analog or quantum computing, hardware embodiments of accelerators such as neural net processors and non-silicon implementations of the above. The circuitry may, collectively or individually, be embodied as circuitry that forms part of a larger system, for example, an integrated circuit (IC), system on-chip (SoC), desktop computers, laptop computers, tablet computers, servers, smartphones, etc.

Any of the operations described herein may be implemented in a system that includes one or more mediums (e.g., non-transitory storage mediums) having stored therein, individually or in combination, instructions that when executed by one or more processors perform the methods. Here, the processor may include, for example, a server CPU, a mobile device CPU, and/or other programmable circuitry. Also, it is intended that operations described herein may be distributed across a plurality of physical devices, such as processing structures at more than one different physical location. The storage medium may include any type of tangible medium, for example, any type of disk including hard disks, floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, Solid State Disks (SSDs), embedded multimedia cards (eMMCs), secure digital input/output (SDIO) cards, magnetic or optical cards, or any type of media suitable for storing electronic instructions. Other embodiments may be implemented as software executed by a programmable control device.

Thus, the present disclosure is directed to systems and methods for performing discrete cosine transforms and inverse discrete cosine transforms (DCT/IDCT) using a CORDIC algorithm implemented in systolic array circuitry that includes a plurality cells or nodes, each containing circuitry to implement the CORDIC algorithm. DCT/IDCT control circuitry multiplies the systolic array output matrix generated by the systolic array circuitry by a scaling factor that may include a defined scaling value or an actual cosine value. The DCT/IDCT control circuitry causes the transfer of the scaled systolic array output matrix to combination circuitry where the DCT/IDCT input matrix is combined with the scaled systolic array output matrix to provide the DCT/IDCT output matrix. The DCT/IDCT control circuitry also transfers bypass information to at least a portion of the cells or nodes in the systolic array circuitry. The CORDIC algorithm implemented by the systolic array circuitry is an iterative algorithm and the bypass information determines the number of CORDIC algorithm iterations based on the desired accuracy of the cosine/arccosine values returned by the systolic array circuitry. Beneficially, by calculating the cosine/arccosine values using the systolic array circuitry, the systems and methods disclosed herein do not require the use of a look-up tables or similar memory intensive data structures.

The following examples pertain to further embodiments. The following examples of the present disclosure may comprise subject material such as at least one device, a method, at least one machine-readable medium for storing instructions that when executed cause a machine to perform acts based on the method, means for performing discrete cosine transforms and inverse discrete cosine transforms (DCT/IDCT) using a CORDIC algorithm implemented in systolic array circuitry that includes a plurality cells or nodes, each containing circuitry to implement the CORDIC algorithm.

According to example 1, there is provided a discrete cosine transform (DCT)/inverse discrete cosine transform (IDCT) system. The system may include: one or more combination circuits; one or more systolic array circuits; DCT/IDCT control circuitry coupled to the one or more combination circuits and to the one or more systolic array circuit, the control circuitry to: receive a systolic array input data set; receive an input array data set; provide the systolic array input data set to each respective one of the one or more systolic array circuits, each of the one or more systolic array circuits to provide a systolic array output matrix using the received systolic array input data such that the one or more systolic array circuits collectively provide one or more systolic array output matrices; and cause the one or more combination circuits to mathematically combine the input array data set with the one or more systolic array output matrices to generate a DCT/IDCT output matrix.

Example 2 may include elements of example 1 where the one or more combination circuits may include one or more array multiplication circuits.

Example 3 may include elements of any of examples 1 or 2 where the systolic array input data set includes data representative of one or more frequency values; and where the one or more systolic array circuits include one or more DCT systolic array circuits.

Example 4 may include elements of any of examples 1 through 3 where the systolic array input data set includes data representative of one or more DCT values; and where the one or more systolic array circuits include one or more IDCT systolic array circuits.

Example 5 may include elements of any of examples 1 through 4 and the DCT/IDCT control circuitry may further: receive data representative of a precision of data values included in the systolic array output matrix.

Example 6 may include elements of any of examples 1 through 5 where the one or more systolic array circuits include two one-dimensional (1-D) systolic array circuits arranged in parallel; the DCT/IDCT control circuitry may further: receive an input array data set that includes an "N×N" input array data set; cause the first of the two 1-D systolic array circuits to provide an "N×1" systolic array output matrix using the systolic array input data set; and cause the second of the two 1-D systolic array circuits to provide a "1×N" systolic array output matrix using the systolic array input data set; and cause the combination circuit to mathematically combine the "N×N" input array data set, the "N×1" systolic array output matrix, and the "1×N" systolic array output matrix to generate an "N×N" output matrix.

Example 7 may include elements of any of examples 1 through 6 where the one or more systolic array circuits include a single one-dimensional (1-D) systolic array circuit; and the DCT/IDCT control circuitry may further: receive an "N×1" input array data set; provide the data representative of the systolic array input data set to the 1-D systolic array circuit to provide the systolic array output matrix; cause the 1-D systolic array circuit to provide a systolic array output matrix using the single systolic array input data set; and cause the combination circuit to mathematically combine the "N×1" input array data set with the systolic array output matrix to generate an "N×1" output matrix.

Example 8 may include elements of any of examples 1 through 7 where the one or more systolic array circuits include three or more one-dimensional (1-D) systolic array circuits arranged in parallel; and the DCT/IDCT control circuitry to further: receive data representative of an "N×N" input array data set; provide data representative of the systolic array input data set to each respective one of the three more 1-D systolic array circuits; and cause the each of the three or more 1-D systolic array circuits to generate a respective systolic array output matrix using the systolic array input data set, the three or more 1-D systolic array circuits to collectively provide three or more systolic array output matrices; and cause the combination circuit to mathematically combine the "N×N" input array data set with the three or more systolic array output matrices generate an "N×N" output matrix.

According to example 9, there is provided a discrete cosine transform (DCT)/inverse discrete cosine transform (IDCT) method. The method may include: causing, by DCT/IDCT control circuitry, a transfer of a systolic array input data set to each respective one of one or more systolic array circuits, each of the one or more systolic array circuits communicatively coupled to DCT/IDCT control circuitry; generating, by each respective one of the one or more systolic array circuits, a systolic array output matrix using the received systolic array input data, the one or more systolic array circuits to collectively provide one or more systolic array output matrices; causing, by the DCT/IDCT control circuitry, a transfer of an input array data set to combination circuitry, the combination circuitry communicatively coupled to the DCT/IDCT control circuitry; causing, by the DCT/IDCT control circuitry, a transfer of the one or more systolic array output matrices to the combination circuitry; and combining, by the combination circuitry, the input array data set and the one or more systolic array output matrices to generate data representative of a DCT/IDCT output matrix.

Example 10 may include elements of example 9 where causing the transfer of the input array data set to the combination circuitry may further include: causing, by the DCT/IDCT control circuitry, a transfer of the input array data set to combination circuitry that includes one or more multiplication circuits; and where causing a transfer of the one or more systolic array output matrices to the combination circuitry may further include: causing, by the DCT/IDCT control circuitry, a transfer of the one or more systolic array output matrices to the one or more multiplication circuits.

Example 11 may include elements of any of examples 9 or 10 where causing the transfer of the systolic array input data set to each respective one of the one or more systolic array circuits may further include: causing, by the DCT/IDCT control circuitry, a transfer of a systolic array input data set that includes one or more frequency values to each respective one of one or more 1-D systolic array circuits.

Example 12 may include elements of any of examples 9 through 11 where causing the transfer of the systolic array input data set to each respective one of the one or more systolic array circuits may further include: causing, by the DCT/IDCT control circuitry, a transfer of a systolic array input data set that includes one or more DCT values to each respective one of one or more 1-D systolic array circuits.

Example 13 may include elements of any of examples 9 through 12, and the method may further include: receiving, by the DCT/IDCT control circuitry, data indicative of a precision of data values included in the systolic array output matrix; and where generating the systolic array output matrix using the received systolic array input data may further include: causing, by the DCT/IDCT control circuitry, each respective one of the one or more systolic array circuits to iteratively calculate a systolic array output matrix to achieve the precision of data values.

Example 14 may include elements of any of examples 9 through 13 where causing the transfer of the systolic array input data set to each respective one of the one or more systolic array circuits may further include: causing, by the DCT/IDCT control circuitry, the transfer of the systolic array input data set to each respective one of two, one-dimensional (1-D) systolic array circuits; where causing the transfer of the input array data set to the combination circuitry may further include: causing, by the DCT/IDCT control circuitry, a transfer of an N×N input array data set to the combination circuitry; where generating, by each respective one of the one or more systolic array circuits, the systolic array output matrix using the received systolic array input data may further include: generating by the first of the two 1-D systolic array circuits an "N×1" systolic array output matrix using the systolic array input data set; and generating, by the second of the two 1-D systolic array circuits a "1×N" systolic array output matrix using the systolic array input data set; and wherein combining the input array data set and the one or more systolic array output matrices to generate data representative of a DCT/IDCT output matrix may further include: multiplying, by one or more multiplication circuits included in the combination circuitry, the "N×N" input array data set, the "N×1" systolic array output matrix, and the "1×N" systolic array output matrix to generate an "N×N" DCT/IDCT output matrix.

Example 15 may include elements of any of examples 9 through 14, and the method may further include: receiving, by the DCT/IDCT control circuitry, an "N×1" input array data set; providing, by the control circuitry, the data representative of the systolic array input data set to a one-dimensional (1-D) systolic array circuit; providing, by the 1-D systolic array circuit, a systolic array output matrix using the single systolic array input data set; and mathematically combining, by the combination circuit, the "N×1" input array data set with the systolic array output matrix to generate an "N×1" output matrix.

Example 16 may include elements of any of example 9 through 15 and the method may further include: receiving, by the control circuitry, an "N×N" input array data set; causing a transfer of the systolic array input data set to each respective one of three or more one-dimensional (1-D) systolic array circuits; and generating, by each respective one of the three or more 1-D systolic array circuits, a respective systolic array output matrix using the data representative of the systolic array input data set, the three or more 1-D systolic array circuits to collectively provide three or more systolic array output matrices; and mathematically combining, by the combination circuit, the "N×N" input array data set with the three or more systolic array output matrices to generate an "N×N" output matrix.

According to example 17, there is provided a discrete cosine transform (DCT)/inverse discrete cosine transform (IDCT) system. The system may include: means for providing data representative of a systolic array input data set to each respective one of one or more systolic array circuits; means for generating a systolic array output matrix using the received data representative of the systolic array input data to provide data representative of one or more systolic array output matrices; means for combining the data representative of an input array data set and the data representative of one or more systolic array output matrices to generate data representative of a DCT/IDCT output matrix.

Example 18 may include elements of example 17 where the means for combining the data representative of an input array data set and the data representative of one or more systolic array output matrices may further include: means for multiplying the data representative of an input array data set and the data representative of one or more systolic array output matrices.

Example 19 may include elements of any of examples 17 or 18 where the means for providing the data representative of the systolic array input data set to each respective one of the one or more systolic array circuits may further include: means for providing data representative of a systolic array input data set that includes data representative of one or more frequency values to each respective one of one or more DCT systolic array circuits.

Example 20 may include elements of any of examples 17 through 19 where the means for providing the data representative of the systolic array input data set to each respective one of the one or more systolic array circuits may further include: means for providing data representative of a systolic array input data set that includes data representative of one or more DCT values to each respective one of one or more IDCT systolic array circuits.

Example 21 may include elements of any of examples 17 through 20 where the means for generating a systolic array output matrix using the received data representative of the systolic array input data to provide data representative of one or more systolic array output matrices may further include: means for iteratively calculating the systolic array output matrix to achieve a defined data value precision.

Example 22 may include elements of any of examples 17 through 21 where the means for generating the systolic array output matrix using the received data representative of the systolic array input data to provide data representative of one or more systolic array output matrices; means for generating an "N×1" systolic array output matrix using the data representative of the systolic array input data set; and means for generating a "1×N" systolic array output matrix using the data representative of the systolic array input data set; and where the means for combining the data representative of the input array data set and the data representative of one or more systolic array output matrices to generate data representative of a DCT/IDCT output matrix may further include: means for combining data representative of an "N×N" input array data set the data representative of the "N×1" systolic array output matrix and the "1×N" systolic array output matrix to generate data representative of an "N×N" DCT/IDCT output matrix.

Example 23 may include elements of any of examples 17 through 22 where the means for providing the data representative of the systolic array input data set to each respective one of the one or more systolic array circuits may include: means for providing data representative of an "N×1" systolic input array data set to a one-dimensional (1-D) systolic array circuit; and where the means for generating the systolic array output matrix using the received data representative of the systolic array input data set to provide the data representative of one or more systolic array output matrices may further include: means for generating a systolic array output matrix using the received data representative of the "N×1" systolic array input data to provide data representative of one or more systolic array output matrices; and where the means for combining the data representative of the input array data set and the data representative of the one or more systolic array output matrices to generate the data representative of a DCT/IDCT output matrix may further include: means for multiplying the data representative of an "N×1" input array data set and the data representative of one or more systolic array output matrices to generate data representative of an "N×1" DCT/IDCT output matrix.

Example 24 may include elements of any of examples 17 through 23 where the means for providing the systolic array input data set to each respective one of the one or more systolic array circuits may include: means for providing the systolic array input data set to each respective one of three or more one-dimensional (1-D) systolic array circuits; and where the means for generating the systolic array output matrix using the received data representative of the systolic array input data set to provide the data representative of one or more systolic array output matrices may further include: means for causing each respective one of the three or more 1-D systolic array circuits to generate a respective systolic array output matrix using the systolic array input data set; and where the means for combining the input array data set and the one or more systolic array output matrices to generate the data representative of a DCT/IDCT output matrix may further include: means for multiplying an "N×N" input array data set with each respective one of the three or more systolic array output matrices to generate an "N×N" output matrix.

According to example 25, there is provided a non-transitory storage device. The non-transitory storage device may include instructions that, when executed by discrete cosine transform (DCT)/inverse discrete cosine transform (IDCT) control circuitry (DCT/IDCT control circuitry) causes the DCT/IDCT control circuitry to: cause a transfer data representative of a systolic array input data set to each respective one of one or more systolic array circuits, each of the one or more systolic array circuits communicatively coupled to the control circuitry; cause each respective one of the one or more systolic array circuits to generate a systolic array output matrix using the received data representative of the systolic array input data to provide data representative of one or more systolic array output matrices; cause a transfer of data representative of an input array data set to combination circuitry; cause a transfer of the data representative of one or more systolic array output matrices to the combination circuitry; and cause a combination circuit to combine the data representative of an input array data set and the data representative of one or more systolic array output matrices to generate data representative of a DCT/IDCT output matrix.

Example 26 may include elements of example 25 where the instructions that cause the DCT/IDCT control circuitry to cause the transfer of the data representative of the input array data set to the combination circuitry may further cause the DCT/IDCT control circuitry to: cause a transfer of the data representative of the input array data set to combination circuitry that includes multiplication circuitry; and where the instructions that cause the DCT/IDCT control circuitry to cause the transfer of the data representative of the one or more systolic array output matrices to the combination circuitry may further cause the DCT/IDCT control circuitry to: cause a transfer of the data representative of the one or more systolic array output matrices to the multiplication circuitry.

Example 27 may include elements of any of examples 25 or 26 where the instructions that cause the DCT/IDCT control circuitry to cause the transfer the data representative of the systolic array input data set to each respective one of the one or more systolic array circuits may further cause the DCT/IDCT control circuitry to: cause a transfer of data representative of a systolic array input data set that includes data representative of one or more frequency values to each respective one of one or more DCT systolic array circuits.

Example 28 may include elements of any of examples 25 through 27 where the instructions that cause the DCT/IDCT control circuitry to cause the transfer of the data representative of the systolic array input data set to each respective one of the one or more systolic array circuits may further cause the DCT/IDCT control circuitry to: cause a transfer of data representative of a systolic array input data set that includes data representative of one or more DCT values to each respective one of one or more IDCT systolic array circuits.

Example 29 may include elements of any of examples 25 through 28 where the instructions may further cause the DCT/IDCT control circuitry to: obtain data representative of a precision of data values included in the systolic array output matrix; and where the instructions that cause the DCT/IDCT control circuitry to cause each respective one of the one or more systolic array circuits to generate a systolic array output matrix may further cause the DCT/IDCT control circuitry to: cause each respective one of the one or more systolic array circuits to iteratively calculate the systolic array output matrix to provide the precision of data values.

Example 30 may include elements of any of examples 25 through 29 where the instructions that cause the DCT/IDCT control circuitry to cause the transfer of data representative of the systolic array input data set to each respective one of the one or more systolic array circuits may further cause the DCT/IDCT control circuitry to: cause a transfer of data representative of a systolic array input data set to each respective one of two one-dimensional (1-D) systolic array circuits; where the instructions that cause the DCT/IDCT control circuitry to cause a transfer of data representative of the input array data set to the combination circuitry may further cause the DCT/IDCT control circuitry to: transfer data representative of an N×N input array data set to the combination circuitry; where the instructions that cause the DCT/IDCT control circuitry to cause each respective one of the one or more systolic array circuits to generate a systolic array output matrix using the received data representative of the systolic array input data further cause the DCT/IDCT control circuitry to: cause a first of the two 1-D systolic array circuits to generate an "N×1" systolic array output matrix using the data representative of the systolic array input data set; and cause a second of the two 1-D systolic array circuits to generate a "1×N" systolic array output matrix using the data representative of the systolic array input data set; and where the instructions that cause the DCT/IDCT control circuitry to combine the data representative of an input array data set and the data representative of one or more systolic array output matrices to generate data representative of a DCT/IDCT output matrix may further cause the DCT/IDCT control circuitry to: cause the combination circuitry to combine the data representative of the "N×N" input array data set the data representative of the "N×1" systolic array output matrix and the "1×N" systolic array output matrix to generate data representative of an "N×N" DCT/IDCT output matrix.

Example 31 may include elements of any of claims 25 through 30 where the instructions that cause the DCT/IDCT control circuitry to cause the transfer of the data representative of a systolic array input data set to each respective one of the one or more systolic array circuits may further cause the DCT/IDCT control circuitry to: cause the transfer of data representative of a single systolic array input data set to a one-dimensional (1-D) systolic array circuit; where the instructions that cause the DCT/IDCT control circuitry to cause each respective one of the one or more systolic array circuits to generate a systolic array output matrix using the received data representative of the systolic array input data may further cause the DCT/IDCT control circuitry to: cause the 1-D systolic array circuit to generate a systolic array output matrix using the data representative of the single systolic array input data set; and where the instructions that cause the DCT/IDCT control circuitry to cause the combination circuit to combine the data representative of the input array data set and the data representative of the one or more systolic array output matrices may further cause the DCT/IDCT control circuitry to: cause the combination circuit to multiply the "N×1" input array data set with the systolic array output matrix to generate an "N×1" output matrix.

Example 32 may include elements of any of examples 25 through 31 where the instructions that cause the DCT/IDCT control circuitry to cause the transfer of the data representative of a systolic array input data set to each respective one of the one or more systolic array circuits may further cause the DCT/IDCT control circuitry to: cause a transfer of data representative of the systolic array input data set to each respective one of three or more one-dimensional (1-D) systolic array circuits; where the instructions that cause the DCT/IDCT control circuitry to cause each respective one of the one or more systolic array circuits to generate a systolic array output matrix may further cause the DCT/IDCT control circuitry to: cause each respective one of the three or more 1-D systolic array circuits to generate a systolic array output matrix using the received data representative of the systolic array input data to provide three or more systolic array output matrices; where the instructions that cause the DCT/IDCT control circuitry to cause the combination circuit to combine the data representative of the input array data set and the data representative of the three or more systolic array output matrices may further cause the DCT/IDCT control circuitry to: cause the combination circuit to multiply an "N×N" input array data set with each respective one of the three or more systolic array output matrices to generate an "N×N" output matrix.

According to example 33, there is provided a processor-based device. The device may include: processor circuitry; processor cache circuitry communicatively coupled to the processor circuitry; system memory circuitry communicably coupled to the processor circuitry; discrete cosine transform (DCT)/inverse discrete cosine transform (IDCT) circuitry, including: one or more combination circuits; one or more systolic array circuits; DCT/IDCT control circuitry coupled to the one or more combination circuits and to the one or more systolic array circuit, the control circuitry to: receive a systolic array input data set; receive an input array data set; provide the systolic array input data set to each respective one of the one or more systolic array circuits, each of the one or more systolic array circuits to provide a systolic array output matrix using the received systolic array input data such that the one or more systolic array circuits collectively provide one or more systolic array output matrices; and cause the one or more combination circuits to mathematically combine the input array data set with the one or more systolic array output matrices to generate a DCT/IDCT output matrix.

Example 34 may include elements of any of examples 32 or 33 where the one or more combination circuits may include one or more array multiplication circuits.

Example 35 may include elements of any of examples 32 through 34 where the systolic array input data set includes data representative of one or more frequency values; and where the one or more systolic array circuits include one or more DCT systolic array circuits.

Example 36 may include elements of any of examples 32 through 35 where the systolic array input data set includes data representative of one or more DCT values; and where the one or more systolic array circuits include one or more IDCT systolic array circuits.

Example 37 may include elements of any of examples 32 through 36, the DCT/IDCT control circuitry may further: receive data representative of a precision of data values included in the systolic array output matrix.

Example 38 may include elements of any of examples 32 through 37 where the one or more systolic array circuits include two one-dimensional (1-D) systolic array circuits arranged in parallel; the DCT/IDCT control circuitry may further: receive an input array data set that includes an "N×N" input array data set; cause the first of the two 1-D systolic array circuits to provide an "N×1" systolic array output matrix using the systolic array input data set; and cause the second of the two 1-D systolic array circuits to provide a "1×N" systolic array output matrix using the systolic array input data set; and cause the combination circuit to mathematically combine the "N×N" input array data set, the "N×1" systolic array output matrix, and the "1×N" systolic array output matrix to generate an "N×N" output matrix.

Example 39 may include elements of any of examples 32 through 38 where the one or more systolic array circuits include a single one-dimensional (1-D) systolic array circuit; and the DCT/IDCT control circuitry may further: receive an "N×1" input array data set; provide the data representative of the systolic array input data set to the 1-D systolic array circuit to provide the systolic array output matrix; cause the 1-D systolic array circuit to provide a systolic array output matrix using the single systolic array input data set; and cause the combination circuit to mathematically combine the "N×1" input array data set with the systolic array output matrix to generate an "N×1" output matrix.

Example 40 may include elements of any of examples 32 through 39 where the one or more systolic array circuits include three or more one-dimensional (1-D) systolic array circuits arranged in parallel; and the DCT/IDCT control circuitry may further: receive data representative of an "N×N" input array data set; provide data representative of the systolic array input data set to each respective one of the three more 1-D systolic array circuits; and cause the each of the three or more 1-D systolic array circuits to generate a respective systolic array output matrix using the systolic array input data set, the three or more 1-D systolic array circuits to collectively provide three or more systolic array output matrices; and cause the combination circuit to mathematically combine the "N×N" input array data set with the three or more systolic array output matrices generate an "N×N" output matrix.

According to example 41, there is provided a system for performing discrete cosine transforms and inverse discrete cosine transforms (DCT/IDCT) using a CORDIC algorithm implemented in systolic array circuitry that includes a plurality cells or nodes, each containing circuitry to implement the CORDIC algorithm, the system being arranged to perform the method of any of examples 9 through 16.

According to example 42, there is provided a chipset arranged to perform the method of any of examples 9 through 16.

According to example 43, there is provided at least one non-transitory machine-readable medium comprising a plurality of instructions that, in response to be being executed on a processor-based device, cause the computing device to carry out the method according to any of examples 9 through 16.

According to example 44, there is provided a device configured for performing discrete cosine transforms and inverse discrete cosine transforms (DCT/IDCT) using a CORDIC algorithm implemented in systolic array circuitry that includes a plurality cells or nodes, each containing circuitry to implement the CORDIC algorithm, the device being arranged to perform the method of any of the examples 9 through 16.

The terms and expressions which have been employed herein are used as terms of description and not of limitation, and there is no intention, in the use of such terms and expressions, of excluding any equivalents of the features shown and described (or portions thereof), and it is recognized that various modifications are possible within the scope of the claims. Accordingly, the claims are intended to cover all such equivalents. Various features, aspects, and embodiments have been described herein. The features, aspects, and embodiments are susceptible to combination with one another as well as to variation and modification, as will be understood by those having skill in the art. The present disclosure should, therefore, be considered to encompass such combinations, variations, and modifications.

As described herein, various embodiments may be implemented using hardware elements, software elements, or any combination thereof. Examples of hardware elements may include processors, microprocessors, circuits, circuit dements (e.g., transistors, resistors, capacitors, inductors, and so forth), integrated circuits, application specific integrated circuits (AS IC), programmable logic devices (PLD), digital signal processors (DSP), field programmable gate array (FPGA), logic gates, registers, semiconductor device, chips, microchips, chip sets, and so forth.

Reference throughout this specification to "one embodiment" or "an embodiment" means that a particular feature, structure, or characteristic described in connection with the embodiment is included in at least one embodiment. Thus, appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

What is claimed:

1. A discrete cosine transform (DCT)/inverse discrete cosine transform (IDCT) system, comprising:
   one or more combination circuits;
   one or more systolic array circuits;
   DCT/IDCT control circuitry coupled to the one or more combination circuits and to the one or more systolic array circuit, the control circuitry to:
   receive a systolic array input data set;
   receive an input array data set;
   provide the systolic array input data set to each respective one of the one or more systolic array circuits, each of the one or more systolic array circuits to provide a systolic array output matrix using the received systolic array input data such that the one or more systolic array circuits collectively provide one or more systolic array output matrices; and
   cause the one or more combination circuits to mathematically combine the input array data set with the one or more systolic array output matrices to generate a DCT/IDCT output matrix.

2. The system of claim 1 wherein the one or more combination circuits comprise one or more array multiplication circuits.

3. The system of claim 1:
   wherein the systolic array input data set includes data representative of one or more frequency values; and
   wherein the one or more systolic array circuits include one or more DCT systolic array circuits.

4. The system of claim 1:
   wherein the systolic array input data set includes data representative of one or more DCT values; and
   wherein the one or more systolic array circuits include one or more IDCT systolic array circuits.

5. The system of claim 1, the DCT/IDCT control circuitry to:
   receive data representative of a precision of data values included in the systolic array output matrix.

6. The system of claim 1:
   wherein the one or more systolic array circuits include two one-dimensional (1-D) systolic array circuits arranged in parallel;
   the DCT/IDCT control circuitry to further:
   receive an input array data set that includes an "N×N" input array data set;
   cause the first of the two 1-D systolic array circuits to provide an "N×1" systolic array output matrix using the systolic array input data set; and
   cause the second of the two 1-D systolic array circuits to provide a "1×N" systolic array output matrix using the systolic array input data set; and
   cause the combination circuit to mathematically combine the "N×N" input array data set, the "N×1" systolic array output matrix, and the "1×N" systolic array output matrix to generate an "N×N" output matrix.

7. The system of claim 1:
   wherein the one or more systolic array circuits include a single one-dimensional (1-D) systolic array circuit; and
   the DCT/IDCT control circuitry to further:
   receive an "N×1" input array data set;
   provide the data representative of the systolic array input data set to the 1-D systolic array circuit to provide the systolic array output matrix;
   cause the 1-D systolic array circuit to provide a systolic array output matrix using the single systolic array input data set; and
   cause the combination circuit to mathematically combine the "N×1" input array data set with the systolic array output matrix to generate an "N×1" output matrix.

8. The system of claim 1:
   wherein the one or more systolic array circuits include three or more one-dimensional (1-D) systolic array circuits arranged in parallel; and the DCT/IDCT control circuitry to further:
receive data representative of an "N×N" input array data set;
provide data representative of the systolic array input data set to each respective one of the three more 1-D systolic array circuits; and
cause the each of the three or more 1-D systolic array circuits to generate a respective systolic array output matrix using the systolic array input data set, the three or more 1-D systolic array circuits to collectively provide three or more systolic array output matrices; and
cause the combination circuit to mathematically combine the "N×N" input array data set with the three or more systolic array output matrices generate an "N×N" output matrix.

9. A discrete cosine transform (DCT)/inverse discrete cosine transform (IDCT) system, comprising:
means for providing data representative of a systolic array input data set to each respective one of one or more systolic array circuits;
means for generating a systolic array output matrix using the received data representative of the systolic array input data to provide data representative of one or more systolic array output matrices; and
means for combining the data representative of an input array data set and the data representative of one or more systolic array output matrices to generate data representative of a DCT/IDCT output matrix.

10. The system of claim 9 wherein the means for combining the data representative of an input array data set and the data representative of one or more systolic array output matrices further comprises:
means for multiplying the data representative of an input array data set and the data representative of one or more systolic array output matrices.

11. The system of claim 9 wherein the means for providing the data representative of the systolic array input data set to each respective one of the one or more systolic array circuits further comprises:
means for providing data representative of a systolic array input data set that includes data representative of one or more frequency values to each respective one of one or more DCT systolic array circuits.

12. The system of claim 9 wherein the means for providing the data representative of the systolic array input data set to each respective one of the one or more systolic array circuits further comprises:
means for providing data representative of a systolic array input data set that includes data representative of one or more DCT values to each respective one of one or more IDCT systolic array circuits.

13. The system of claim 9 wherein the means for generating a systolic array output matrix using the received data representative of the systolic array input data to provide data representative of one or more systolic array output matrices further comprises:
means for iteratively calculating the systolic array output matrix to achieve a defined data value precision.

14. The system of claim 9:
wherein the means for generating the systolic array output matrix using the received data representative of the systolic array input data to provide data representative of one or more systolic array output matrices further comprises:
means for generating an "N×1" systolic array output matrix using the data representative of the systolic array input data set; and
means for generating a "1×N" systolic array output matrix using the data representative of the systolic array input data set; and
wherein the means for combining the data representative of the input array data set and the data representative of one or more systolic array output matrices to generate data representative of a DCT/IDCT output matrix further comprises:
means for combining data representative of an "N×N" input array data set the data representative of the "N×1" systolic array output matrix and the "1×N" systolic array output matrix to generate data representative of an "N×N" DCT/IDCT output matrix.

15. The system of claim 9:
wherein the means for providing the data representative of the systolic array input data set to each respective one of the one or more systolic array circuits further comprises:
means for providing data representative of an "N×1" systolic input array data set to a one-dimensional (1-D) systolic array circuit; and
wherein the means for generating the systolic array output matrix using the received data representative of the systolic array input data set to provide the data representative of one or more systolic array output matrices further comprises:
means for generating a systolic array output matrix using the received data representative of the "N×1" systolic array input data to provide data representative of one or more systolic array output matrices; and
wherein the means for combining the data representative of the input array data set and the data representative of the one or more systolic array output matrices to generate the data representative of a DCT/IDCT output matrix further comprises:
means for multiplying the data representative of an "N×1" input array data set and the data representative of one or more systolic array output matrices to generate data representative of an "N×1" DCT/IDCT output matrix.

16. The system of claim 9:
wherein the means for providing the systolic array input data set to each respective one of the one or more systolic array circuits comprises:
means for providing the systolic array input data set to each respective one of three or more one-dimensional (1-D) systolic array circuits; and
wherein the means for generating the systolic array output matrix using the received data representative of the systolic array input data set to provide the data representative of one or more systolic array output matrices further comprises:
means for causing each respective one of the three or more 1-D systolic array circuits to generate a respective systolic array output matrix using the systolic array input data set; and
wherein the means for combining the input array data set and the one or more systolic array output matrices to generate the data representative of a DCT/IDCT output matrix further comprises:

means for multiplying an "N×N" input array data set with each respective one of the three or more systolic array output matrices to generate an "N×N" output matrix.

17. A non-transitory storage device that includes instructions that, when executed by discrete cosine transform (DCT)/inverse discrete cosine transform (IDCT) control circuitry (DCT/IDCT control circuitry) causes the DCT/IDCT control circuitry to:
cause a transfer data representative of a systolic array input data set to each respective one of one or more systolic array circuits, each of the one or more systolic array circuits communicatively coupled to the control circuitry;
cause each respective one of the one or more systolic array circuits to generate a systolic array output matrix using the received data representative of the systolic array input data to provide data representative of one or more systolic array output matrices;
cause a transfer of data representative of an input array data set to combination circuitry;
cause a transfer of the data representative of one or more systolic array output matrices to the combination circuitry; and
cause a combination circuit to combine the data representative of an input array data set and the data representative of one or more systolic array output matrices to generate data representative of a DCT/IDCT output matrix.

18. The non-transitory storage device of claim 17:
wherein the instructions that cause the DCT/IDCT control circuitry to cause the transfer of the data representative of the input array data set to the combination circuitry further cause the DCT/IDCT control circuitry to:
cause a transfer of the data representative of the input array data set to combination circuitry that includes multiplication circuitry; and
wherein the instructions that cause the DCT/IDCT control circuitry to cause the transfer of the data representative of the one or more systolic array output matrices to the combination circuitry further cause the DCT/IDCT control circuitry to:
cause a transfer of the data representative of the one or more systolic array output matrices to the multiplication circuitry.

19. The non-transitory storage device of claim 17 wherein the instructions that cause the DCT/IDCT control circuitry to cause the transfer the data representative of the systolic array input data set to each respective one of the one or more systolic array circuits further cause the DCT/IDCT control circuitry to:
cause a transfer of data representative of a systolic array input data set that includes data representative of one or more frequency values to each respective one of one or more DCT systolic array circuits.

20. The non-transitory storage device of claim 17 wherein the instructions that cause the DCT/IDCT control circuitry to cause the transfer of the data representative of the systolic array input data set to each respective one of the one or more systolic array circuits further cause the DCT/IDCT control circuitry to:
cause a transfer of data representative of a systolic array input data set that includes data representative of one or more DCT values to each respective one of one or more IDCT systolic array circuits.

21. The non-transitory storage device of claim 17 wherein the instructions further cause the DCT/IDCT control circuitry to:
obtain data representative of a precision of data values included in the systolic array output matrix; and
wherein the instructions that cause the DCT/IDCT control circuitry to cause each respective one of the one or more systolic array circuits to generate a systolic array output matrix further cause the DCT/IDCT control circuitry to:
cause each respective one of the one or more systolic array circuits to iteratively calculate the systolic array output matrix to provide the precision of data values.

22. The non-transitory storage device of claim 17:
wherein the instructions that cause the DCT/IDCT control circuitry to cause the transfer of data representative of the systolic array input data set to each respective one of the one or more systolic array circuits further causes the DCT/IDCT control circuitry to:
cause a transfer of data representative of a systolic array input data set to each respective one of two one-dimensional (1-D) systolic array circuits;
wherein the instructions that cause the DCT/IDCT control circuitry to cause a transfer of data representative of the input array data set to the combination circuitry further comprises:
cause a transfer of data representative of an N×N input array data set to the combination circuitry;
wherein the instructions that cause the DCT/IDCT control circuitry to cause each respective one of the one or more systolic array circuits to generate a systolic array output matrix using the received data representative of the systolic array input data further cause the DCT/IDCT control circuitry to:
cause a first of the two 1-D systolic array circuits to generate an "N×1" systolic array output matrix using the data representative of the systolic array input data set; and
cause a second of the two 1-D systolic array circuits to generate a "1×N" systolic array output matrix using the data representative of the systolic array input data set; and
wherein the instructions that cause the DCT/IDCT control circuitry to combine the data representative of an input array data set and the data representative of one or more systolic array output matrices to generate data representative of a DCT/IDCT output matrix further cause the DCT/IDCT control circuitry to:
cause the combination circuitry to combine the data representative of the "N×N" input array data set the data representative of the "N×1" systolic array output matrix and the "1×N" systolic array output matrix to generate data representative of an "N×N" DCT/IDCT output matrix.

23. The non-transitory storage device of claim 17:
wherein the instructions that cause the DCT/IDCT control circuitry to cause the transfer of the data representative of a systolic array input data set to each respective one of the one or more systolic array circuits cause the DCT/IDCT control circuitry to:
cause the transfer of data representative of a single systolic array input data set to a one-dimensional (1-D) systolic array circuit;
wherein the instructions that cause the DCT/IDCT control circuitry to cause each respective one of the one or more systolic array circuits to generate a systolic array output matrix using the received data representative of the systolic array input data cause the DCT/IDCT control circuitry to;
    cause the 1-D systolic array circuit to generate a systolic array output matrix using the data representative of the single systolic array input data set; and
wherein the instructions that cause the DCT/IDCT control circuitry to cause the combination circuit to combine the data representative of the input array data set and the data representative of the one or more systolic array output matrices further cause the DCT/IDCT control circuitry to:
    cause the combination circuit to multiply the "N×1" input array data set with the systolic array output matrix to generate an "N×1" output matrix.

24. The non-transitory storage device of claim 17:
wherein the instructions that cause the DCT/IDCT control circuitry to cause the transfer of the data representative of a systolic array input data set to each respective one of the one or more systolic array circuits cause the DCT/IDCT control circuitry to:
    cause a transfer of data representative of the systolic array input data set to each respective one of three or more one-dimensional (1-D) systolic array circuits;
wherein the instructions that cause the DCT/IDCT control circuitry to cause each respective one of the one or more systolic array circuits to generate a systolic array output matrix further cause the DCT/IDCT control circuitry to:
    cause each respective one of the three or more 1-D systolic array circuits to generate a systolic array output matrix using the received data representative of the systolic array input data to provide three or more systolic array output matrices;
wherein the instructions that cause the DCT/IDCT control circuitry to cause the combination circuit to combine the data representative of the input array data set and the data representative of the three or more systolic array output matrices further cause the DCT/IDCT control circuitry to:
    cause the combination circuit to multiply an "N×N" input array data set with each respective one of the three or more systolic array output matrices to generate an "N×N" output matrix.

25. A processor-based device, comprising:
processor circuitry;
processor cache circuitry communicatively coupled to the processor circuitry;
system memory circuitry communicably coupled to the processor circuitry;
discrete cosine transform (DCT)/inverse discrete cosine transform (IDCT) circuitry, including:
    one or more combination circuits;
    one or more systolic array circuits;
    DCT/IDCT control circuitry coupled to the one or more combination circuits and to the one or more systolic array circuit, the control circuitry to:
    receive a systolic array input data set;
    receive an input array data set;
    provide the systolic array input data set to each respective one of the one or more systolic array circuits, each of the one or more systolic array circuits to provide a systolic array output matrix using the received systolic array input data such that the one or more systolic array circuits collectively provide one or more systolic array output matrices; and
    cause the one or more combination circuits to mathematically combine the input array data set with the one or more systolic array output matrices to generate a DCT/IDCT output matrix.

\* \* \* \* \*